US010947961B2

(12) United States Patent
Brown et al.

(10) Patent No.: US 10,947,961 B2
(45) Date of Patent: Mar. 16, 2021

(54) APPARATUSES, SYSTEMS, AND METHODS FOR EXTRACTION AND/OR STORAGE OF ENERGY FROM MOVING FLUIDS

(71) Applicant: Gregory A. M. Brown, Incline Village, NV (US)

(72) Inventors: Lawrence G. Brown, Honolulu, HI (US); Gregory A. M. Brown, Incline Village, NV (US)

(73) Assignees: Amy C. Brown, Honolulu, HI (US); Brian A. Brown, Oakland, CA (US); Gregory A. M. Brown, Reno, NV (US); Stephanie M. Brown, Alamo, CA (US)

( * ) Notice: Subject to any disclaimer, the term of this patent is extended or adjusted under 35 U.S.C. 154(b) by 1423 days.

(21) Appl. No.: 14/391,752

(22) PCT Filed: Mar. 14, 2013

(86) PCT No.: PCT/US2013/031277
§ 371 (c)(1),
(2) Date: Oct. 10, 2014

(87) PCT Pub. No.: WO2013/154739
PCT Pub. Date: Oct. 17, 2013

(65) Prior Publication Data
US 2015/0107238 A1 Apr. 23, 2015

Related U.S. Application Data

(60) Provisional application No. 61/622,189, filed on Apr. 10, 2012, provisional application No. 61/654,596, (Continued)

(51) Int. Cl.
F03G 7/00 (2006.01)
F03D 15/10 (2016.01)
(Continued)

(52) U.S. Cl.
CPC ............... F03G 7/00 (2013.01); F03B 13/00 (2013.01); F03B 13/08 (2013.01); F03B 13/086 (2013.01);
(Continued)

(58) Field of Classification Search
CPC ....... Y02E 10/20; Y02E 10/22; Y02E 10/223; Y02E 10/226; Y02E 10/28; Y02E 10/38;
(Continued)

(56) References Cited

U.S. PATENT DOCUMENTS 1,396,994 A * 11/1921 Bruggen ............... F03B 17/063
415/7
1,797,089 A * 3/1931 Huffstutter ............ F03B 17/063
415/7
(Continued)

FOREIGN PATENT DOCUMENTS

GB 2350866 A * 12/2000 ............ F03B 13/141
WO WO 2009102210 A1 * 8/2009 .............. F03B 13/14

Primary Examiner — Mark A Laurenzi
Assistant Examiner — Mickey H France
(74) Attorney, Agent, or Firm — Norton Rose Fulbright US LLP

(57) ABSTRACT

This disclosure includes various embodiments of apparatuses for encapsulating and stopping a flowing mass of fluid (e.g., liquid such as water, or gas such as air) to extract the kinetic energy from the mass, and for exhausting the mass once stopped (spent mass, from which kinetic energy has been extracted). This disclosure also includes various embodiments of systems comprising a plurality of the present apparatuses coupled together and/or one or more of the present apparatuses in combination with one or more flow resistance modifiers (FRMs). This disclosure also includes various embodiments of methods of extracting kinetic energy from a flowing mass of fluid (e.g., liquid such as water, or gas such as air) by stopping the mass, and for exhausting the mass once stopped (spent mass, from which (Continued)

kinetic energy has been extracted). This disclosure also includes embodiments of mechanical energy-storage or accumulation devices.

12 Claims, 28 Drawing Sheets

Related U.S. Application Data filed on Jun. 1, 2012, provisional application No. 61/657,742, filed on Jun. 9, 2012.

(51) Int. Cl.
  *F03D 9/12* (2016.01)
  *F03B 13/08* (2006.01)
  *F03B 13/00* (2006.01)

(52) U.S. Cl.
  CPC .............. *F03D 9/12* (2016.05); *F03D 15/10* (2016.05); *F05B 2260/402* (2013.01); *Y02E 10/22* (2013.01); *Y02E 10/72* (2013.01); *Y02E 10/74* (2013.01)

(58) Field of Classification Search
  CPC .. F03B 3/08; F03B 13/00; F03B 13/12; F03B 13/16; F03B 13/18; F03B 13/182; F03B 13/26; F03B 13/262; F03B 13/264; F03B 13/268; F03B 17/06
  USPC .......... 60/495, 497, 499, 502, 503, 505, 507
  See application file for complete search history.

(56) References Cited

U.S. PATENT DOCUMENTS

| | | | | |
|---|---|---|---|---|
| 3,980,894 A * | 9/1976 | Vary | ..................... | F03B 13/105 290/54 |
| 4,193,265 A * | 3/1980 | Ootsu | ..................... | F03B 13/24 290/54 |
| 4,267,695 A * | 5/1981 | Micciche | .............. | F03B 17/005 60/473 |
| 4,464,080 A * | 8/1984 | Gorlov | ..................... | E02B 9/08 405/76 |
| 4,754,155 A * | 6/1988 | Obermeyer | ............. | F03B 15/00 290/52 |
| 5,405,250 A * | 4/1995 | Vowles | ............... | F03B 13/1815 417/331 |
| 5,825,094 A * | 10/1998 | Hess | ....................... | F03B 13/105 290/54 |
| 6,328,539 B1 * | 12/2001 | Hung | .................... | F03B 13/181 417/330 |
| 7,478,974 B1 * | 1/2009 | Kelly | ........................ | E02B 9/02 405/75 |
| 9,666,919 B1 * | 5/2017 | Brown | ................... | H01M 12/06 |
| 2002/0081219 A1 * | 6/2002 | Huang | .................. | F03B 13/264 417/331 |
| 2004/0031265 A1 * | 2/2004 | Doleh | ................... | F03B 13/147 60/398 |
| 2007/0207889 A1 * | 9/2007 | Costello | ................... | B60K 6/10 475/263 |
| 2008/0000224 A1 * | 1/2008 | Swart | .................. | F03B 13/1845 60/497 |
| 2008/0159855 A1 * | 7/2008 | Spataro | ................... | F03B 13/10 415/183 |
| 2011/0089695 A1 * | 4/2011 | Krouse | ..................... | E02B 9/00 290/52 |
| 2011/0187113 A1 * | 8/2011 | Loo | ........................ | F03B 13/00 290/54 |
| 2012/0006015 A1 * | 1/2012 | McGillis | ............... | F03B 17/025 60/502 |
| 2012/0251349 A1 * | 10/2012 | Ortiz | ....................... | F04B 17/00 417/330 |
| 2013/0019971 A1 * | 1/2013 | Anteau | ................ | F03B 17/025 137/571 |
| 2013/0154270 A1 * | 6/2013 | Shinohara | ............. | F03B 17/005 290/54 |
| 2013/0266378 A1 * | 10/2013 | French, Sr. | ............... | E02B 7/04 405/78 |
| 2014/0130497 A1 * | 5/2014 | Anteau | ..................... | F03G 7/04 60/639 |
| 2014/0312623 A1 * | 10/2014 | Anteau | ................. | F03B 17/005 290/52 |
| 2015/0014995 A1 * | 1/2015 | Nishioka | ................. | F03B 13/00 290/52 |

\* cited by examiner

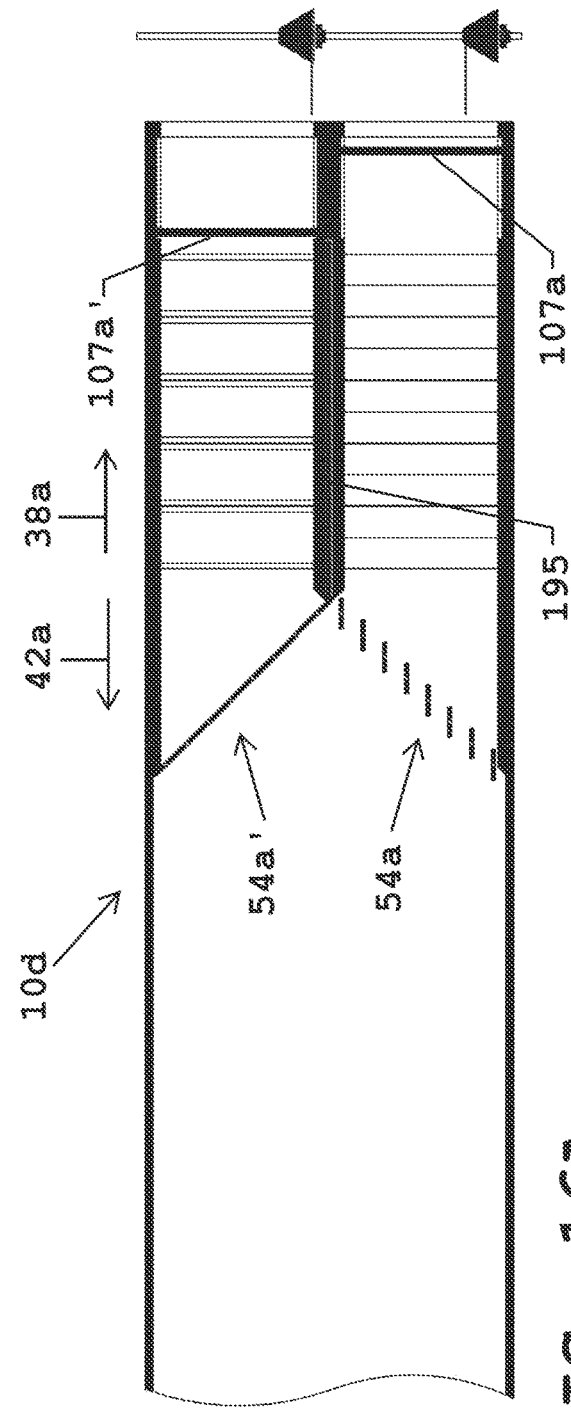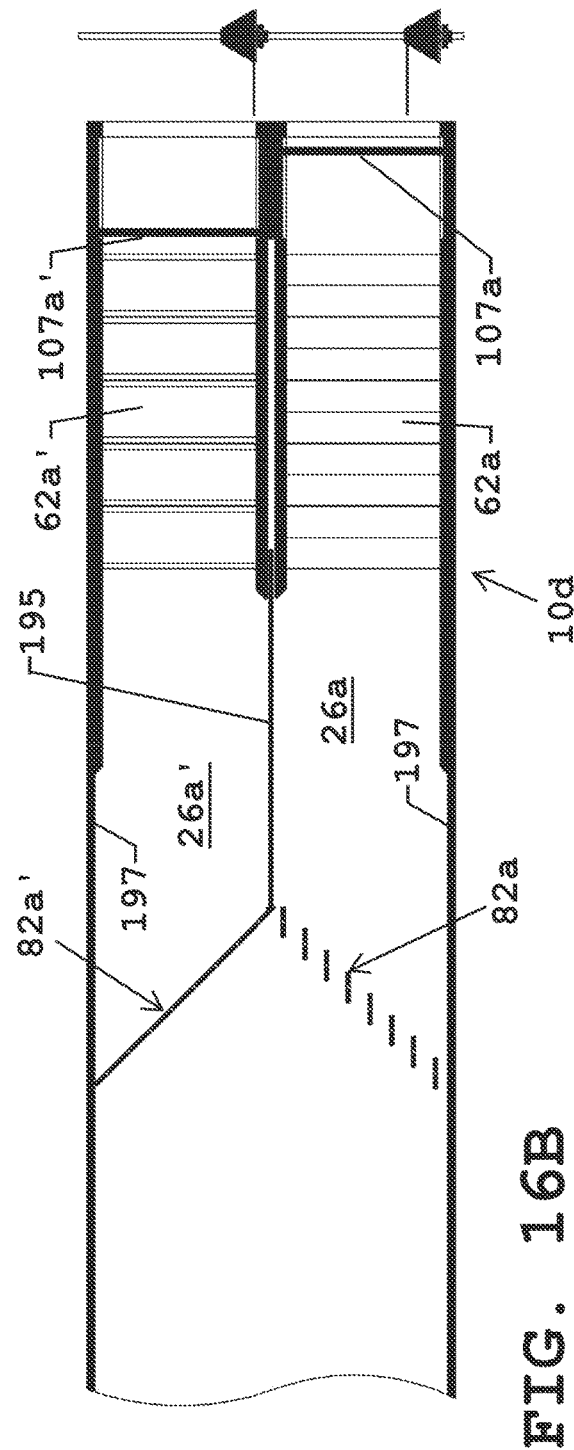

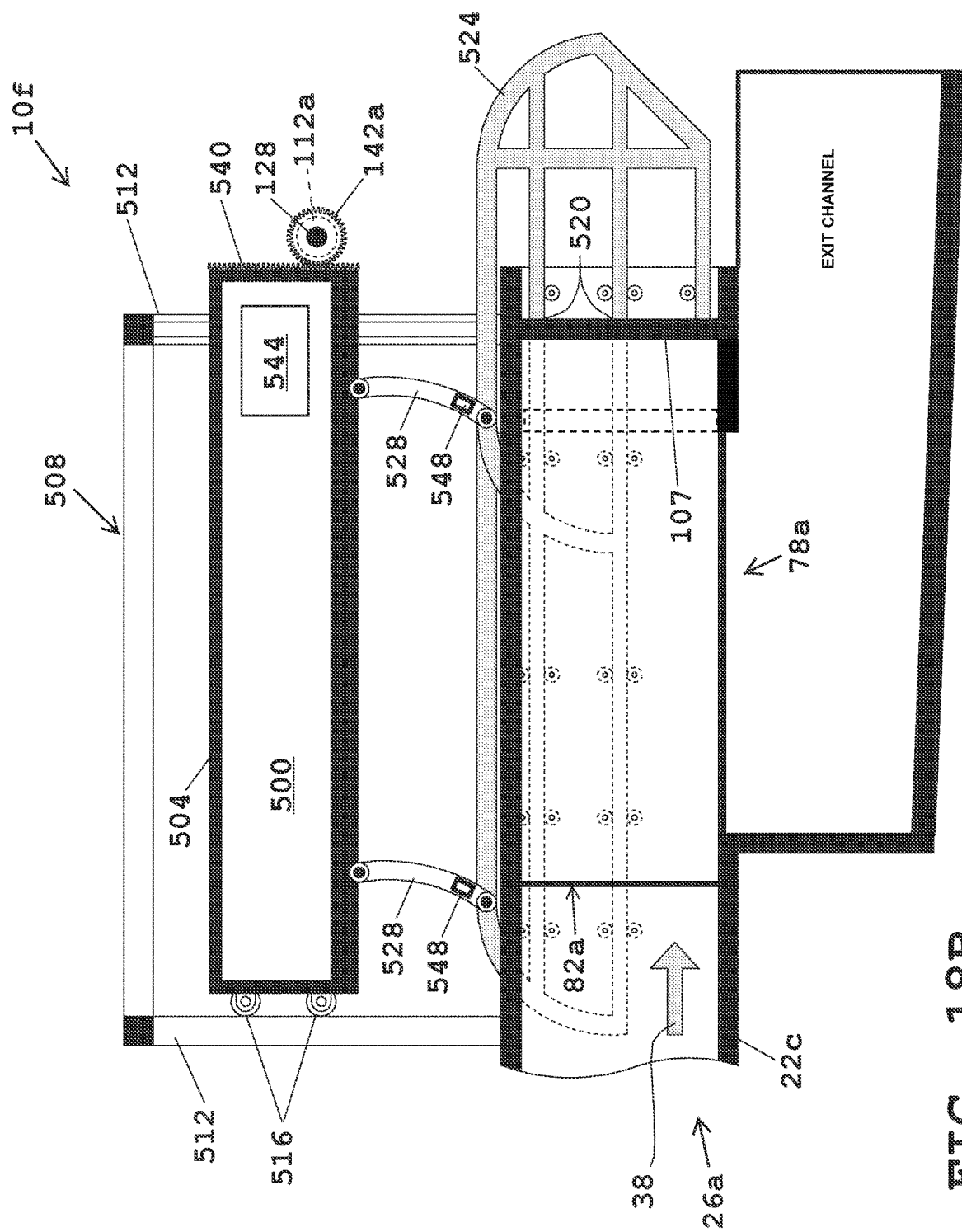

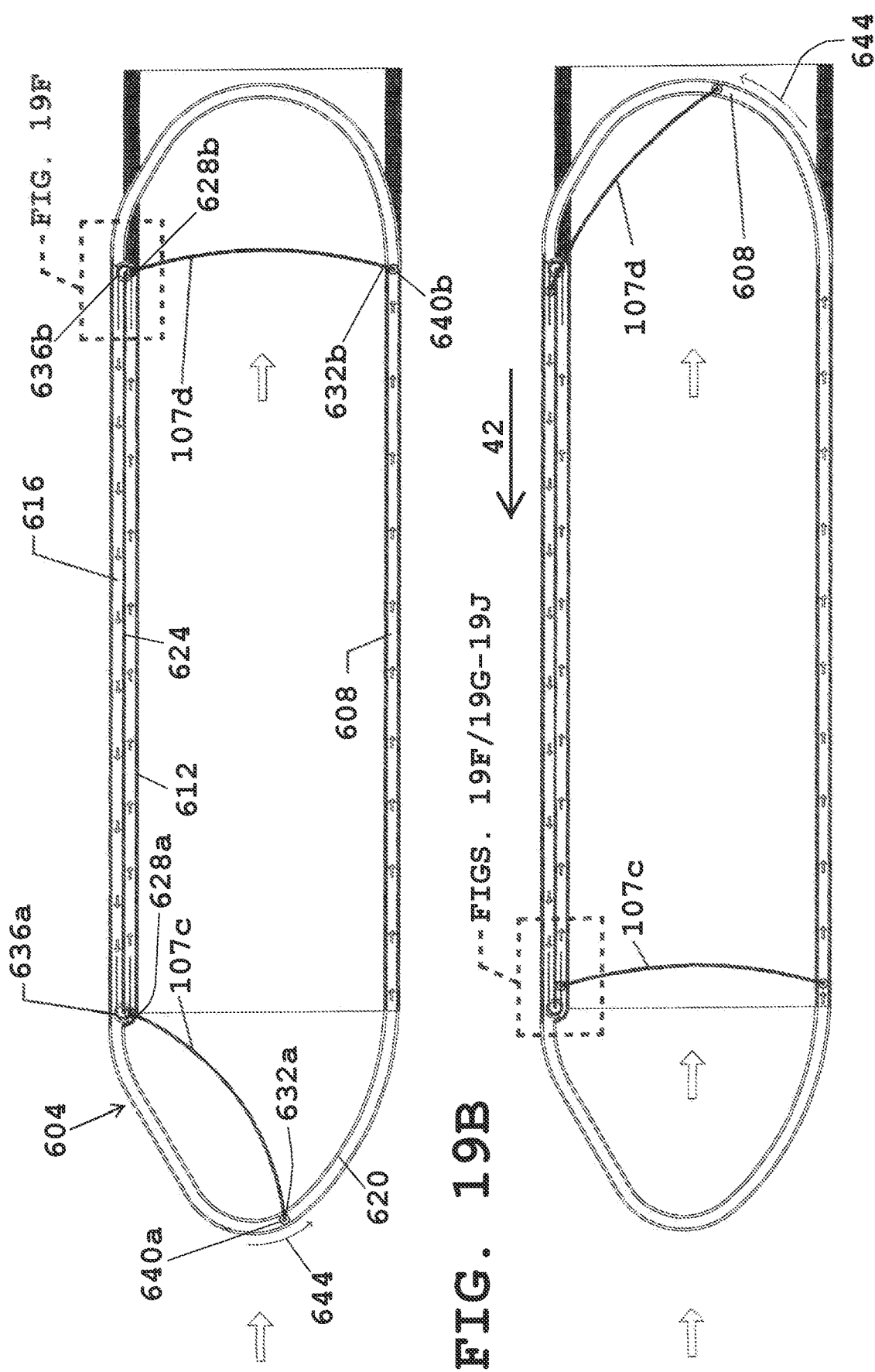

US 10,947,961 B2

APPARATUSES, SYSTEMS, AND METHODS FOR EXTRACTION AND/OR STORAGE OF ENERGY FROM MOVING FLUIDS

CROSS-REFERENCE TO RELATED APPLICATIONS

This application is a national phase application under 35 U.S.C. § 371 of International Application No. PCT/US2013/031277 filed Mar. 14, 2013, which claims priority to U.S. Provisional Application No. 61/622,189, filed Apr. 10, 2012; U.S. Provisional Patent Application No. 61/654,596, filed Jun. 1, 2012; and U.S. Provisional Patent Application No. 61/657,742, filed Jun. 9, 2012; all of which are incorporated by reference in their entireties.

BACKGROUND

1. Field of the Invention

The present invention relates generally to renewable energy extraction and, more particularly, but not by way of limitation; to apparatuses, systems, and methods for extraction and/or storage of energy from moving fluids (e.g., tidal flows, river flows, etc.).

2. Description of Related Art

Examples of structures for extracting energy from moving fluids are disclosed in U.S. patent application Ser. No. 12/830,432, filed Jul. 5, 2010 and published as US 2011/0229318.

After years of efforts, known methods of harvesting the energy in naturally-flowing waters are limited. Naturally renewable and sustainable energy sources include water, wind, solar, and geothermal sources. However, wind and solar have most-often been the focus of recent efforts. Despite billions of dollars spent on research and subsidies; solar, wind, and geothermal energy sources currently provide a very small percentage of current energy consumption. Geothermal energy sources in the United States is available in limited geographic locations; wind power often require consistent and relatively-high speeds, as well as large land areas; and solar panels are limited to daylight hours (e.g., even high-efficiency solar panels in lab conditions are often only about 8% efficient). Water is often neglected in current efforts to advance renewable-energy technology, perhaps because it has historically required massive dam projects with significant environmental impact.

SUMMARY

This disclosure includes embodiments of apparatuses, systems, and methods for extraction and/or storage of energy from moving fluids (e.g., tidal flows, river flows, etc.).

Some embodiments of the present apparatuses comprise: a body defining an encapsulation channel having an inlet and an outlet; a partition coupled to the channel such that the partition can move in a downstream direction that extends away from the inlet, or in an upstream direction that extends toward the inlet; and an exhaust mechanism, at least a portion of the exhaust mechanism being more directly coupled to the body than to the partition; where the partition is configured to be coupled to a load such that if a mass of fluid (e.g., liquid) enters the inlet of the channel with an initial flow velocity in the downstream direction, the partition will decrease the flow velocity of the mass to zero and transfer a portion (e.g., up to and including substantially all) of the kinetic energy of the mass of fluid to the load; and where the exhaust mechanism is configured to, after the flow velocity reaches zero, exhaust the mass of fluid (e.g., liquid) from the channel. Some embodiments comprise an energy storage mechanism including a resilient material configured to be compressed as the partition moves in the downstream direction, and/or an energy storage mechanism configured to raise a ballast member as the partition moves in the downstream direction. In some embodiments, the energy storage mechanism is configured to be coupled to the load such that the portion of the kinetic energy is transferred from the partition to the load through the energy storage mechanism.

In some embodiments of the present apparatuses, the partition comprises a flexible sheet and the apparatus is configured to function with air or another compressible medium as the mass of flowing fluid. In some embodiments, (e.g., in which the load comprises a flywheel), and the apparatus further comprises: a pair of guides disposed on opposing sides of the channel, each guide defining a first closed-loop path and a second closed-loop path that partially overlaps the first closed-loop path; a first chain coupled to one of the guides and movable along the first closed-loop path; a second chain coupled to one of the guides and movable along the second closed-loop path; and a first pair of sprockets coupled to opposing ends of the partition and configured to be alternatingly coupled to the first and second chains such that: (i) movement of the partition in the downstream direction encourages movement of at least one of the first and second chains to rotate the flywheel; and (ii) rotation of the flywheel encourages movement of at least one of the first and second chains to move the partition in an upstream direction. In some embodiments, the partition is a first partition, and the apparatus further comprises: a second partition coupled to the channel such that the second partition can move in a downstream direction that extends away from the inlet, or in an upstream direction that extends toward the inlet; and a second pair of sprockets coupled to opposing ends of the second partition and configured to be alternatingly coupled to the first and second chains such that: (i) movement of the second partition in the downstream direction encourages movement of at least one of the first and second chains to rotate the flywheel; and (ii) rotation of the flywheel encourages movement of at least one of the first and second chains to move the second partition in an upstream direction; where the apparatus is configured such that the second partition moves in an upstream direction if the first partition moves in a downstream direction, and the first partition moves in an upstream direction if the second partition moves in a downstream direction. In some embodiments, the partition is configured to extend across the channel if the partition is moving in the downstream direction and to not extend across the channel if the partition is moving in the upstream direction. In some embodiments, the exhaust mechanism is configured to position both ends of the partition on a single side of the channel to permit the fluid to exit the outlet.

In some embodiments, the partition is coupled to the load by a transfer mechanism configured such that a unit of linear motion of the partition in the downstream direction can generate 4 or more units of motion at the load. In some embodiments, the load comprises a rotatable shaft. In some embodiments, the transfer mechanism comprises: a plurality of first pulleys coupled in fixed relation to the body such that the plurality of first pulleys are spaced apart from one another across a transverse dimension of the channel; a plurality of second pulleys coupled in fixed relation to the partition such that the plurality of second pulleys are spaced apart from one another across a transverse dimension of the partition, the plurality of second pulleys offset from the plurality of first pulleys; a cable extending between the plurality of first pulleys, the cable having a first end and a second end; where the transfer mechanism is configured such that if the partition moves in the downstream direction, the plurality of first pulleys and the plurality of second pulleys will engage the cable to pull a length of the cable away from the shaft and apply torque to the shaft. In some embodiments, the plurality of second pulleys will engage the cable pull a length of the cable away from the shaft and apply to torque to the entire moment of inertia of the shaft. In some embodiments, the length of cable pulled away from the shaft is at least 4 times the length of motion of the partition.

In some embodiments, the exhaust mechanism is configured to use gravity to exhaust the mass of fluid (e.g., liquid). In some embodiments of the present apparatuses, the exhaust mechanism comprises an openable bottom in the channel, the bottom configured to be alternated between: (i) a closed state in which liquid is substantially prevented from flowing out of the channel through the bottom; and (ii) an open state in which liquid is permitted to flow out of the channel through the bottom. In some embodiments, the bottom is coupled to the partition such that the bottom is in the closed state when the partition moves in the downstream direction. In some embodiments, the partition is coupled to the bottom such that the bottom is in the open state when the partition moves in the upstream direction. In some embodiments, the bottom comprises one or more gates configured to be opened by gravity acting on liquid in the channel and the gates to cause the bottom to transition from the closed state to the open state. In some embodiments, the bottom comprises a plurality of gates. In some embodiments, the apparatus further comprises one or more paddle wheels, turbines, or flywheels configured to be turned by liquid exiting the bottom when the bottom is in the open state. In some embodiments, the paddle wheel, turbine, or flywheel is coupled to the partition to move the partition in the upstream direction. In some embodiments, the bottom is coupled to the partition such that the bottom is permitted to transition from the closed state to the open state after the partition has decreased the flow velocity of a mass of water to zero. In some embodiments, the partition is configured to be alternated between: (i) a closed state in which the partition will move in the downstream direction if a mass of fluid (e.g., liquid) flows into the channel; and (ii) an open state in which the partition will permit liquid to flow through the partition; where the bottom is coupled to the partition such that the bottom is in the closed state when the partition is in the closed state. In some embodiments of the present apparatuses, the body defines a second encapsulation channel having an inlet and an outlet, and the apparatus further comprises: a second partition coupled to the second channel such that the second partition can move in a downstream direction that extends away from the inlet, or in an upstream direction that extends toward the inlet; and a second exhaust mechanism, at least a portion of the second exhaust mechanism being more directly coupled to the body than to the second partition; where the second partition is configured to be coupled to a load such that if a mass of fluid (e.g., liquid) enters the inlet of the second channel with an initial flow velocity in the downstream direction, the second partition will decrease the flow velocity of the mass to zero and transfer a portion (e.g., up to and including substantially all) of the kinetic energy of the mass of fluid to the load; where the second exhaust mechanism is configured to, after the flow velocity reaches zero, exhaust the mass of fluid (e.g., liquid) from the second channel; and where the second exhaust mechanism comprises an openable second bottom in the second channel, the openable second bottom configured to be alternated between: (i) a closed state in which liquid is substantially prevented from flowing out of the second channel through the second bottom; and (ii) an open state in which liquid is permitted to flow out of the second channel through the second bottom. In some embodiments, the second bottom is coupled to the second partition such that the second bottom in the closed state when the second partition moves in the downstream direction. In some embodiments, the bottom in the first channel is coupled to the second bottom such that the bottom in the first channel is in the open state when the second bottom is in the closed state. In some embodiments, the second partition is coupled to the second bottom such that the second bottom is in the open state when the second partition moves in the upstream direction. In some embodiments, the second bottom comprises one or more gates configured to be opened by gravity acting on liquid in the channel and the gates to cause the second bottom to transition from the closed state to the open state. In some embodiments, the second bottom comprises a plurality of gates. In some embodiments, the apparatus further comprises one or more paddle wheels, turbines, or flywheels configured to be turned by liquid exiting the second bottom when the second bottom is in the open state. In some embodiments, the paddle wheel, turbine, or flywheel is coupled to the second partition to move the second partition in the upstream direction. In some embodiments, the second bottom is coupled to the second partition such that the second bottom is permitted to transition from the closed state to the open state after the second partition has decreased the flow velocity of a mass of water to zero. In some embodiments, the second partition is configured to be alternated between: (i) a closed state in which the second partition will move in the downstream direction if a mass of fluid (e.g., liquid) flows into the channel; and (ii) an open state in which the second partition will permit liquid to flow through the second partition; and where the second bottom is coupled to the second partition such that the second bottom is in the closed state when the second partition is in the closed state.

Some embodiments of the present apparatuses further comprise: a first barrier coupled to the inlet of the first channel (e.g., where the first barrier is configured to be alternated between: (i) a closed state in which liquid is substantially prevented from flowing into the first channel; and (ii) an open state in which liquid is permitted to flow into the first channel); and a second barrier coupled to the inlet of the second channel (e.g., where the second barrier is configured to be alternated between: (i) a closed state in which liquid is substantially prevented from flowing into the second channel; and (ii) an open state in which liquid is permitted to flow into the second channel. In some embodiments, the first barrier is configured to direct liquid into the second channel when in the closed state, and the second barrier is configured to direct liquid into the first channel when in the closed state. In some embodiments, the first barrier is coupled to the second barrier such that the first barrier is in the open state when the second barrier is in the closed state.

In some embodiments of the present apparatuses, the length of the encapsulation channel is adjustable. Some embodiments further comprise: a controller configured to adjust the length of the encapsulation channel responsive to changes in flow rate of water entering the inlet.

In some embodiments, the exhaust mechanism is configured to intake liquid flowing adjacent to the channel to exhaust the mass of fluid (e.g., liquid). In some embodiments of the present apparatuses, the exhaust mechanism a second channel having an inlet and an outlet, and the apparatus further comprises: a first barrier between the first channel and the second channel (e.g., where the first barrier is configured to be alternated between: (i) a closed state in which liquid is substantially prevented from flowing from the second channel into the first channel; and (ii) an open state in which liquid is permitted to flow from the second channel into the first channel); and where the partition is configured to be alternated between: (i) a closed state in which the partition will move in the downstream direction if a mass of fluid (e.g., liquid) flows into the channel; and (ii) an open state in which the partition will permit liquid to flow through the partition; and where the first barrier is coupled to the partition such that the first barrier is in the closed state when the partition moves in the downstream direction. Some embodiments further comprise: a second barrier extending across the second channel, the second barrier disposed between the first barrier and the outlet of the second channel, and the second barrier configured to be alternated between: (i) an open state in which liquid is permitted to flow out of the second channel through the outlet; and (ii) a closed state in which the second barrier is configured to resist liquid flow out of the second channel through the outlet. In some embodiments, the second barrier is coupled to the partition such that the second barrier is in the closed state when the partition moves in the upstream direction.

Some embodiments of the present apparatuses further comprise: a paddle wheel, turbine, or flywheel configured to be turned by liquid exiting the second channel, the paddle wheel, turbine, or flywheel coupled to the first barrier and the second barrier, and configured to: (i) move the first barrier between the closed state and the open state, and (ii) move the second barrier between the open state and the closed state. In some embodiments, the paddle wheel, turbine, or flywheel is coupled to the partition to move the partition in the upstream direction. In some embodiments, the first barrier is coupled to the partition such that the first barrier is permitted to transition from the closed state to the open state after the partition has decreased the flow velocity of a mass of water to zero.

In some embodiments, the present apparatuses are used (e.g., as in a system) and/or shipped in combination with one or more flow resistance modifiers (FRMs) configured to be disposed in a river or other flowing waterway with the apparatus to resist the flow of water around the apparatus. In some embodiments, the one or more FRMs comprise a structure having an overall density that is less than the density of water. In some embodiments, one or more characteristics of the one or more FRMs are adjustable to vary the resistance to flow. In some embodiments, the one or more FRMs comprise a balloon or bag. In some embodiments, the one or more FRMs are configured to be tethered to the bottom of a river or other flowing waterway. In some embodiments, the one or more FRMs are movably coupled to the bottom of a river or other flowing waterway.

Some embodiments of the present systems comprise a plurality of the present apparatuses coupled to a common energy sink.

Some embodiments of the present methods comprise: receiving kinetic energy from the partition of one of the present apparatuses; where the apparatus is disposed in fluid communication with a body of water such that the inlet can receive liquid from the body of water through the first end of the channel(s). In some embodiments, the apparatus is configured to receive liquid via a dam. In some embodiments, the apparatus is configured to receive liquid via one or more penstocks. In some embodiments, the bottom of the apparatus is not submerged in liquid. In some embodiments, the apparatus is at least partially submerged in a river or other flowing waterway. In some embodiments in which the apparatus is used in combination with one or more FRMs, the one or more FRMs are disposed between the apparatus and at least one bank of the river or other flowing waterway. In some embodiments, the one or more FRMs are tethered to the bottom of the river or other flowing waterway.

Some embodiments of the present methods comprise: receiving kinetic energy from the partition of one of the present apparatuses; where the apparatus is disposed in fluid communication with a body of water having tidal flows such that the tidal flows direct liquid toward the first end of the channel(s); and where the apparatus is submerged in the body of water.

Some embodiments of the present systems comprise: an embodiment of the present apparatuses; and one or more mechanical energy-storage devices coupled to the partition of the apparatus, each mechanical energy-storage device comprising: an input shaft; an input gear coupled in fixed relation to the input shaft; an outer gear; an inner planetary gear having a smaller diameter than the outer gear, the inner planetary gear configured to engage the input gear such that rotation of the input gear in a first direction causes rotation of the inner planetary gear in a second direction; and a coil spring coupled to the outer gear and the inner planetary gear such that rotation of the inner planetary gear in the second direction without rotation of the outer gear will charge the spring; where the input shaft is coupled to the partition such that movement of the partition causes rotation of the input gear in the first direction. In some embodiments, the one or more mechanical energy-storage devices each further comprises: a ratchet configured to permit the inner planetary gear to rotate in the second direction, and prevent the inner planetary gear from rotating in the first direction. In some embodiments, the one or more mechanical energy-storage devices each further comprises: an output gear; and where the outer gear is coupled to the output gear such that rotation of the outer gear in the second direction will cause rotation of the output gear in the first direction, the outer gear having more teeth than the output gear. In some embodiments, the one or more mechanical energy-storage devices each further comprises: a rotation controller configured to permit or prevent rotation of the outer gear.

Any embodiment of any of the present apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are not drawn to scale (unless otherwise noted).

FIGS. 16A-16B depict a top cross-sectional view of a fourth embodiment of the present apparatuses configured such that the length of an encapsulation channel can be varied (e.g., in response to detected speed or rate of flow, such as, for example, in a flowing waterway in which the apparatus is disposed).

FIGS. 18A-18D depict side views of a sixth embodiment of the present apparatuses that includes a temporary energy storage mechanism with ballast members for to temporarily store energy imparted by a fluid flowing into each of two encapsulation channels.

FIGS. 19A-19K depict various views of a seventh embodiment of the present apparatuses that is especially suitable for wind energy extraction.

DESCRIPTION OF ILLUSTRATIVE EMBODIMENTS

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any embodiment of the present apparatuses, kits, and methods, the term "substantially" may be substituted with "within [a percentage] of" what is specified, where the percentage includes 0.1, 1, 5, and/or 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, an apparatus, device or system that is configured in a certain way is configured in at least that way, but it can also be configured in other ways than those specifically described.

Figure 1A:
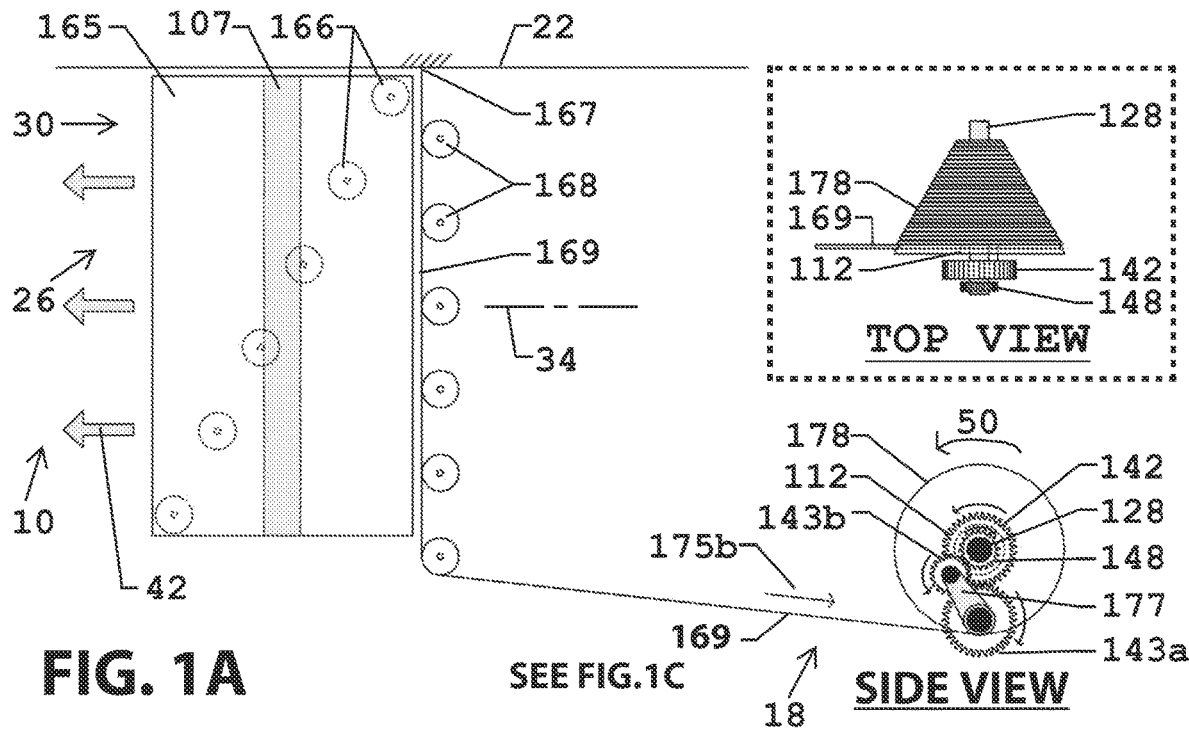
FIGS. 1A-1B depict cutaway side views of one embodiment of the present apparatuses for extraction of energy from moving fluids.
Figure 1B:
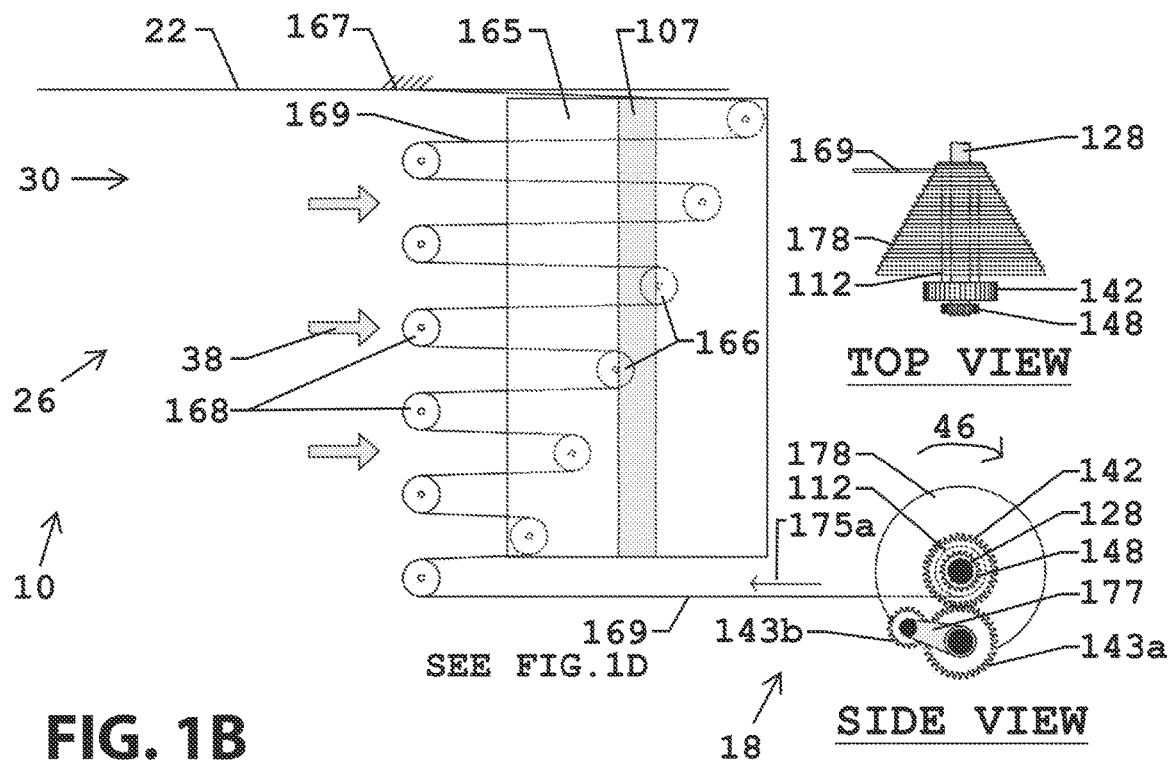
Figure 1C:
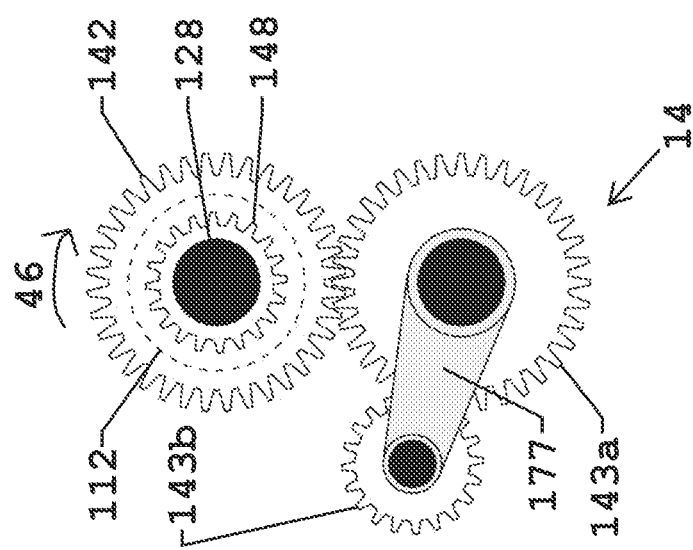
FIGS. 1C-1D depict side views of a gear arrangement for a transfer mechanism for coupling the apparatus of FIGS. 1A-1B to a load.
Figure 1D:
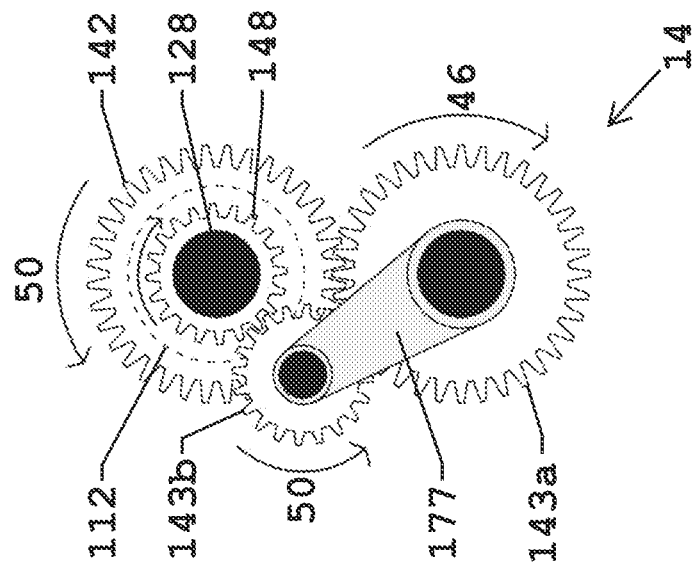

Referring now to the drawings, and more particularly to FIGS. 1A-1D, shown therein and designed by the reference numeral 10 is one embodiment of the present apparatuses for extraction of energy from moving fluids. FIGS. 1C-1D depict side views of a gear arrangement 14 of a transfer mechanism 18 for coupling the apparatus 10 to a load (e.g., a shaft 128), as shown in FIGS. 1A and 1B. In the embodiment shown, apparatus 10 comprises a body 22 defining an encapsulation channel 26 having an inlet 30. In the embodiment shown, channel 26 includes a central longitudinal axis 34. In the embodiment shown, apparatus 10 comprises a partition 107 coupled to channel 26 such that partition 107 can move in a (e.g., linear) downstream direction 38 (e.g., parallel to longitudinal axis 34) that extends away from inlet 30, or in an (e.g., linear) upstream direction 42 (e.g., parallel to longitudinal axis 34) that extends toward inlet 30. In this embodiment, body 22 and/or partition 107 are configured to encapsulate or confine an incompressible (e.g., substantially incompressible) flow of fluid entering channel 26 (e.g., to confine a mass of flowing water flowing into the channel) such that the kinetic energy of the mass is focused on and directed toward partition 107. In the embodiment shown, partition 107 is configured to be coupled to a load (e.g., one or more generators via shaft 128) such that if a mass of fluid (e.g., liquid) flows into channel 26 with an initial flow velocity in direction 38, the partition will decrease the flow velocity of the mass (of liquid) to zero (and/or less than zero, such as, for example, may cause some portion of the liquid to flow in direction 42) and transfer a portion (e.g., up to and including substantially all) of the kinetic energy of the mass of fluid to the load (e.g., via shaft 128). In the embodiment shown, partition 107 is coupled to shaft 128 via a transfer mechanism 18. In the embodiment shown, channel 26 has a substantially-closed cross-section along at least a portion of its length (e.g., 66a, 74a, or both of 66a and 74a (FIG. 2)) and during at least some portion of its operation, such as, for example, during the time that a partition (e.g., 107, 107a, 107b) is moving in a downstream direction (e.g., 38, 38a, 38b). For example, in embodiments with an openable bottom (e.g., 78a (FIGS. 2-3)) or an openable barrier (e.g., 86b (FIG. 5)) that can be actuated to open a portion of the cross-section of the channel, the apparatus is configured such that the openable bottom or barrier is in its closed configuration such that the channel (e.g., 26, 26a, 26b (FIGS. 2-3, 5)) has a substantially closed cross-section along its length while the corresponding partition (e.g., 107, 107a, 107b (FIGS. 2-3, 5)) is moving in a downstream direction (e.g., 38, 38a, 38b (FIGS. 2-3, 5)) such that the incoming fluid flow can be substantially encapsulated within the channel as the partition moves in the downstream direction.

In some embodiments, the transfer mechanism can be configured such that a unit of linear motion of partition 107 in downstream direction 38 can generate 4 or more (e.g., 4, 5, 6, 7, 8, or more) units (e.g., linear units) of motion at the load. For example, in the embodiment shown, transfer mechanism 18 comprises a plurality of first pulleys 168 coupled in fixed relation to body 22 such that the plurality of first pulleys are spaced apart from one another across a transverse dimension (e.g., height, as shown) of channel 26; a plurality of second pulleys 166 coupled in fixed relation to partition 107 such that the plurality of second pulleys are spaced apart from one another across a transverse dimension (e.g., height, as shown) of the partition. In this embodiment, second pulleys 166 are offset from first pulleys 168 such that pulleys 166 can move between and/or past pulleys 168 as partition 107 moves in downstream direction 38 (e.g., from the position of FIG. 1A to the position of FIG. 1B). In this embodiment, apparatus 10 comprises plates or side panels 165 coupled in fixed relation to each side of partition 107. Plates 165 are configured to maintain the orientation of partition 107 in channel 26 (e.g., with partition 107 substantially perpendicular to directions 38 and 42. In this embodiment, first pulleys 168 are coupled in fixed relation to at least one of plates 165 and staggered from top to bottom, as shown, in an angled line.

In the embodiment shown, transfer mechanism 18 also comprises a cable 169 extending between first pulleys 168 and having a first end 167 (e.g., coupled in fixed relation to body 22) and a second end coupled to shaft 128 (e.g., via a cone spool 178, as shown). In this embodiment, transfer mechanism 18 is configured such that if partition 107 moves in downstream direction 38, first pulleys 168 and second pulleys 166 will engage cable 169 to pull a length of the cable away from shaft 128 (and cone spool 178) in direction 175a and apply torque to shaft 178 (e.g., via cone spool 178), as is illustrated from FIG. 1A to FIG. 1B. In this embodiment, the configuration of pulleys 166 (e.g., longitudinally spaced apart from one another to along a length extending parallel to longitudinal axis 34) results in the length of cable 169 pulled away from spool being 8 times or more (e.g., 10 times or more) the length of linear motion or travel of partition 107 in direction 38 (between FIG. 1A and FIG. 1B). Spool 178 is coupled to shaft 128 by a one-way clutch 112 that is configured to (i) engage when cable 169 is pulled in direction 175a to permit spool 178 to rotate in direction 46 with shaft 128 and apply torque to shaft 128, and (ii) disengage to permit spool 178 to rotate in direction 50 opposite to the direction of rotation of shaft to permit cable 169 to be re-wound onto spool 178 in direction 175b and move partition 107 in upstream direction 42, as described in more detail below. As used in this disclosure, linear motion at the load refers to the length of motion at the load at the point at which the force is transferred to the load (e.g., the length of the arc swept by the point on the load at which the force is transferred to the load). For example, in the embodiment shown, the length of linear motion is equal to the length of cable 169 that is unwound from spool 178.

In the embodiment shown, apparatus 10 is configured to operate as follows. Apparatus 10 can be disposed relative to a body of water (e.g., in a flowing river or canal, at the base of a dam, coupled to a ship or barge such that the apparatus extends below the surface of water on which the ship or barge is floating, and/or the like) such that a mass of water (which may, for example, contain other liquids or particulates) flows into channel 26 when partition 107 is in an upstream position (e.g., FIG. 1A) such that the water will collide with partition 107 and apply a force to partition 107 in downstream direction 38. As partition 107 moves in downstream direction 38, the moment of inertia of the load (e.g., a generator via shaft 128) and the parts coupling it to partition 107 resists movement of partition 107 in downstream direction 38 and (e.g., abruptly) reduce the velocity the mass of fluid (e.g., liquid) in direction 38 to zero. As a fluid, some portion of the water may, once its velocity is reduced to zero in direction 38, flow in directions with a negative component of the flow velocity (e.g., may flow in a direction that has a velocity component in upstream direction 42). As such, "decrease [or decreasing] the flow velocity of the mass to zero" (38) is used to describe the velocity of the aggregate mass of water, rather than characterizing every portion of the water. As the flow velocity of the mass of water is decreased to zero, a portion (e.g., greater than 50, 60, 70, 80, 90, or more percent) of the kinetic energy of the mass of water is transferred to the load (e.g., shaft 128) via transfer mechanism 18 or other suitable structures.

In the embodiment shown, the mass of water moving at a given flow velocity is confined or encapsulated in channel 26 such that the water slams into partition 107 and propels it downstream (direction 38) in the channel. As the mass of water (or other fluid) rams into the partition, the load to which the partition is coupled provides sufficient resistance to stop the water (e.g., at or before the partition reaches a mechanical limit of the channel). The load can be provided by one or a more generators, and shaft 128 may be coupled to a plurality of generators that can be brought on-line in varying numbers to stop the water (e.g., the number of generates may be varied with flow velocity, initial rotational speed of shaft 128, and the like). For example, generators and/or other energy accumulators or storage devices (e.g., mechanical energy-storage devices) can added in sequence—increasing resistance until the mass of water at the accelerated velocity is stopped—thereby extracting a large portion (e.g., nearly all) of the axial kinetic energy from the moving mass of water and transferring it directly to the generators and/or other energy accumulators or storage devices (e.g., via shaft 128). In other embodiments, a single generator can be configured to withstand higher forces and/or rotational speeds such that a single generator can provide a sufficient load to stop the partition. Regardless of the number of configuration of generators and/or mechanical energy storage devices with which apparatus 10 is implemented, when the rotational acceleration of shaft 128 (and the assembly of generators and/or mechanical energy-storage devices to which shaft 128 is coupled) reaches a value where the force needed for further angular acceleration [τ=I α], equals the level of the incoming [F=ma] from the encapsulated inflowing mass—all forward flow in the encapsulation vessel is stopped, and the axial kinetic energy of the combined (fluid+moving parts) mass is transferred to shaft 128 via transfer mechanism 18 or other suitable structures.

In the embodiment shown, as partition 107 moves in direction 38, pulleys 168 engage cable 169 and weave it between pulleys 166 and 168, as shown in FIG. 1B, drawing cable 169 off spool 178, engaging clutch 112 and driving shaft 128 (e.g., and one or more generators and/or other energy accumulators or storage devices). The resulting rotational speed of output shaft 128 is dictated by the number and spacing of pulleys 166, the number of pulleys 168, and the size of cone spool 178. For example, in the embodiment shown, cone spool 178 provides a relatively larger moment-arm about shaft 128 to increase the torque about shaft 128 in the early (and higher velocity) movement of partition 107 (FIG. 1A), and a relatively smaller moment-arm about shaft 128 in the later (and slower velocity) movement of partition 107 (FIG. 1B). As the rotational velocity of shaft 128 increases, the greater ratio is needed from transfer mechanism 18 between linear motion of partition 107 and cable 169 (or other linear motion at shaft) to enable the transfer of kinetic energy from partition 107 to shaft 128 (e.g., the greater angular acceleration is required to increase the rotational speed of shaft 128). As such, in some embodiments in which a simpler transfer mechanism 18 is desired, shaft 128 can be coupled to a shaft of a generator by one or more other transfer mechanisms (not shown, but such as, for example, a transmission such as a continuously variable transmission (CVT) and/or transmissions disclosed in U.S. patent application Ser. No. 12/475,277, filed May 29, 2009).

In the embodiment shown, transfer mechanism 18 is also configured to return partition 107 to an upstream position (move the partition in upstream direction 42). In the embodiment shown, a gear 148 is coupled in fixed relation to shaft 128, and transfer mechanism 18 comprises a gear 142 coupled in fixed relation to spool 178, a gear 143a engaged with gear 142, a swing arm 177 having a first end having a common pivot point with gear 143a, and a drive gear 143b engaged with gear 143a and pivotably coupled to a second end of swing arm 177. In the embodiment shown, as cable 169 is pulled from spool 178 and shaft 128 rotates in direction 46 swing arm 177 is in an open position (FIG. 1D) in which gear 143b is engaged only with gear 143a. Once cable 169 stops causing spool 178 to rotate, swing arm 177 moves to a closed position (FIG. 1C) in which gear 143b engages gear 148. As shown, shaft 128 and gear 148 continue to rotate in direction 46, causing gear 143b to rotate in direction 50. Gear 143b thereby causes gear 143a to rotate in direction 46 which, in turn, causes gear 142 and spool 178 to rotate in direction 50. As spool 178 rotates in direction 50, cable 169 is re-wound onto the spool, and thereby engaging pulleys 166 and 168 to move partition 107 in upstream direction 42. Once partition 107 reaches its upstream position (FIG. 1A) and spool 178 again stops rotating, swing arm 177 returns to its open position (FIG. 1D), disengaging gear 143b from gear 148.

The embodiment of apparatus 10 depicted in FIGS. 1A-1D can be deployed in a variety of configurations and/or placements with naturally flowing water to extract and store energy from moving fluids (e.g., natural slope and/or penstock flows, rivers, canals, sea passages, channels, open-sea or tidal currents, and the like), as described in more detail below.

Figure 2:
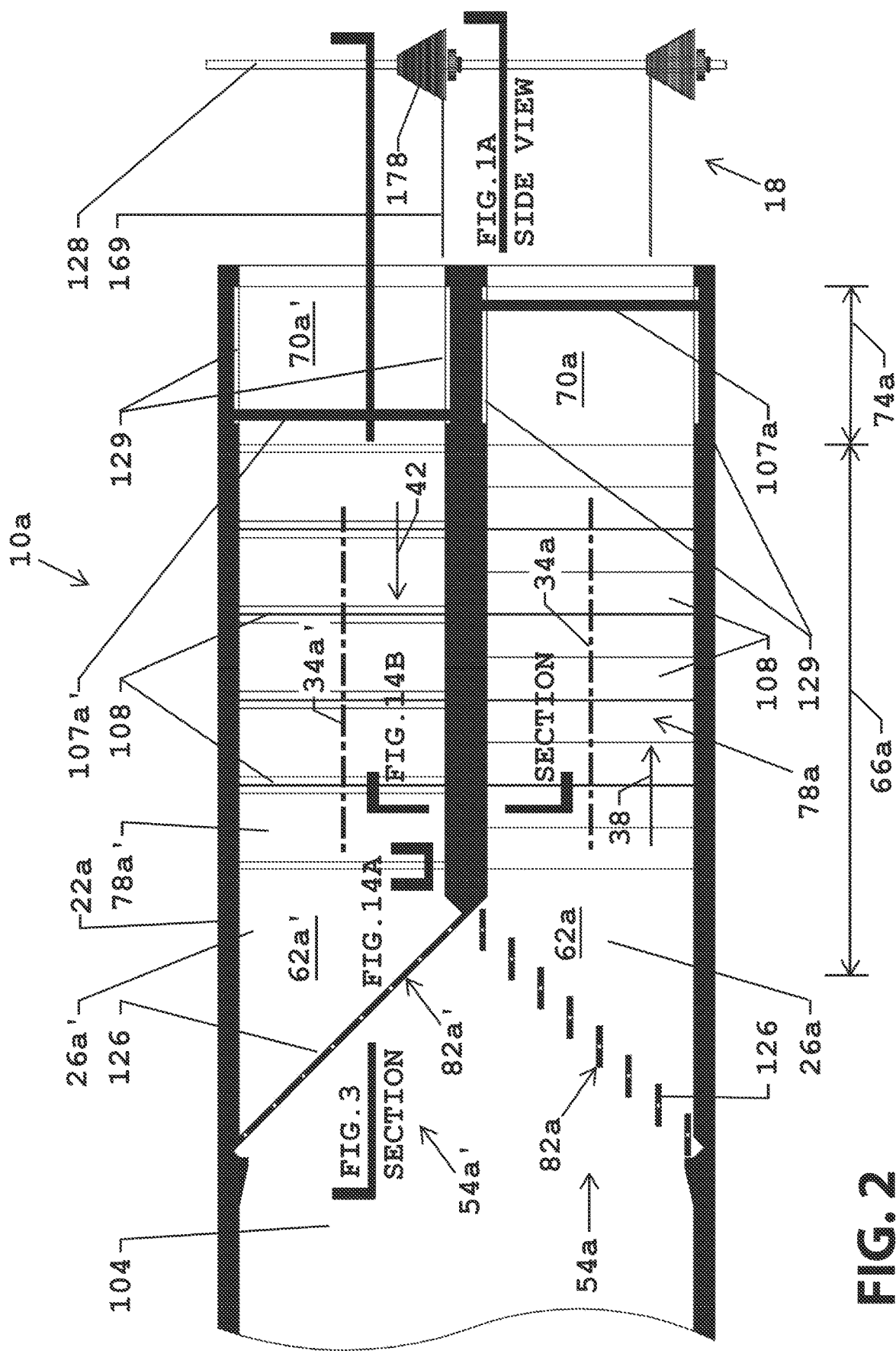
FIGS. 2-3 depict cross-sectional top and side views, respectively, of a second embodiment of the present apparatuses.
Figure 3:
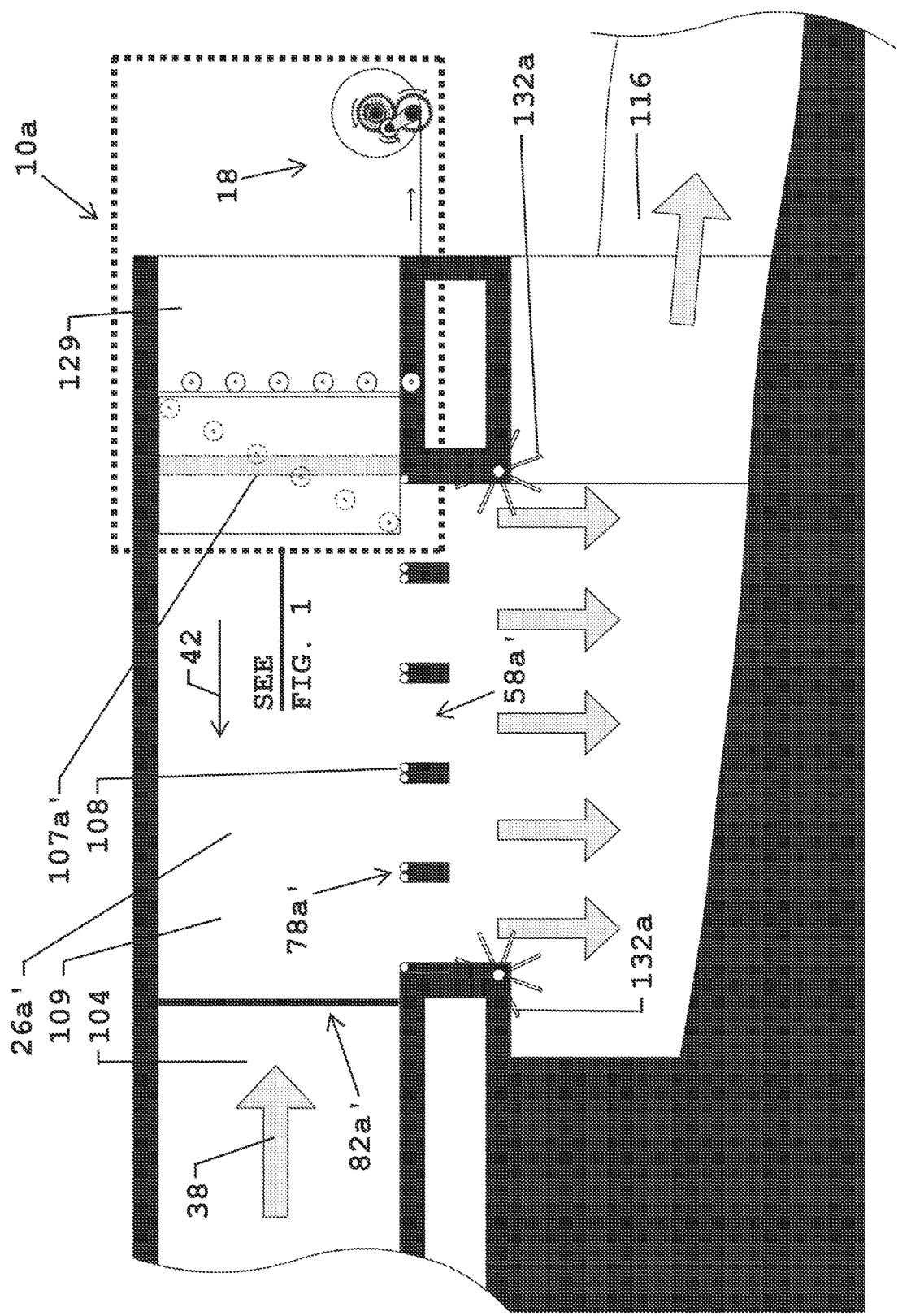

FIGS. 2-3 depict top and side views, respectively, of a second embodiment 10a of the present apparatuses. In the embodiment shown, apparatus 10a comprises: a body 22a defining a channel 26a (e.g., with a substantially closed and/or closable cross-section, as described above) having an inlet 54a (FIG. 2) and an outlet 58a (FIG. 3). In the embodiment shown, channel 26a comprises a central longitudinal axis 34a, a flow section 62a having a length 66a extending from inlet 54a toward the outlet and toward the downstream end of the channel where the flow section meets a production section 70a having a length 74a extending from flow section 62a. In the embodiment shown, length 66a of the flow section is at least twice length 74a of the production section. In other embodiments, length 66a may be more or less than twice (e.g., equal to) length 74a and/or the flow section may be omitted (e.g., have a zero length). As with apparatus 10, apparatus 10a comprises a partition 107a coupled to channel 26a (e.g., coupled to body 22a in production section 70a) such that partition 107a can move in a (e.g., linear) downstream direction 38 (e.g., parallel to longitudinal axis 34a) that extends away from inlet 54a, or in an (e.g., linear) upstream direction 42 that extends toward inlet 54a (e.g., parallel to longitudinal axis 34a). For example, in the embodiment shown, production section 70a comprises a track assembly 129 configured to movably couple partition 107a to body 22a. In the embodiment shown, partition 107a is configured to be coupled to a load (e.g., one or more generators via shaft 128) such that if a mass of fluid (e.g., liquid) flows into channel 26a with an initial flow velocity in direction 38, the partition will decrease the flow velocity of the mass (of liquid) to zero (and/or less than zero, such as, for example, may cause some portion of the liquid to flow in direction 42) and transfer a portion (e.g., up to and including substantially all) of the kinetic energy of the mass of fluid to the load (e.g., via shaft 128). In this embodiment, partition 107a is coupled to shaft 128 via a transfer mechanism 18 or other suitable structure.

In some embodiments, transfer mechanism 18 can be configured such that a unit of linear motion of partition 107a in downstream direction 38 can generate 4 or more (e.g., 4, 5, 6, 7, 8, or more) units (e.g., linear units) of motion at the load. Although certain details are omitted from FIGS. 2 and 3, in the embodiment shown, transfer mechanism 18 is as described above with reference to FIGS. 1A-1D. In the embodiment shown, apparatus 10a comprises an exhaust mechanism configured to, after the flow velocity reaches zero, exhaust the mass of fluid (e.g., liquid) from the channel. For example, in the embodiment shown, the exhaust mechanism comprises an openable bottom 78a in (e.g., flow section 62a of) channel 26a. In this embodiment, bottom 78a is configured to be alternated between: (i) a closed state (as shown in FIG. 2) in which liquid is substantially prevented from flowing out of the channel through bottom 78a; and (ii) an open state (as shown for channel 26a') in which liquid is permitted to flow out of the channel through the bottom. Bottom 78a is coupled to partition 107a such that bottom 78a is in the closed state when the partition moves in downstream direction 38 (as shown in FIG. 2). Bottom 78a can also be coupled (e.g., via one or more levers, links, gears, and/or the like) to partition 107a such that bottom 78a is in the open state when partition 107a moves in upstream direction 42 (as shown for bottom 78a'), and/or such that bottom 78a is permitted to transition from the closed state to the open state after partition 107a has decreased the flow velocity of a mass of water to zero (e.g., after partition 107a has stopped traveling in downstream direction 38). At least a portion of the exhaust mechanism can be more directly coupled to the body than to the partition. For example, in the embodiment shown, bottom 78a is not carried by the partition, and is instead includes a plurality of gates that pivotally coupled to body 22a around substantially fixed pivot axes. In the embodiment shown, bottom 78a comprises one or more louvers or gates configured to be opened by gravity (e.g., driving the water in the channel downward) when partition 107a reaches the end of its downstream travel and trips a lever or other actuator to release the louvers or gates of bottom 78a to cause bottom 78a to transition from the closed state to the open state. For example, in the embodiment shown, bottom 78a comprises a plurality of louvers or gates 108 that are configured to be released once partition 107a stops in a downstream position (e.g., just after the position depicted in FIG. 2) to release the water from channel 26a (e.g., to facilitate the return of partition 107a to the upstream position).

In some embodiments, the potential energy of the water in channel 26a can be harvested to move partition 107a to its upstream position. For example, in the embodiment shown, apparatus 10a comprises one or more paddle wheels, turbines, or flywheels 132a (FIG. 3) configured to be turned by the liquid exiting bottom 78a when bottom 78a is in the open state, and paddle wheel(s), turbine(s), or flywheel(s) 132a can be coupled (e.g., via one or more levers, links, gears, and/or the like) to partition 107a to move partition 107a in the upstream direction as water drains from channel 26a. In this embodiment, the openable bottom permits the water to be discharged from channel 26a by gravity. This occurs as the mechanical locks for bottom 78a are released by partition 107a: the gravity load of the water forces the gates of bottom 78a to open, and because these gates are geared to the gates of bottom 78a' (e.g., as depicted in and described with reference to FIGS. 14A and 14B) then the gates of bottom 78a' close as the gates of bottom 78a open. Additionally, in this embodiment, as the gates of bottom 78a open, barrier 82a closes and barrier 82a' opens (e.g., as also depicted in and described with reference to FIGS. 14A and 14B).

In the embodiment shown, body 22a also defines a second channel 26a' having an inlet 54a' and an outlet 58a' (FIG. 3). In the embodiment shown, channel 26a' also includes a central longitudinal axis 34a', a flow section 62a' having a length 66a extending from inlet 54a' toward the outlet, and a production section 70a' having a length 74a extending from flow section 62a'. In the embodiment shown, length 66a of the flow section is at least twice length 74a of the production section. In other embodiments, length 66a may be more or less than twice (e.g., equal to) length 74a and/or the flow section may be omitted (e.g., have a zero length). Apparatus 10a also comprises a second partition 107a coupled second channel 26a' (e.g., coupled to body 22a in production section 70a') such that partition 107a' can move in a linear downstream direction 38 parallel to longitudinal axis 34a', or in a linear upstream direction 42 toward inlet 54a' and parallel to longitudinal axis 34a'. In the embodiment shown, second partition 107a' is configured to be coupled to a load (e.g., one or more generators via shaft 128) such that if a mass of fluid (e.g., liquid) flows into second channel 26a' with an initial flow velocity in direction 38, the second partition will decrease the flow velocity of the mass (of liquid) to zero (and/or less than zero, such as, for example, may cause some portion of the liquid to flow in direction 42) and transfer a portion (e.g., up to and including substantially all) of the kinetic energy of the mass of fluid to the load (e.g., via shaft 128). In this embodiment, second partition 107a' is coupled to shaft 128 via a transfer mechanism 18 or other suitable structures.

In some embodiments, transfer mechanism 18 can be configured such that a unit of linear motion of second partition 107a' in downstream direction 38 can generate 4 or more linear units of motion at the load. Although certain details are omitted from FIGS. 2 and 3, in the embodiment shown, transfer mechanism 18 is as described above with reference to FIGS. 1A-1D. In the embodiment shown, body 22a comprises a second exhaust mechanism configured to, after the flow velocity reaches zero, exhaust the mass of fluid (e.g., liquid) from the second channel. For example, in the embodiment shown, the second exhaust mechanism comprises a second openable bottom 78a' in (e.g., flow section 62a' of) second channel 26a'. As described above for the first exhaust mechanism, in this embodiment, at least a portion of the second exhaust mechanism is more directly coupled to the body than to the second partition. In this embodiment, second bottom 78a' is configured to be alternated between: (i) a closed state (as shown for bottom 78a) in which liquid is substantially prevented from flowing out of the second channel through second bottom 78a; and (ii) an open state (as shown) in which liquid is permitted to flow out of the second channel through the bottom. Second bottom 78a' is coupled to second partition 107a' such that second bottom 78a' is in the closed state when the partition moves in downstream direction 38 (as shown for bottom 78a). Second bottom 78a' can also be coupled (e.g., via one or more levers, links, gears, and/or the like) to second partition 107a' such that second bottom 78a' is in the open state when second partition 107a' moves in upstream direction 42 (as shown), and/or such that bottom 78a' is permitted to transition from the closed state to the open state after second partition 107a' has decreased the flow velocity of a mass of water to zero (e.g., after second partition 107a' has stopped traveling in downstream direction 38).

In the embodiment shown, second bottom 78a' comprises one or more louvers or gates configured to be opened by liquid in second channel 26a' to cause the bottom to transition from the closed state to the open state. For example, in the embodiment shown, bottom 78a' comprises a plurality of louvers or gates 108 that are configured to be released once second partition 107a' stops in a downstream position to release the water from second channel 26a' (e.g., to facilitate the return of second partition 107a' to the upstream position). In some embodiments, the potential energy of the water in second channel 26a' can be harvested to move second partition 107a' to its upstream position. For example, in the embodiment shown, apparatus 10a comprises one or more paddle wheels, turbines, or flywheels 132a (FIG. 3) configured to be turned by liquid exiting second bottom 78a' when second bottom 78a' is in the open state, and paddle wheel(s), turbine(s), or flywheel(s) 132a can be coupled (e.g., via one or more levers, links, gears, and/or the like) to second partition 107a' to move second partition 107a' in the upstream direction as water drains from second channel 26a'. In the embodiments shown, first channel 26a and second channel 26a' (and first partition 107a and second partition 107a') are configured to operate in an alternating manner (e.g., first partition 107a moves downstream as second partition 107a' moves upstream). As such, in the embodiment shown, first bottom 78a is coupled to second bottom 78a' such that first bottom 78a is in the open state when second bottom 78a' is in the closed state, as shown, for example, in FIG. 2. Bottoms 78a and 78a' can be opened by any suitable mechanism. For example, in some embodiments, a pin, lever, or latch is configured to be actuated (e.g., depressed or contacted) by the respective partition 107a or 107a' when or just before the partition stops moving in downstream direction 38 (is brought to a stop by the load) to release the respective bottom 78a or 78a' to permit the water to open the respective gates 108. In other embodiments, the louvers or gates of bottoms 78a and 78a' harvest sufficient potential energy to be directly geared to barriers 82a and 82a' to actuate the bottoms 78a and 78a' and barriers 82a and 82a' without the assistance of paddle wheels, turbines, or flywheels. Bottoms 78a and 78a' can be coupled to one another such that when bottom 78a opens, bottom 78a' closes (e.g., substantially concurrently); and can be coupled to barriers 82a and 82a' such that when bottom 78a opens, barrier 82a closes and bottom 78a' opens.

In the embodiment shown, the first and second exhaust mechanisms (bottoms 78a and 78a' are configured to exhaust the stopped or spent mass of fluid (e.g., liquid) from the respective first or second channel 26a or 26a' after the flow velocity has been reduced to zero, and to exhaust the fluid more rapidly than would be possible by only opening gates in the respective partition and allowing liquid entering the inlet to re-accelerate the fluid through the partition. For example, in the embodiment shown, the respective exhaust mechanism (bottom) is configured to exhaust the mass of the liquid from the channel in less time than required for the mass to enter the inlet and be stopped (the flow velocity to be decreased to zero). For example, in some embodiments, the apparatus is configured such that the time required for liquid to enter the inlet of either channel and be stopped in that channel is one (1) second, and such that the amount of time required to exhaust the spent liquid from either channel is one (1) second or less. In such embodiments, first channel 26a can intake and stop a mass of fluid (e.g., liquid), while bottom 78a' is exhausting spent or stopped liquid from second channel 26a', such that first and second channels 26a and 26a' can function in alternating fashion. As described in more detail below, the time required to for liquid to enter the inlet of a channel and be stopped is dependent on factors such as the initial flow velocity of liquid entering the inlet (which may, for example, depend on the flow velocity of a river if the apparatus is disposed in a river).

In the embodiment shown, apparatus 10a also comprises a first barrier 82a coupled to inlet 54a of first channel 26a, and a second barrier 82a' coupled to inlet 54a' of second channel 26a'. In this embodiment, first barrier 82a is configured to be alternated between: (i) a closed state in which liquid is substantially prevented from flowing into first channel 26a; and (ii) an open state in which liquid is permitted to flow into first channel 26a'. Similarly, in this embodiment, second barrier 82a' is configured to be alternated between: (i) a closed state in which liquid is substantially prevented from flowing into second channel 26a'; and (ii) an open state in which liquid is permitted to flow into second channel 26a'. As shown in FIG. 2, in this embodiment, first barrier 82a is configured to direct liquid into second channel 26a' when the first barrier is in the closed state, and second barrier 82a' is configured to direct liquid into first channel 26a when the second barrier is in the closed state. For example, in the embodiment shown, first barrier 82a and second barrier 82a' each comprises a plurality of louvers or gates 126 that are arranged at an angle (e.g., a 45 degree angle, as shown) across the respective channel 26a or 26a'. In this embodiment, first barrier 82a is coupled to second barrier 82a' such that the first barrier is in the open state when the second barrier is in the closed state, as shown in FIG. 2.

In other embodiments, first partition 107a and/or second partition 107a' can each be configured to be alternated between: (i) a closed state in which the partition will move in the downstream direction if a mass of fluid (e.g., liquid) flows into the respective channel (26a or 26a'); and (ii) an open state in which the partition will permit liquid to flow through the partition. In such embodiments, the respective bottom (78a or 78a') can be coupled to the respective partition (107a or 107a') such that the respective bottom is in the closed state when the respective partition is in the closed state. In such embodiments, first partition 78a and/or second partition 78a' can comprises a plurality of louvers or gates (e.g., similar to those in bottoms 78a and 78a').

In this embodiment, apparatus 10a is configured such that both channels 26a and 26a' can be coupled to a penstock flow 104 (FIG. 2), as shown, and barriers 82a and 82a' alternated between open and closed states to direct water to one or the other of channels 26a and 26a'. As such, the wider flow area of penstock 104 is constricted down into the area of a single one of channels 26a and 26a', thereby increasing the flow velocity of the water entering the respective channel of apparatus 10a. Beginning with the flow being directed into channel 26a, as shown in FIG. 2, partition 107a is propelled downstream until the flow velocity of the mass of water in direction 38 is decreased to zero and the kinetic energy transferred to the load. Next, first barrier 82a closes (transitions to the closed state) and second barrier 82a' opens (transitions to the open state) such that the flow is diverted into second channel 26a' such that second partition 107a' is propelled downstream until the flow velocity of the mass of water in direction 38 is decreased to zero and the kinetic energy transferred to the load. As water flows into second channel 26a', bottom 78a in first channel 26a is opened to permit the water "stopped" in first channel 26a to flow out of the first channel (e.g., driving gears such as 156, 157, 158, and 159 shown in FIGS. 14A and 14B, and/or driving paddle wheel(s), turbine(s), or flywheel(s) 132a), and partition 107a' moves upstream to "re-charge" first partition 107a for when first barrier 82a opens again to permit water to flow into first channel 26a. As used in this disclosure, "penstock" refers to a structure that directs the confined flow of water, and need not be coupled to a dam.

As noted above, gates 108 of bottom 78a can be geared or otherwise coupled to gates 108 of second bottom 78a' such that water exiting first channel 26a forces gates 108 of first bottom 78a open and, in turn, closes gates 108 of second bottom 78a' (e.g., driven by the rotation of gates 108 of first bottom 78a falling open and driving gears 159 and 158 to cause gates 108 of bottom 78a' to close, as depicted in and described with reference to FIGS. 14A and 14B). Similarly, gates 108 of first bottom 78a can be coupled to gates 126 of barriers 82a and 82a' such that water exiting first channel 26a forces gates 108 of bottom 78a open and, in turn, closes gates 126 of first barrier 82a and opens gates 126 of second barrier 82a'. Similarly, gates 108 of second bottom 78a' can be geared or otherwise coupled to gates 108 of first bottom 78a such that water exiting second channel 26a' forces gates 108 of second bottom 78a' open and, in turn, closes gates 108 of first bottom 78a. Similarly, gates 108 of second bottom 78a' can be coupled to gates 126 of barriers 82a and 82a' such that water exiting second channel 26a' forces gates 108 of second bottom 78a' open and, in turn, closes gates 126 of second barrier 82a' and opens gates 126 of first barrier 82a. As described, the rotation of louvers or gates 108 can be used alone and/or in conjunction with the paddle wheel(s), turbine(s), or flywheel(s) 132*a* (or any number of other mechanical devices or methods) can provide power or mechanical leverage for the opening and closing of gates, moving lock pins or latches, and/or the resetting of partitions 107*a* and 107*a*'. By extracting the potential energy from the exhausted water falling out of channels 26*a* and 26*a*', the kinetic energy extracted by partitions 107*a* and 107*a*' need not be used to open and close bottoms 78*a* and 78*a*', open and close barriers 82*a* and 82*a*', and/or used to move partitions 107*a* and 107*a*' upstream.

The kinetic energy available from a water flow (assuming no loss from equipment efficiency) can be expressed by Equation 111:

$$KE = \frac{mV^2}{2} \quad [1]$$

where m is the mass of the inbound water in kilograms (kg), and V is the velocity of the inbound flow (meters/second). The mass of the inbound water can be determined with Equation [2]:

$$m = ALp \quad [2]$$

where A is the cross-sectional area of the inbound flow (e.g., of the channel within which the flow is encapsulated) in meters squared or m$^2$, L is the length of the encapsulated inbound flow (e.g., of the channel within which the flow is encapsulated) in meters, and p is the density of the water (or other liquid and/or fluid) of the inbound flow in kilograms per meter cubed or kg/m$^3$ (seawater is 1030 kg/m$^3$ & fresh water is 1000 kg/m$^3$). Combining Equations [1] and [2] yields Equation [3]:

$$KE = \frac{ALpV^2}{2} \quad [3]$$

For the configuration of FIGS. 2 and 3 in which an inbound flow is alternatingly constricted into channels with only ½ of the cross-sectional area of the inbound flow, the cross-sectional area, A, is reduced by half to 0.5(A), such that conservation of mass results in the velocity, V, doubling to 2 V. As such, Equation [3] yields Equation [4] for an individual one of channels 26*a* or 26*a*'.

$$P = \frac{.5(A)Lp(2V)^2}{2} \quad [4]$$

In operation, the water from penstock 104 is alternatingly directed into first and second channels 26*a* and 26*a*', as described above, such that partition 107*a* and 107*a*' are repeatedly moving (e.g., in opposite directions), similar to the pistons of an internal combustion engine. While this embodiment is shown in communication with penstock 104, apparatus 10*a* can be used with a variety of water flows (e.g., sufficiently sloped rivers, creeks, aqueducts, and the like) in which bottoms 78*a* and 78*a*' can be disposed above the downstream flow to permit water to be discharged from apparatus 10*a* by gravity into the downstream flow.

Figure 4:
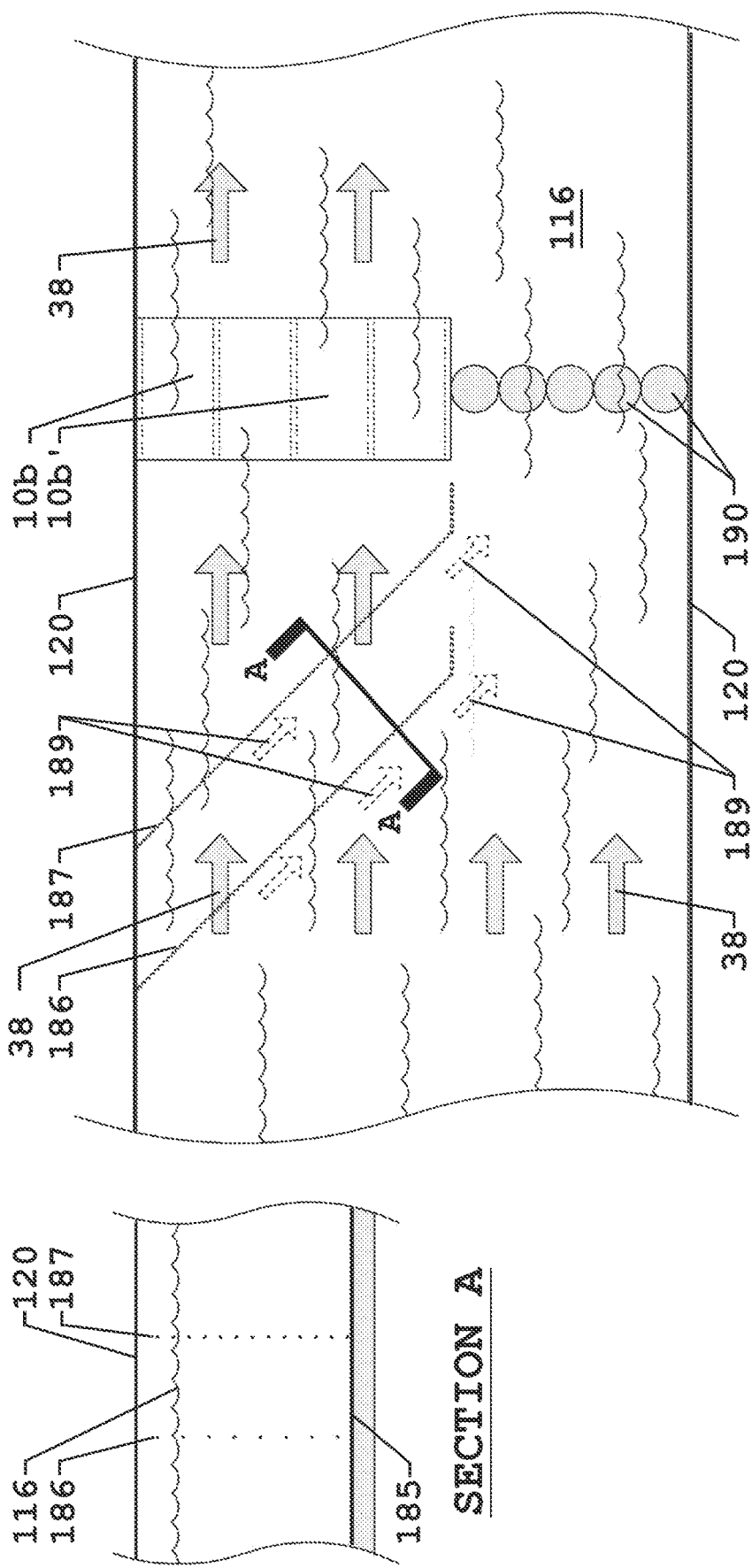
FIG. 4 depicts a top view and an inset cross-sectional view of a third embodiment of the present apparatuses and a plurality of flow resistance modifiers (FRMs) disposed in a flowing waterway.
Figure 5:
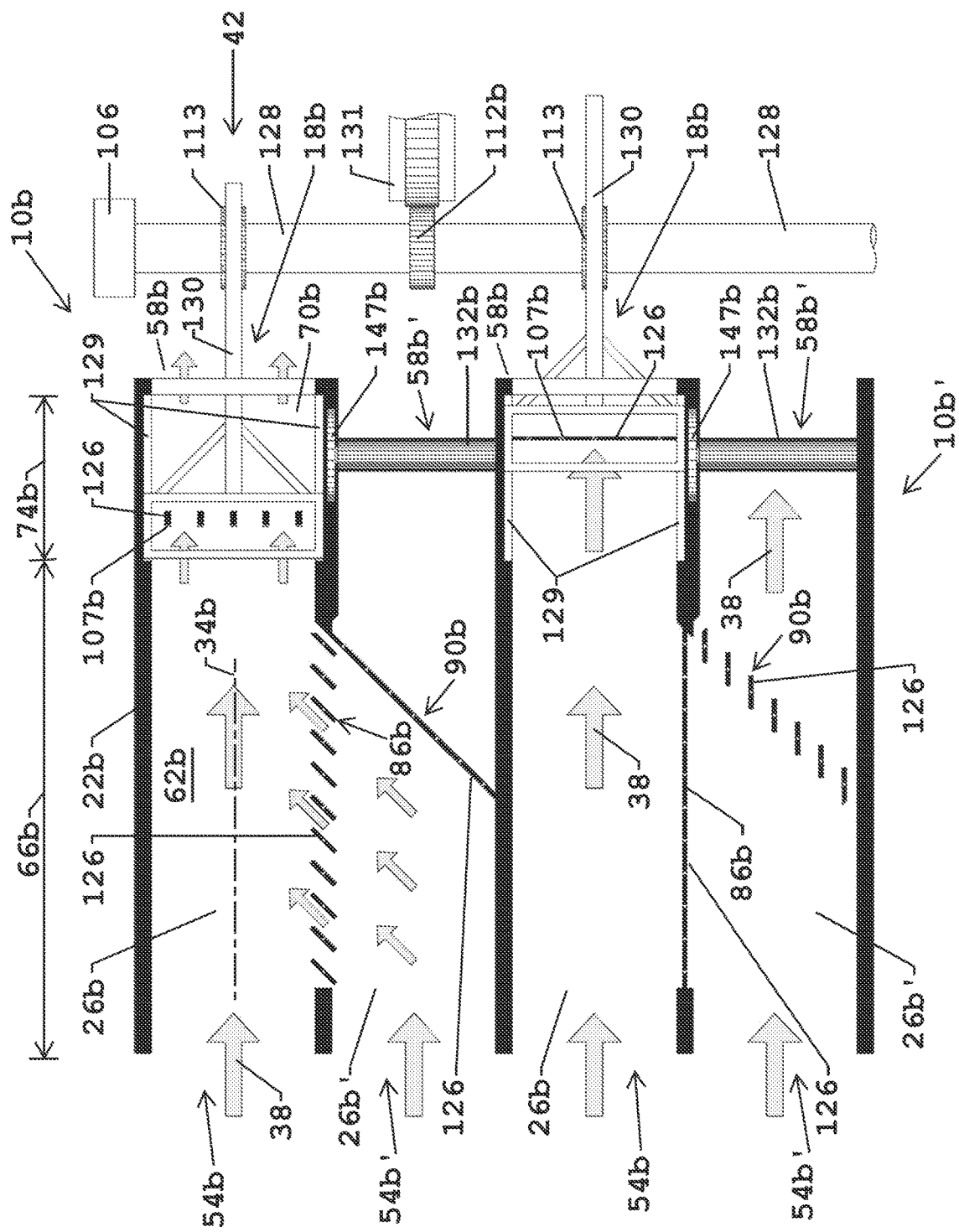
FIG. 5 depicts a cross-sectional top view of the third embodiment of the present apparatuses.

FIG. 4 depicts a top view of a third embodiment 10*b* of the present apparatuses shown in flowing waterway (e.g., a river) with a plurality of flow resistance modifiers (FRMs); and FIG. 5 depicts a top view of apparatus 10*b*. In the embodiment shown, apparatus 10*b* comprises: a body 22*b* defining a channel 26*b* (e.g., with a substantially closed and/or closable cross-section, as described above) having an inlet 54*b* and an outlet 58*b*. In the embodiment shown, channel 26*b* includes a central longitudinal axis 34*b*, a flow section 62*b* having a length 66*b* extending from inlet 54*b* toward the outlet, and a production section 70*b* having a length 74*b* extending from flow section 62*b* (e.g., from flow section 62*b* to outlet 58*b*). In the embodiment shown, length 66*b* of the flow section is at least twice length 74*b* of the production section. In other embodiments, length 66*b* may be more or less than twice (e.g., equal to) length 74*b* and/or the flow section may be omitted (e.g., have a zero length).

As with apparatuses 10 and 10*a*, apparatus 10*b* comprises a partition 107*b* coupled to channel 26*b* (e.g., coupled to body 22*b* in production section 70*b*) such that partition 107*b* can move in a (e.g., linear) downstream direction 38 that extends toward outlet 58*b* (e.g., parallel to longitudinal axis 34*b*), or in an (e.g., linear) upstream direction 42 that extends toward inlet 54*b* (e.g., parallel to longitudinal axis 34*a*). In the embodiment shown, partition 107*b* is configured to be coupled to a load (e.g., one or more generators via shaft 128) such that if a mass of fluid (e.g., liquid) flows into channel 26*b* with an initial flow velocity in direction 38, the partition will decrease the flow velocity of the mass (of liquid) to zero (and/or less than zero, such as, for example, may cause some portion of the liquid to flow in direction 42) and transfer a portion (e.g., up to and including substantially all) of the kinetic energy of the mass of fluid to the load (e.g., via shaft 128). FIGS. 4 and 5 depict a system of multiple apparatuses 10*b* coupled to a common load or energy sink (e.g., via shaft 128). The second apparatus is labeled with the reference numeral 10*b*', but is substantially similar to apparatus 10*b*. In some embodiments, a plurality of apparatuses 10*b* can be disposed in sequence along a portion of the length of a waterway (e.g., with spaces between sequential apparatuses to permit the velocity of the flowering water to increase its velocity between apparatuses).

In the embodiment shown, apparatus 10*b* comprises an exhaust mechanism configured to intake liquid flowing adjacent to the channel to exhaust the mass of fluid (e.g., liquid). More particularly, in this embodiment, the exhaust mechanism comprises a second channel 26*b*' (e.g., defined by body 22*b*) having an inlet 54*b*' and an outlet 58*b*'. In this embodiment, apparatus 10*b* also comprises a first barrier 86*b* between first channel 26*b* and second channel 26*b*', and in (e.g., flow section 62*b* of) the first channel, as shown. First barrier 86*b* is configured to be alternated between: (i) a closed state (as shown for apparatus 10*b*') in which liquid is substantially prevented from flowing from second channel 26*b*' into first channel 26*b*; and (ii) an open state (shown for apparatus 10*b*) in which liquid is permitted to flow from second channel 26*b*' into first channel 26*b*. For example, first barrier 86*b* comprises a plurality of louvers or gates 126, as shown. In this embodiment, partition 107*b* is also configured to be alternated between: (i) a closed state (shown for apparatus 10*b*') in which the partition will move in the downstream direction if a mass of fluid (e.g., liquid) flows into the channel; and (ii) an open state (shown for apparatus 10*b*) in which the partition will permit liquid to flow through the partition. For example, in this embodiment, partition 107*b* comprises a plurality of gates 126 that can be opened, as shown, to permit water to flow through the partition (e.g., to permit partition 107*b* to be moved in upstream direction 42). In the embodiment shown, first barrier 86*b* is coupled (e.g., via one or more levers, links, gears, and/or the like) to partition 107*b* such that first barrier 86*b* is in the closed state when partition 107*b* moves in downstream direction (during which partition 107*b* will generally be in the closed state). In some embodiments, a pin, lever, or latch is configured to be actuated (e.g., depressed or contacted) by partition 107*b* when or just before the partition stops moving in downstream direction 38 (is brought to a stop by the load) to permit gates 126 of partition 107*b* to open (e.g., to be opened by paddle wheel(s), turbine(s), or flywheel(s) 132*b* via gears, links, or the like). Similarly, a pin, lever, or latch can be configured to be actuated (e.g., depressed or contacted) by partition 107*b* when or just before the partition stops moving in upstream direction 42 to permit gates 108 of partition 107*b* to close (e.g., to be closed by paddle wheel(s), turbine(s), or flywheel(s) 132*b* via gears, links, or the like).

In the embodiment shown, apparatus 10*b* also comprises a second barrier 90*b* extending across second channel 26*b*' between first barrier 86*b* and outlet 58*b* of second channel 26*b*'. Second barrier 90*b* is configured to be alternated between: (i) an open state (shown for apparatus 10*b*') in which liquid is permitted to flow out of second channel 26*b*' through outlet 58*b*'; and (ii) a closed state (shown for apparatus 10*b*) in which second barrier 90*b* is configured to resist liquid flow out of second channel 26*b*' through outlet 58*b*'. In this embodiment second barrier 90*b* is coupled to first barrier 86*b* such that second barrier 90*b* is in the closed state when first barrier 86*b* is in the open state. In this embodiment, second barrier 90*b* comprises a plurality of louvers or gates 126 arranged at an angle (e.g., a 45 degree angle, as shown) across second channel 26*b*' such that when in the closed state, second barrier 90*b* directs water toward first barrier 86*b* to facilitate flow from second channel 26*b*' to first channel 26*b*. In the embodiment shown, second barrier 90*b* is coupled (e.g., via one or more levers, links, gears, and/or the like) to partition 107*b* such that barrier 90*b* is in the closed state when the partition moves in upstream direction 42.

Apparatus 10*b* functions similarly to apparatuses 10 and 10*a* in that apparatus 10*b* encapsulates a mass of flowing water and partition 107*b* (in its closed state) decreases the flow velocity of the mass to zero to transfer kinetic energy of the mass to a load (e.g., via shaft 128), s described in more detail above for apparatus 10 and apparatus 10*a*. However, apparatus 10*b* is configured to be submerged in continuously flowing water (e.g., river 116) such that channel 26*b* can be cleared (spent or "stopped" water removed from channel 26*b*) without relying on gravity. More particularly, first and second barriers 86*b* and 90*b* are configured to cooperate to flush "stopped" or spent water from first channel 26*b*. Beginning with first barrier 86*b* closed and second barrier 90*b* open such that water can flow through second channel 26*b*' largely unimpeded, and with partition 107*b* in its closed state and in an upstream position, water from river 116 flows into inlet 54*b* of first channel 26*b* and impacts partition 107*b* to move partition 107 in downstream direction 38 (e.g., from the position of the partition in apparatus 10*b* to the position of the partition in apparatus 10*b*') until partition 107*b* decreases the flow velocity of the mass of water to zero, at which point the water in first channel 26*b* is "stopped" or spent. Next, first barrier 86*b* opens (transitions to its open state), second barrier 90*b* closes (transitions to its closed state), and partition 107*b* transitions to its open state, all such that water at the flow velocity of the river can enter through inlets 54*b* and 54*b*' of first and second channels 26*b* and 26*b*', respectively, can enter and be directed through first channel 26*b* to clear the spent water. As spent water is being flushed from first channel 26*b*, partition 107*b*, in its open state, can move in upstream direction 42 to re-charge first channel 26*b*.

Because first partition 86*b* remains closed and second partition 90*b* remains open, as partition 107*b* moves downstream, water in second channel 26*b* may travel at a higher velocity than the velocity of the water in the river upstream of apparatus 10*b*, and when partition 107*b* has stopped the mass of water and transferred the kinetic energy to the load via transfer mechanism 18, gates 126 of partition 107*b* open and the combined flows of first channel 26*b* and second channel 26*b*' combine to clear the spent water from first channel 26*b* faster than it would be cleared if partition 107*b* were opened without the additional flow of second channel 26*b*' being directed into first channel. As a result of clearing the spent water from first channel 26*b*, partition 107*b* can be repeatedly recharged and cycled more quickly than would otherwise be possible if apparatus 10*b* did not include second channel 26*b*'. As described above for apparatus 10*a*, the exhaust mechanism of apparatus 10*b* is configured to exhaust the stopped or spent mass of fluid (e.g., liquid) from channel 26*b* after the flow velocity has been reduced to zero, and to exhaust the fluid more rapidly than would be possible by only opening gates in partition 107*b* and allowing liquid entering the inlet to re-accelerate the fluid through the partition. For example, in the embodiment shown, the exhaust mechanism is configured to exhaust the mass of the liquid from the channel in less time than required for the mass to enter the inlet and be stopped (the flow velocity to be decreased to zero). For example, in some embodiments, apparatus 10*a* is configured such that the time required for liquid to enter the inlet of channel 26*b* and be stopped is one (1) second, and such that the amount of time required to exhaust the spent liquid from channel 26*b* is one (1) second or less.

In the embodiment shown, partition 107*b* is coupled to shaft 128 via a transfer mechanism 18*b*. Transfer mechanism 18*b* differs from transfer mechanism 18 in that transfer mechanism 18*b* comprises a geared link 130 coupled in fixed relation to partition 107*b*, and a geared one-way clutch 113 that is configured to engage a corresponding geared surface of link 130, as shown. One-way clutch 113 is configured to (i) engage when partition 107*b* and link 130 travel in downstream direction 38 and apply torque to shaft 128, and (ii) disengage to permit partition 107*b* and link 130 to travel in upstream direction 42 without applying torque to shaft 128. In this embodiment, shaft 128 can be coupled directly to a generator or mechanical energy-storage device 106, and/or can be coupled to one or more generators and/or mechanical energy-storage devices via a gear 131. As described above for transfer mechanism 18, transfer mechanism 18*b* (e.g., via gears 112*b* and 131 (FIG. 5)) can be configured such that a unit of linear motion of partition 107*b* in downstream direction 38 can generate 4 or more linear units of motion at the load (e.g., at gear 131). In the embodiment shown, both of apparatuses 10*b* and 10*b*' are both coupled to shaft 128, and are configured such that the partition of apparatus 10*b* moves in downstream direction 38 while the partition of apparatus 10*b*' moves in upstream direction 42.

As shown in FIG. 4, apparatus 10*b* (and apparatus 10*b*') is submerged in a river or other continuous flow channel such that some portion of the liquid in river 116 flows around apparatus 10*b*. In this configuration, apparatuses 10*b* and 10*b*' resist the flow of water downstream, such that if only apparatuses 10*b* and 10*b*' are disposed in the river, water will be encouraged to flow around instead of through the apparatuses. As such, one or more flow-resistance modifiers (FRMs) 190 can be disposed in the river between apparatuses 10b and 10b' and the bank to increase the resistance to flow to a level comparable to that through the apparatuses. For example, each FRMs 190 can comprise an inflatable bags, balloons, or other structure with an overall density (e.g., including air or other material disposed in the structure) that is less than the density of water, and configured to be disposed in the river (e.g., tethered to bottom 185 of the river) or other waterway such that the FRMs occupy enough of the volume in the river (e.g., between the apparatuses and the bank(s) 120) or other flowing waterway to resist, or otherwise provide resistance to, flow (such as, for example, to at least a similar (e.g., substantially equal or greater) degree and/or magnitude as the (e.g., aggregate or average) flow resistance caused by or resulting from apparatuses 10b and 10b'), such as to ensure consistent flow through the apparatuses). For example, in some embodiments, FRMs can be configured to provide flow resistance that is greater the flow resistance of the apparatus (e.g., FRMs having a flow resistance of 50%, 60%, 70%, or more with an apparatus with 50% flow resistance. In the absence of such resistance (e.g., provided by FRMs) in the portion of the river or other waterway that is not occupied by the apparatus (e.g., 10b), water may face less resistance traveling around the apparatus and therefore reduce the flow through the apparatus (and the energy able to be captured by the apparatus). Flow resistance may be inversely related to overall porosity, such that decreasing porosity results in increasing flow resistance. For example, if the overall porosity of the apparatuses is 50%, then the flow resistance provided by the apparatuses may be 50%; and if the overall porosity of the apparatuses decreases to 25%, then the flow resistance may increase to 75%.

In some embodiments, the FRMs are configured such that a barge or other water-born vessel can push adjacent FRMs apart to permit the barge or other vessel to pass the FRMs in the waterway without damaging the FRMs or the barge or vessel. In such embodiments, the FRMs can be configured to return toward their initial positions after the barge or vessel passes (such initial and subsequent positions may vary with currents and the like, depending, for example, on the method of anchoring or tethering the FRMs). For example, in some embodiments, the FRMs are each tethered to the bottom of the river or other waterway (e.g., by a length of cable, rope, chain, and/or the like). Additional examples of FRMs and their structure and/or use are disclosed in U.S. patent application Ser. No. 13/158,380, filed Jun. 11, 2011. In the embodiment shown, two tiers of debris deflectors 186 and 187 are installed upstream of apparatus 10b and 10b' to reduce the likelihood of debris entering the apparatuses. In the embodiment shown, an upstream debris deflector 186 comprises a plurality of elements (e.g., horizontal rods) spaced at relatively-broad intervals to provide a first layer of protection for debris. In the embodiment shown, a downstream debris deflector 187 comprises a plurality of elements (e.g., horizontal rods) spaced at relatively-narrow intervals to provide a second layer of protection for debris. In this embodiment, both of deflectors 186 and 187 are angled to direct debris in direction 189 away from apparatuses 10b and 10b'. In some embodiments, FRMs can be moved temporarily, such as, for example, to allow navigation of the river. Additional details of some embodiments of FRMs can be found in PCT Application No. PCT/IB2011/053151.

In some embodiments, the kinetic energy of the water in channel 26b' (FIG. 5) can be harvested to move partition 107b to its upstream position. For example, in the embodiment shown, apparatus 10b comprises one or more paddle wheels, turbines, or flywheels 132b configured to be turned by liquid exiting second channel 26b' when first barrier 86b is in the closed state, and paddle wheel(s), turbine(s), or flywheel(s) 132b can be coupled (e.g., via one or more levers, links, gears, and/or the like) to partition 107b to move partition 107b in the upstream direction as water is flushed from channel 26b and/or transition the partition 107b from the open state to the closed state after partition 107b has been moved to the upstream position. Similarly, paddle wheel(s), turbine(s), or flywheel(s) 132b can be coupled (e.g., via one or more levers, links, gears, and/or the like) to first barrier 86b and/or second barrier 90b to transition first barrier 86b and/or second barrier 90b between open and closed states without harvesting energy from partition 107b. In some embodiments, apparatus 10b comprises a flywheel 147b that is coupled to and configured to be charged by paddle wheel(s), turbine(s), and/or flywheel(s) 132b such that if second barrier 90b is closed, the kinetic energy in flywheel 147b can be transferred to open and close first barrier 86b, second barrier 90b, and/or to move partition 107b in upstream direction 42.

As described, paddle wheel(s), turbine(s), and/or flywheel(s) 132a (or any number of other mechanical devices or methods) can provide power or mechanical leverage for the opening and closing of gates, moving lock pins or latches, and/or the resetting of partition 107b. By extracting kinetic energy from the water flowing through second channel 26b' while first barrier 86b is closed, the kinetic energy extracted by partition 107b need not be used to open and close barriers 86b and 90b, open and close partition 107b, and/or used to move partition 107b upstream.

For the configuration of FIGS. 4 and 5, if the river has a depth equal to the height of the water in the river, and the width of the river is twice the width of the two apparatuses (10b and 10b') and FRMs 190 provide a substantially-even resistance across the entire width of the river, such that apparatuses 10b and 10b' span ½ of the cross-sectional area of the river and overall inbound flow of the river. Because water is only permitted to flow through ½ of the cross-sectional area of the apparatuses at any given time (i.e., one of first channel 26b or second channel 26b' in each set of first and second channels 26b and 26b'), the cross-sectional flow area is reduced by ½ of the cross-sectional area of the apparatus at any given time, such that the velocity through the apparatuses must double to 2V. Because only one of the four channels depicted in FIG. 5 (only one of channels 26b) is extracting energy at any given time, the cross-sectional flow area through the apparatus for calculating energy extraction is 0.25 A). As such, Equation [4] yields Equation [5] for the flow through apparatuses 10b and 10b'.

$$P = \frac{.25(A)Lp(2V)^2}{2} \qquad [5]$$

In operation, the water from river 116 is alternatingly directed into first and second channels 26b and 26b' of both of apparatuses 10b and 10b', as described above, such that partition 107b of apparatus 10b and partition 107b of apparatus 10b' are repeatedly moving (e.g., in opposite directions), similar to the pistons of an internal combustion engine.

While this embodiment is shown in communication with river 116, apparatus 10b can be used with a variety of open or free-flowing water (e.g., tidal flows) in which apparatus 10b can be submerged. In such open or free-flowing environments (e.g., open sea), efficiency of energy extraction may be reduced relative to the configurations of FIGS. 2-3 and 4-5 because the relatively isolated resistance provided by apparatus 10b will result in the water approaching the apparatus at a slower velocity than the water would flow if the apparatus were not present (natural flow velocity, V), such as, for example, due to water flowing around instead of through the apparatus. However, relative to other renewable-energy (e.g., tidal flow) systems, apparatus 10b can still provide increased footprint efficiency (e.g. equal or higher energy extraction with a smaller footprint).

Figure 6:
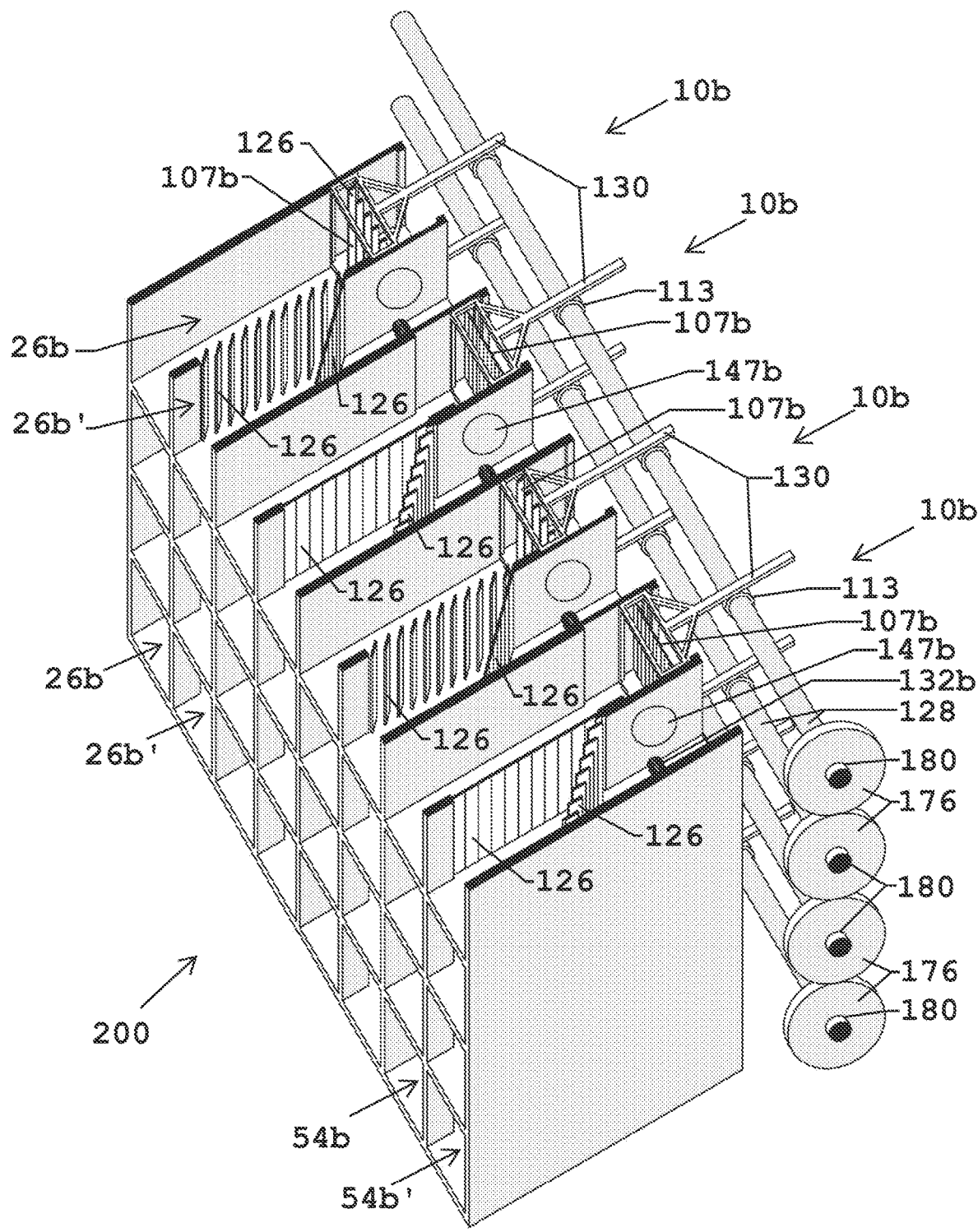
FIG. 6 depicts a cutaway perspective view of one embodiment of the present systems comprising a plurality of the apparatuses of FIG. 5 coupled to a common energy sink.

FIG. 6 depicts a perspective view of one embodiment 200 of the present systems comprising a plurality of apparatuses 10b coupled to a common load or energy sink via shafts 128 and gears 176 that couple shafts 128 to one another. In some embodiments, system 200 comprises clutches or other structures 180 for selectively engaging gears 176 to the respective shafts (e.g., to selectively engage or disengage shafts 128). In the embodiment shown, apparatuses 10b are laterally (e.g., side-by-side) and vertically (stacked) adjacent to each other (e.g., can share common walls) such that the apparatuses form a matrix that may be referred to in this disclosure as a Newtonion Honeycomb®. This arrangement of apparatuses 10b can proportionately increase the power output of a system while minimizing the environmental impact by adding apparatuses vertically without increasing the footprint of the system. In other embodiments, multiple apparatuses 10b can be arranged in sequence or series (e.g., longitudinally spaced) along a channel.

Figure 7:
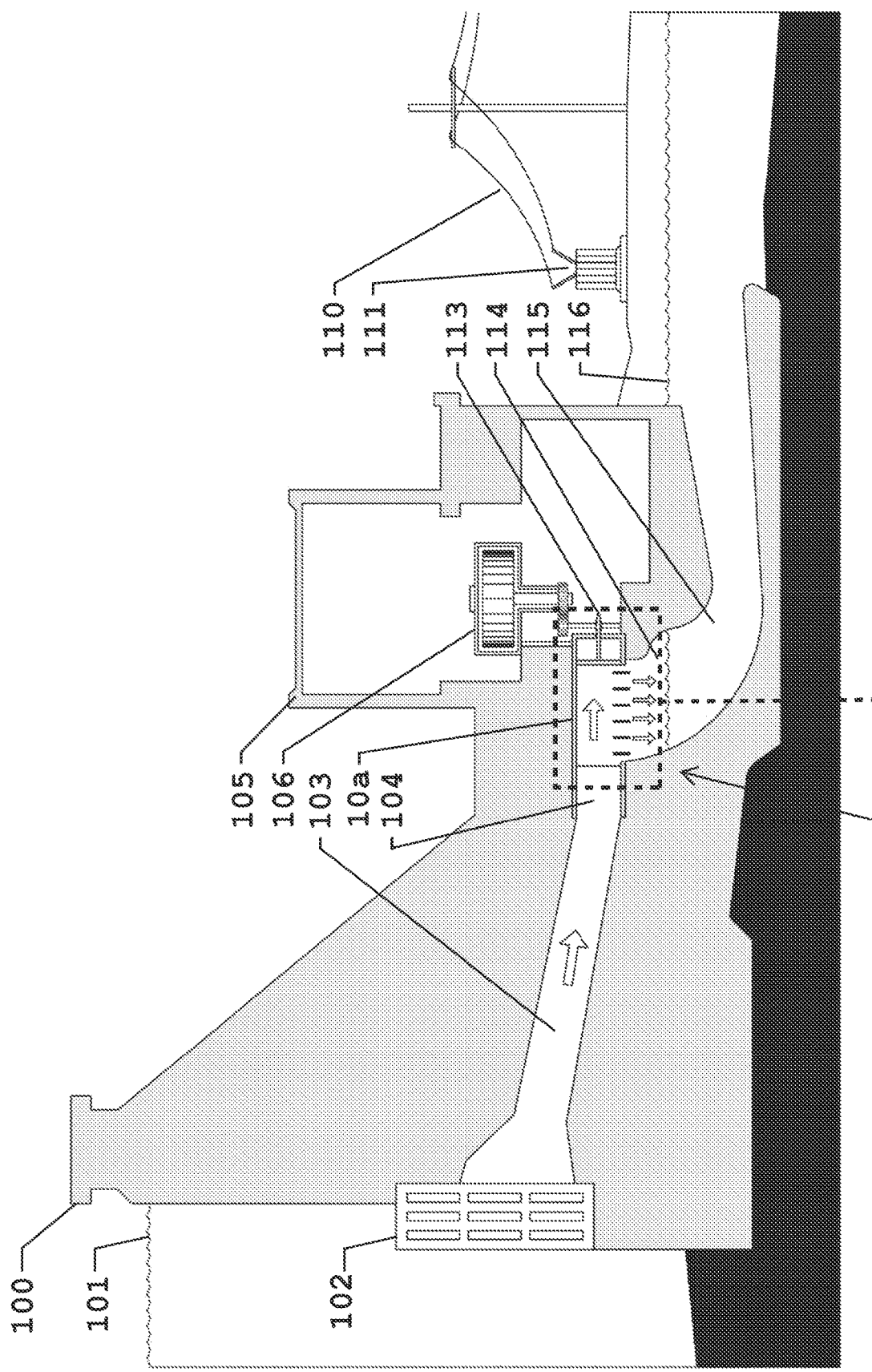
FIG. 7 depicts a side cross-sectional view of the apparatus of FIGS. 2-3 installed adjacent to a dam and configured to receive liquid flows from a penstock extending through the dam.

FIG. 7 depicts a side cross-sectional view of apparatus 10a installed inside a dam 100 retaining water in a reservoir 101, such that apparatus 10a is configured to receive liquid flows from a penstock 103 extending through the dam. In this configuration, water discharging from dam 100 through grate 102 and into penstock 103 flows through apparatus 10a and out bottoms 78a and 78a' via gravity at a point 114, through a discharge path 115, and into river 116. Various other components are shown for reference as one example of components with which apparatus 10a can be used. For example, in this embodiment, apparatus 10a (e.g., partition 107a and 107a') is coupled to a generator 106 in an equipment building 105, and generator 106 is coupled to transmission lines 110 via a transformer 111.

Figure 8:
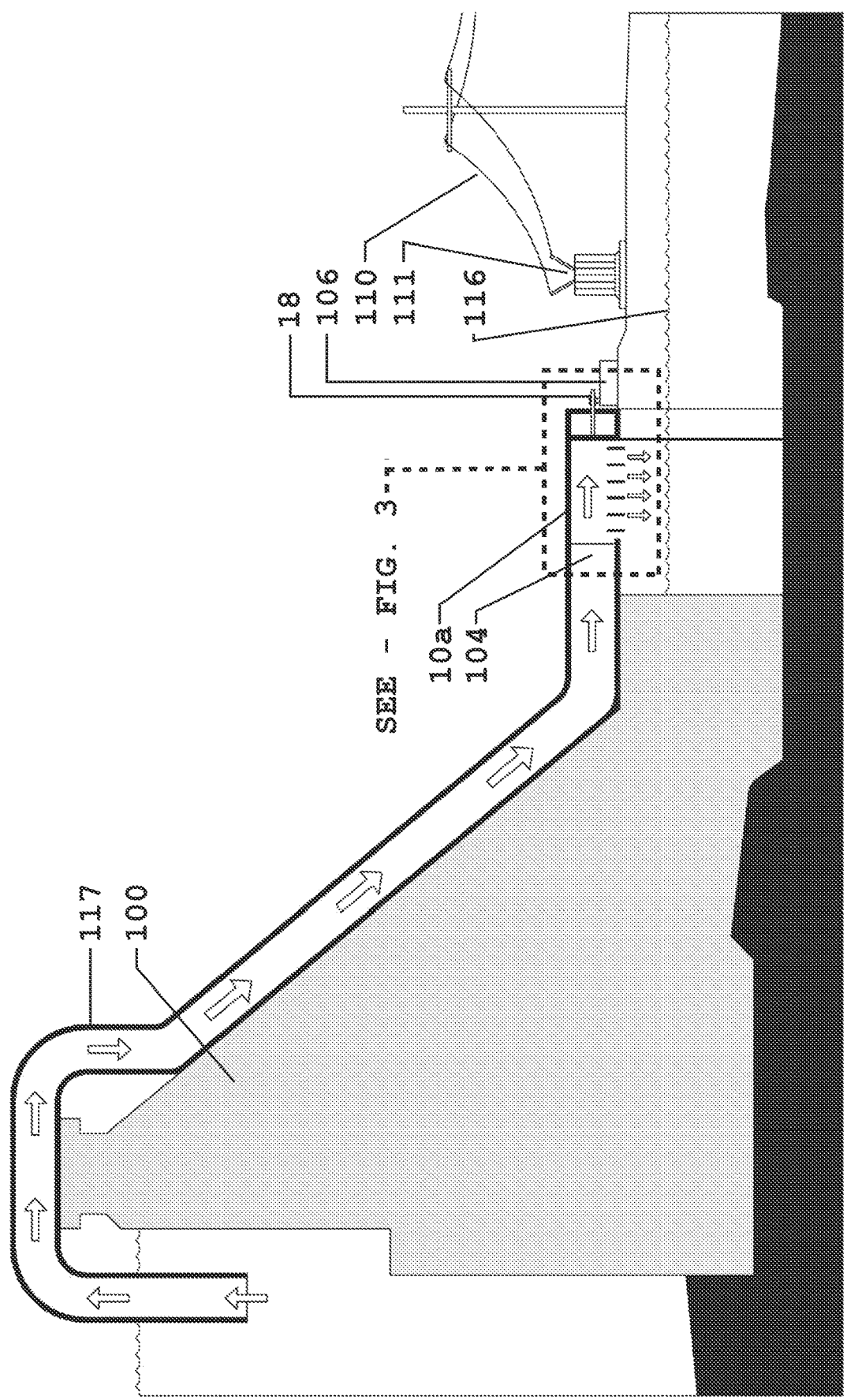
FIG. 8 depicts a side cross-sectional view of the apparatus of FIGS. 2-3 installed adjacent to a dam and configured to receive liquid flows from a penstock extending over the dam.

FIG. 8 depicts a side cross-sectional view of apparatus 10a installed adjacent to a dam 100 and configured to receive liquid flows from a siphon penstock 117 extending over the dam. In this embodiment, apparatus 10a can be disposed in front and/or to the side of a dam 100, and water is drawn through siphon penstock 117. In this configuration, water discharging from dam 100 into siphon penstock 117 flows through apparatus 10a and out bottoms 78a and 78a' via gravity into river 116. In some embodiments, siphon penstock 117 can comprise a translucent material to enable visual inspection or monitoring of flow.

Figure 9:
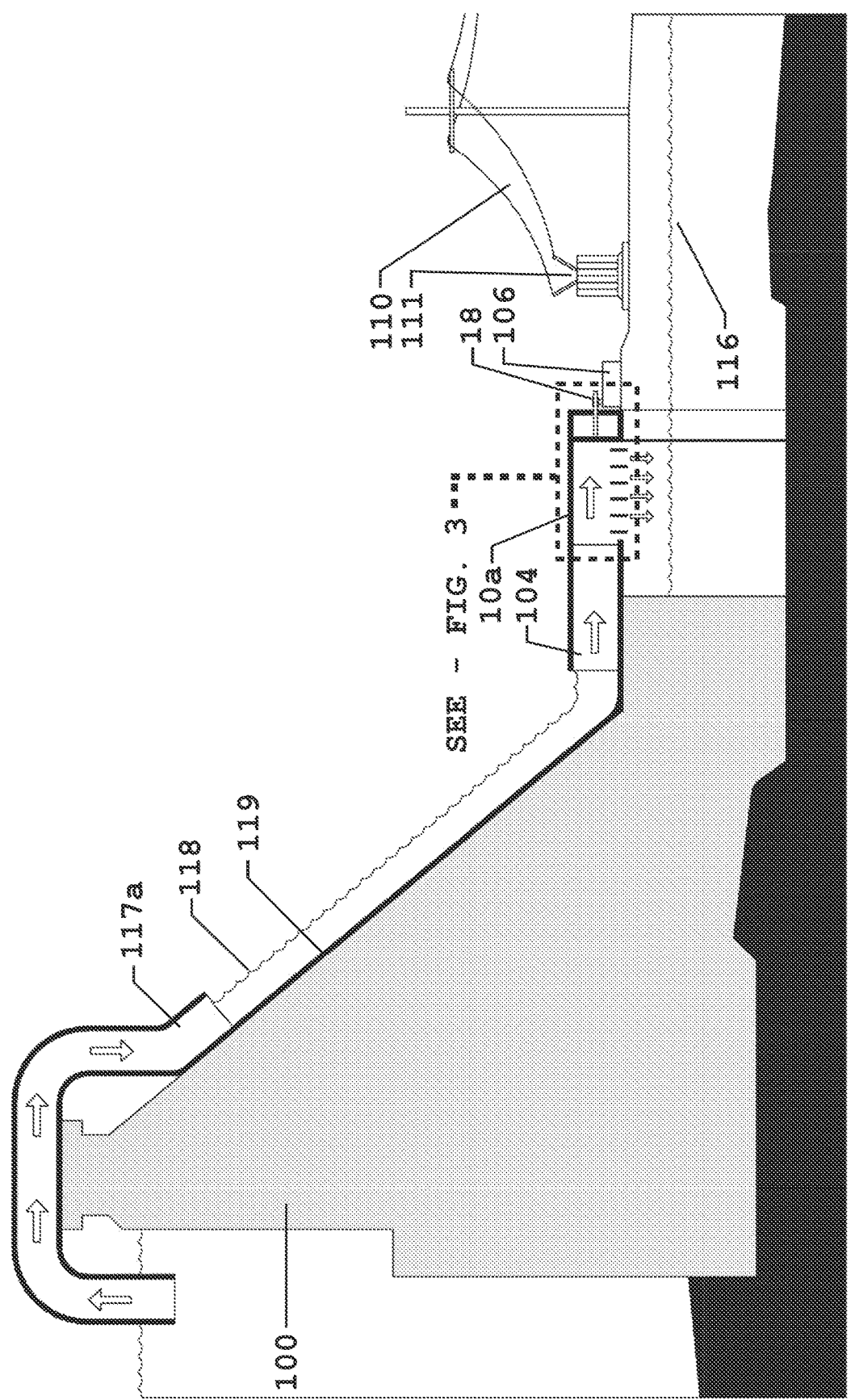
FIGS. 9-10 depict side cross-sectional and perspective views, respectively, of the apparatus of FIGS. 2-3 installed adjacent to a dam and configured to receive liquid flows from a waterfall flowing over the dam.
Figure 10:
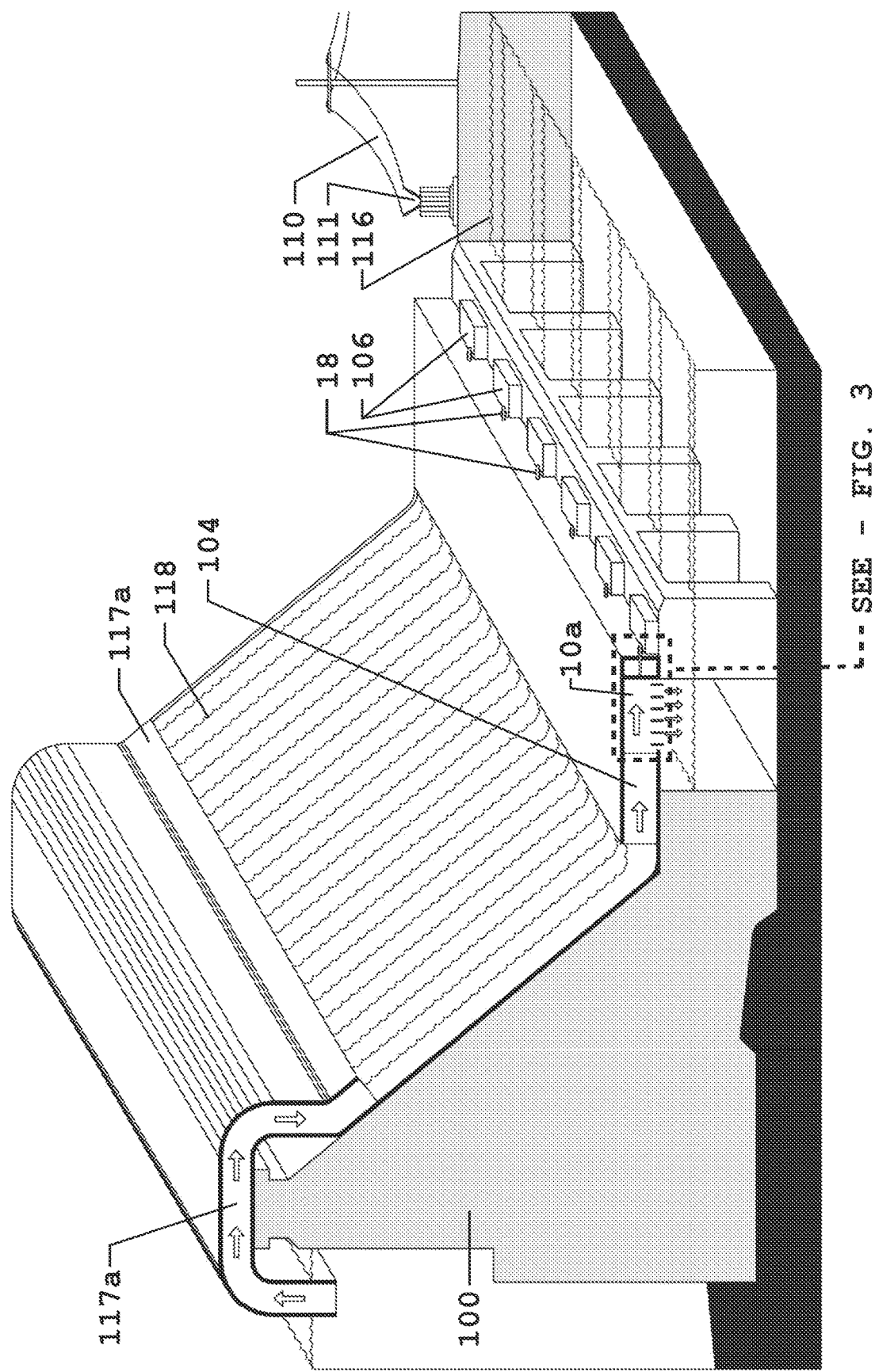

FIGS. 9-10 depict side cross-sectional and perspective views, respectively, of a plurality of apparatuses 10a installed adjacent to a dam 100 and configured to receive liquid flows from a waterfall flowing over the dam. In this embodiment, a shortened siphon penstock 117a is configured to siphon water over the top of the dam and permit an open flow 118 of water down the face 119 (which may be lined with a polymer, concrete, or the like) of the dam, as shown, to apparatuses 10a. As shown, apparatuses 10a can be disposed side-by-side across the bottom of the dam. In some embodiments, siphon penstock 117a can comprise a translucent material to enable visual inspection or monitoring of flow. Siphon penstock 117a can be used to retrofit or convert existing dams to be usable with embodiments of the present apparatuses (e.g., 10a).

Figure 11:
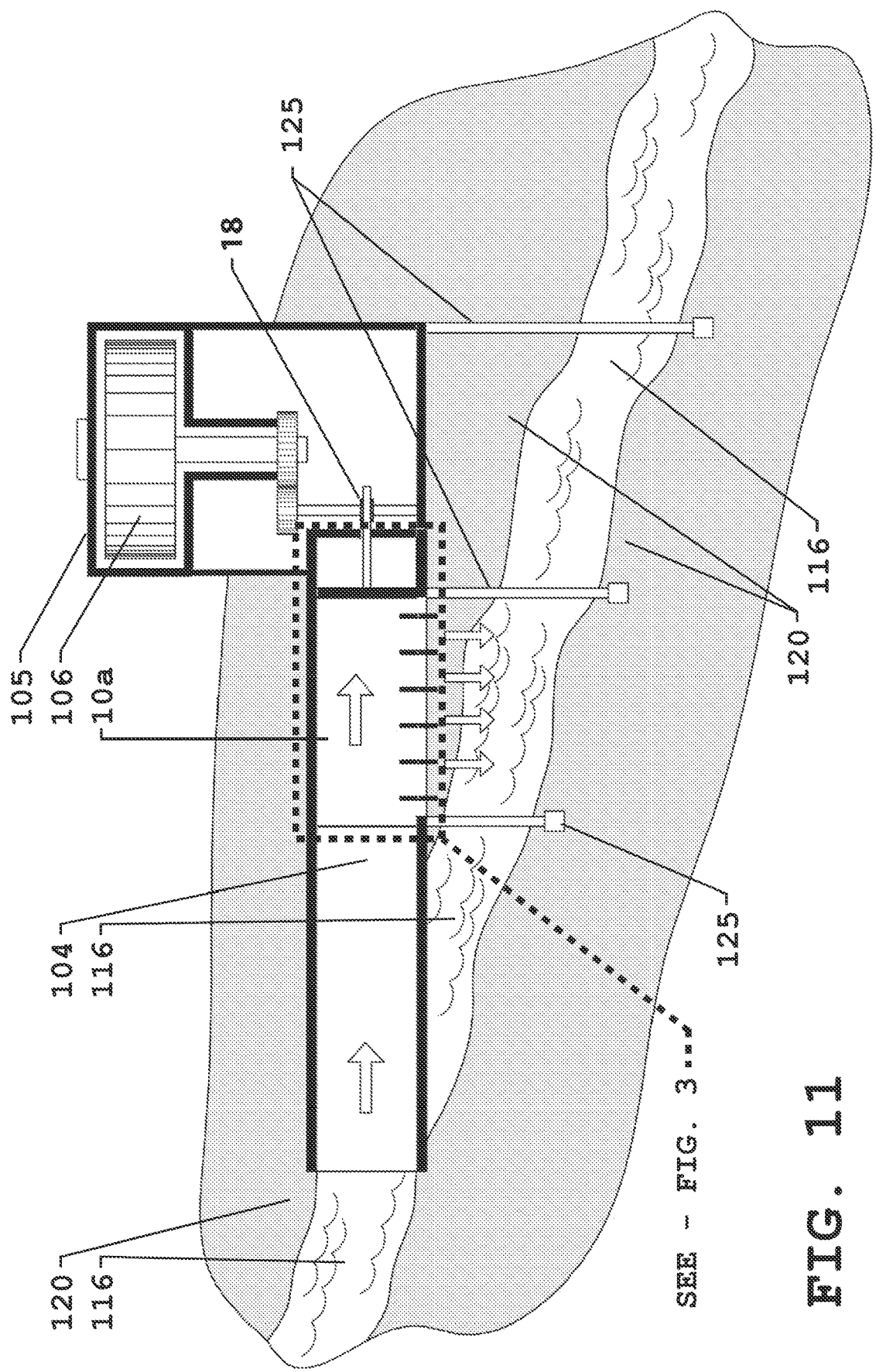
FIG. 11 depicts a side cross-sectional view of the apparatus of FIGS. 2-3 installed adjacent to and over a stream or river.

FIG. 11 depicts a side cross-sectional view of apparatus 10a installed adjacent to a stream or river. As shown, apparatus 10a can be installed above the natural slope of the flowing water with a feeder pipe or penstock 104 directing the water into the apparatus, such that water exiting the apparatus can flow out bottoms 78a and 78a' via gravity into river 116. As shown, apparatus 10a can be supported by one or more footings, pilings, piers, and/or other structures 125.

Figure 12:
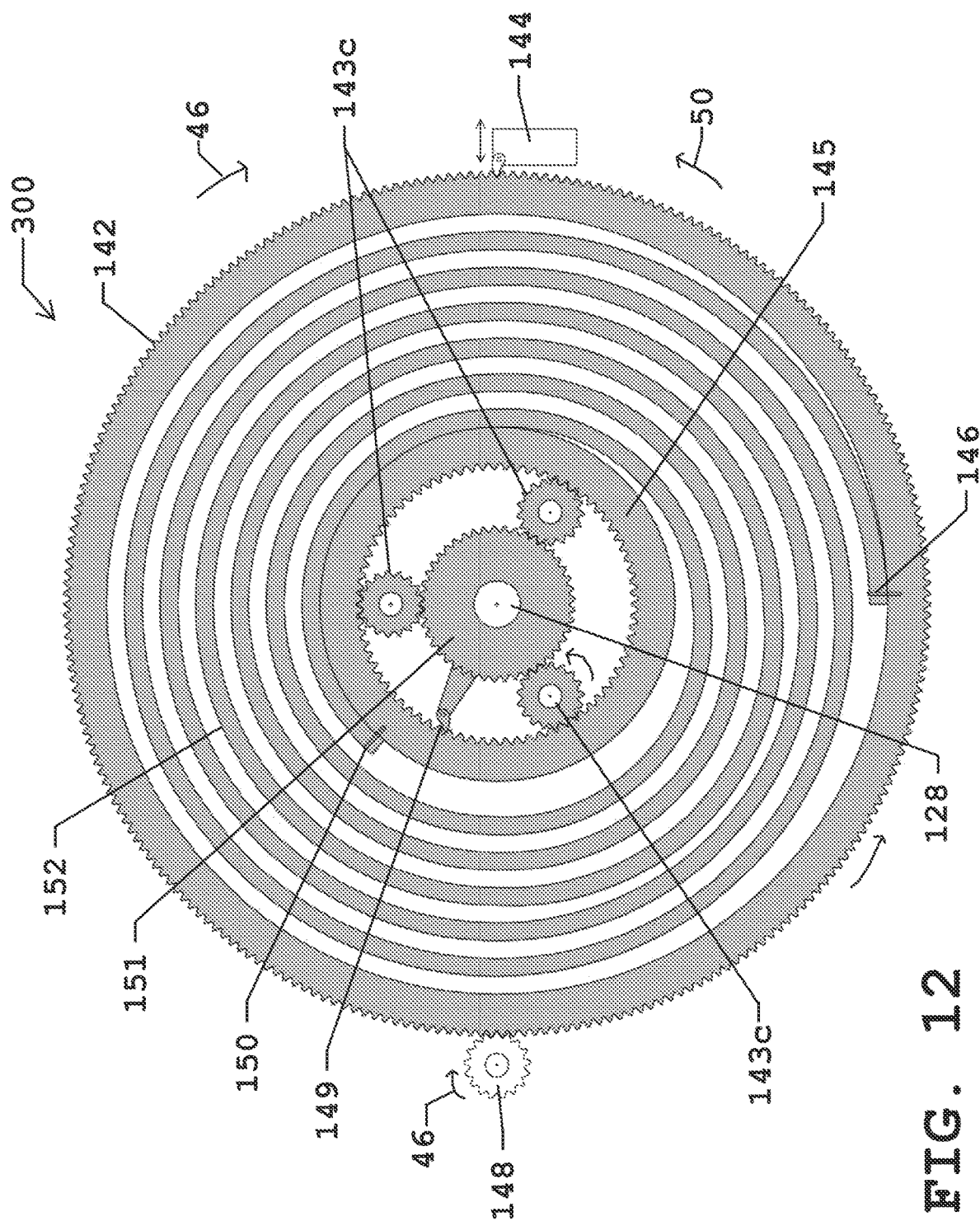
FIG. 12 depicts a side view of one embodiment of the present mechanical energy-storage devices.

FIG. 12 depicts a side view of one embodiment 300 of the present mechanical energy-storage devices or accumulators. In the embodiment shown, device 300 comprises: an input shaft 128; an input gear 151 coupled in fixed relation to input shaft 128; an outer gear 142; an inner planetary gear 145 having a smaller diameter than the outer gear; and a coil spring 152 coupled to outer gear 142 and inner planetary gear 145. In the embodiment shown, inner planetary gear 145 is configured to engage input gear 151 such that rotation of input gear 151 causes rotation of inner planetary gear 145 in a second direction 50. More particularly, in the embodiment shown, input gear 151 is coupled to inner planetary gear 145 via a plurality of planet gears 143c rotatable around respective fixed rotational axes, as shown, such that rotation of shaft 128 in second direction 50 causes planet gears 143c to rotate in first direction 46, and rotation of planet gears 143c, in turn, causes rotation of inner planetary gear 145 in second direction 50. In the embodiment shown, coil spring 152 is coupled (e.g., via pins 146 and 150) to outer gear 142 and inner planetary gear 145 such that rotation of inner planetary gear 145 in second direction 50 without rotation of outer gear 142 will charge (increase tension in) spring 152. In this way, shaft 128 can be coupled to the partition(s) of one of the present apparatuses such that linear motion of the partition can be transferred to rotation of shaft 128 (e.g., with a transfer mechanism such as 18, 18b, or the like).

In the embodiment shown, device 300 also comprises an output gear 148 (e.g., and an output shaft coupled in fixed relation to the output gear), and outer gear 142 is coupled to output gear 148 such that rotation of outer gear 142 in second direction 50 will cause rotation of output gear 148 in first direction 46. In this embodiment, outer gear 142 has a larger diameter and more teeth than output gear 148, such that a single revolution of outer gear 142 will cause multiple revolutions of output gear 148. In the embodiment shown, device 300 further comprises a ratchet 149 configured to permit rotation of inner planetary gear 145 in second direction 50, while preventing rotation of inner planetary gear 145 in first direction 46. In the embodiment shown, device 300 further comprises a rotation controller 144 configured to permit or prevent rotation of the outer gear 148. For example, rotation of outer gear 148 can be prevented during periods in which device 300 is engaged or brought on-line to increase the load on shaft 128 and the corresponding partition(s) of one or more the present apparatuses (e.g., if a generator cannot provide sufficient load to stop flowing water in the coupled apparatus(es)). Conversely, rotation of outer gear 148 can be permitted to release tension in coil spring 152 (e.g., if the tension in the coil spring exceeds a threshold, and/or if a generator can provide sufficient load to stop flowing water in the coupled apparatus(es) and still has additional capacity) and thereby release stored mechanical energy to the coupled generator(s).

Figure 13:
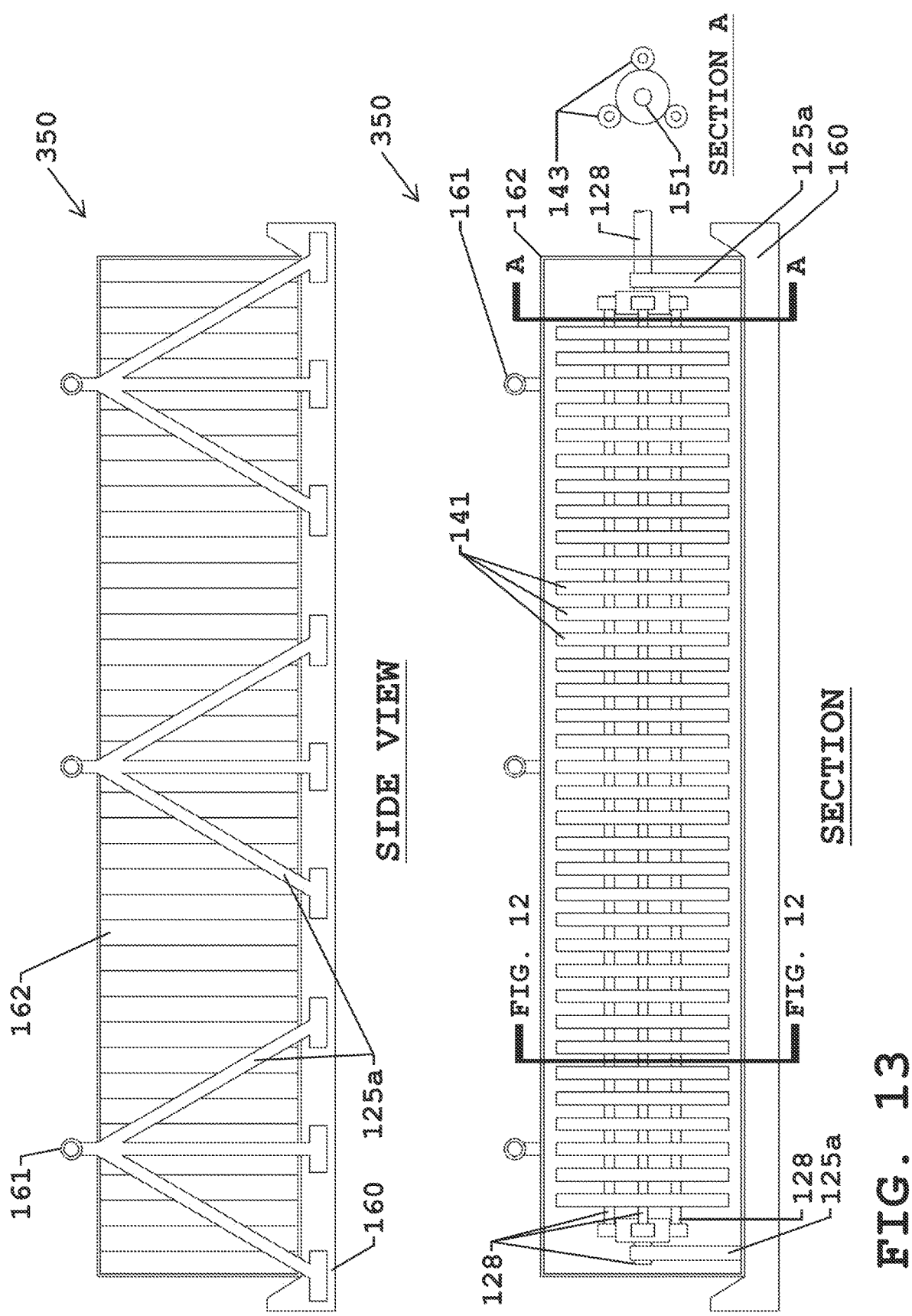
FIG. 13 depicts side and cross-sectional views of a second embodiment of the present mechanical energy-storage devices that comprises a plurality of the devices of FIG. 12.

FIG. 13 depicts side and cross-sectional views of a second embodiment 350 of the present mechanical energy-storage devices that comprises a plurality of devices 300 coupled in parallel along input shaft 128 such that rotation of input shaft 128 will simultaneously charge the coil springs (152 (FIG. 12)) of all of devices 300. In the embodiment shown, device 350 comprises a frame 125a with a lower skid 160, upper lift eyes or lift points 161, and a housing or exterior skin 162 that encloses devices 300 (e.g., to limit particulate and/or moisture intrusion into devices 300). Device 300 and system 350 are non-limiting examples of mechanical energy storage devices or accumulators that can be used with embodiments of the present apparatuses. In some embodiments, system 350 is configured such that devices 300 can be sequentially engaged or brought online (e.g., if a greater load is needed to stop a flow of water with a velocity that is greater than expected or usual). In some embodiments, device 300 and/or system 350 can be installed and/or used in series to accumulate and/or temporarily store mechanical energy for later release to an output shaft (via output gear 148) as needed. For example, in the embodiment shown, output gear 148 can be coupled to an output shaft that is, in turn, geared to shaft 128 to return energy stored in device 300 to a generator or the like that is coupled to shaft 128.

Figure 14B:
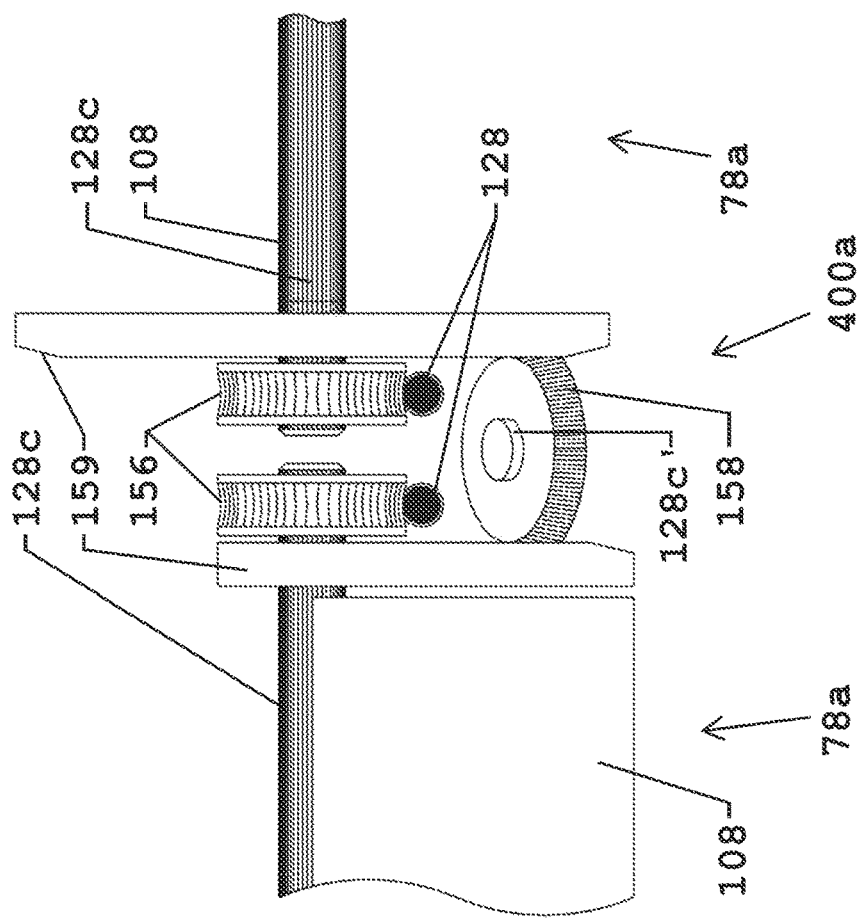
FIGS. 14A-14B depict a gear arrangements for the using the openable bottoms of the apparatus of FIGS. 2-3 to actuate barriers other components of the apparatus.
Figure 14A:
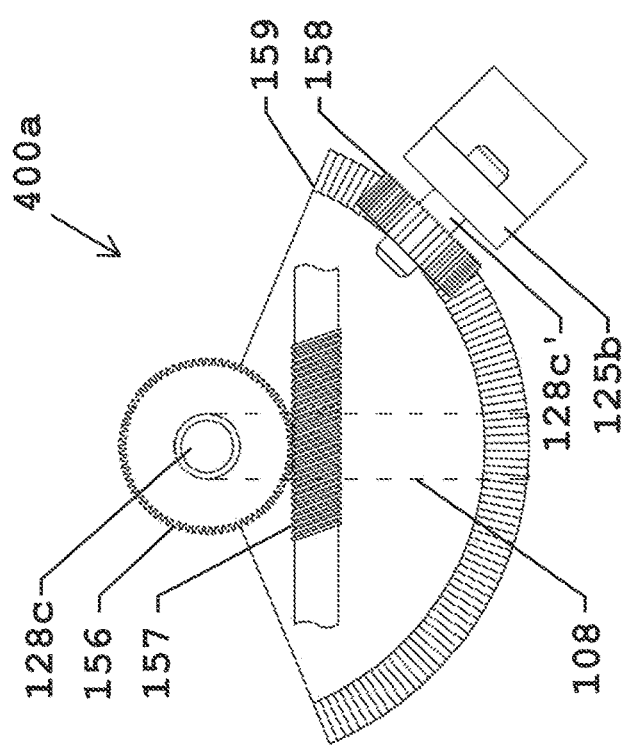

FIGS. 14A-14B depict a gear arrangement 400a for the using the openable bottoms 78a and 78a' of apparatus 10a to actuate barriers 82a and 82a', and/or to reposition partitions 107b and 107b' in upstream direction 42. More particularly, FIG. 14A depicts a side view of a portion of the gear arrangement, and FIG. 14B depicts an end view of a portion of the gear arrangement. In the embodiment shown, each of a plurality of gates 108 is coupled in fixed relation to a shaft 128c. Shaft 128c is coupled in fixed relation to a gear 156 and to a wing plate 159 having a geared arcuate outer perimeter, as shown. In this embodiment, when gates 108 are permitted to open, the weight of the water in the respective channel 26a or 26a' pushes downward on the gate 108 causing the gate 108 to rotate 90 degrees downward and thereby rotate shaft 128c, gear 156, and wing plate 159 by the same amount. Gear 156 is coupled to the corresponding one of barriers 82a or 82a' by a worm geared shaft 157 such that when the gates 108 of the respective bottom 78a or 78a' opens, gates 126 of the corresponding barrier 82a or 82a', respectively, closes. Worm-geared shaft 157 can be coupled to the respective gates 126 by one or more additional shafts and gears (e.g., as described for apparatus 10c of FIG. 15). In the embodiment shown, each worm-geared shaft 157 also couples gears 156 of each gate 108 (of the respective bottom 78a or 78a') together to ensure that all of the louvers of a respective bottom 78a or 78a' move in unison and can all add torque to shaft 157 to ensure sufficient force to close the corresponding barrier 82a or 82a'. Additionally, wing plate 159 is geared via a transfer gear 158 to the wing plate of the corresponding gate 108 of the other of bottoms 78a or 78a' such that as bottom 78a opens, bottom 78a' closes and barrier 82b' opens (and vice versa). In the embodiment shown, transfer gear 158 is mounted to a shaft 128c' that is coupled in fixed relation to body 22a via a mount 125b. In the embodiment shown, gates 108 extend in only one direction from the respective shaft 128c such that when closed, gate 108 extends from its coupled shaft 128c to the end of the next adjacent gate.

Figure 15:
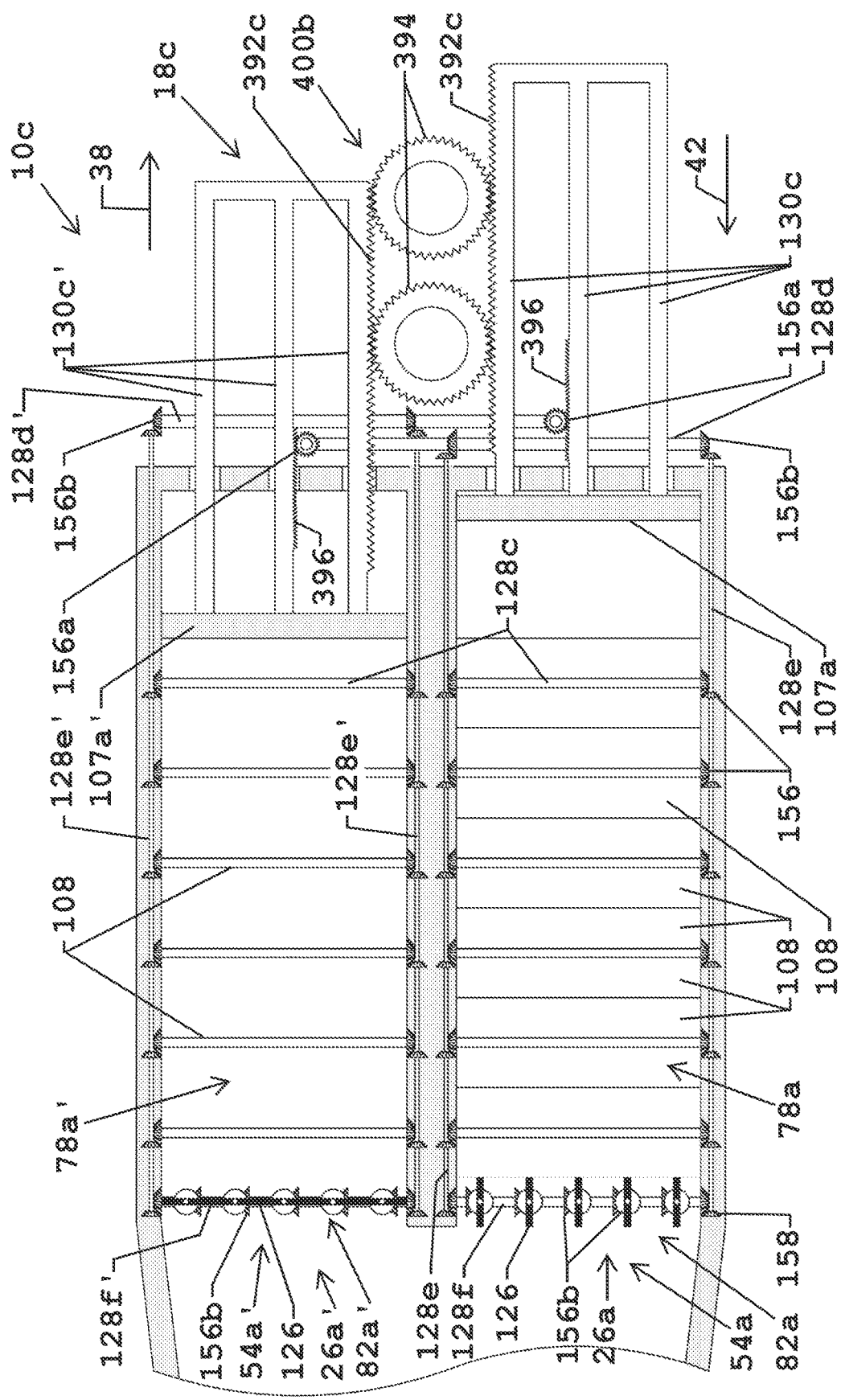
FIG. 15 depicts a cutaway top view of an embodiment of the present apparatuses that is similar to the apparatus of FIGS. 2-3 and includes an alternate gear arrangement for actuating various components of the apparatus.

FIG. 15 depicts an embodiment 10c of the present apparatuses that is similar to apparatus 10a but includes an alternate gear arrangement 400b for actuating various components of the apparatus. Apparatus 10c is substantially similar to apparatus 10a, and the differences between apparatus 10c and apparatus 10a will therefore primary be described here. In the embodiment shown, apparatus 10c comprises a transfer mechanism 18c having geared link frames 130c coupled to a shaft via one-way clutches (as described for apparatus 10b, but omitted from FIG. 15 for clarity). In the embodiment shown, link frames 130c and 130c' include geared surfaces 392c engaging gears 394 such that when partition 107a moves in downstream direction 38, it causes partition 107a' to move in upstream direction 42; and when partition 107a' moves in downstream direction 38, it causes partition 107a to move in upstream direction 42. In the embodiment shown, link frames 130c and 130c' also include secondary geared surfaces 396 for engaging gear arrangement 400b to harvest some of the kinetic energy extracted by partitions 107a and 107a' to open and close gates 126 of first and second barriers 82a and 82a', and to open and close gates 108 of first and second bottoms 78a and 78a'. In the embodiment shown, gear arrangement 400b comprises a transverse shaft 128d rotatably mounted to extend between secondary geared surface 396 of frame 130c' and a pair of longitudinal shafts 128e extending along both sides of channel 26a, as shown. Geared surface 396 of frame 130c' is coupled to transverse shaft 128d via a spur-bevel gear sets 156a, and transverse shaft 128d is coupled to longitudinal shafts 128e via a spur-spur gear sets 156b. In this embodiment, gates 108 of bottom 78a are each coupled to shafts 128c, and shafts 128c are each coupled to longitudinal shafts 128e by spur-spur gear sets 156b. Additionally, gear arrangement 400b comprises an additional transverse shaft 128f at inlet 54a to channel 26a, and transverse shaft 128f is coupled to gates 126 of barrier 82a via a spur-spur gear sets 156b. In this embodiment, apparatus 10c is configured such that as partition 107a moves in downstream direction 38, transverse shaft 128d rotates longitudinal shafts 128c, and longitudinal shafts 128e rotate shafts 128c (to open gates 108 of bottom 78a) and rotate transverse shafts 128f (to close gates 126 of barrier 82a).

Similarly, in the embodiment shown, gear arrangement 400b comprises a transverse shaft 128d' rotatably mounted to extend between secondary geared surface 396 of frame 130c and a pair of longitudinal shafts 128e' extending along both sides of channel 26a', as shown. Geared surface 396 of frame 130c is coupled to transverse shaft 128d' via a spur-bevel gear sets 156a, and transverse shaft 128d' is coupled to longitudinal shafts 128e' via a spur-spur gear sets 156b. In this embodiment, gates 108 of bottom 78a' are each coupled to shafts 128c, and shafts 128c are each coupled to longitudinal shafts 128e' by spur-spur gear sets 156b. Additionally, gear arrangement 400b comprises an additional transverse shaft 128f at inlet 54a' to channel 26a', and transverse shaft 128f is coupled to gates 126 of barrier 82a' via a spur-spur gear sets 156b. In this embodiment, apparatus 10c is configured such that as partition 107a moves in downstream direction 38, transverse shaft 128d' rotates longitudinal shafts 128e', and longitudinal shafts 128e' rotate shafts 128c' (to open gates 108 of bottom 78a') and rotate transverse shafts 128f (to close gates 126 of barrier 82a').

FIGS. 16A and 16B depict top views of another embodiment 10d of the present apparatuses. Apparatus 10d is substantially similar to apparatus 10a, and the differences between apparatus 10d and apparatus 10a will therefore primary be described here. Apparatus 10d differs from apparatus 10a in that apparatus 10d is configured such that the overall length of channels 26a and 26a' are adjustable. In particular, body 22d comprises a track system 197 and a telescoping interior wall or gate 195 that are configured to lengthen or shorten the length of (e.g., flow sections 62a and 62a' of) channels 26a and 26a' (and resulting position of barriers 82a and 82a') to increase or shorten the length of time required for one cycle of partition 107a and/or 107a' (e.g., to adjust for variations in flow velocity of inbound masses of liquid). For example, apparatus 10a can be configured with a channel length expected to yield a flow time of approximately 1 second from a mass of fluid (e.g., liquid) entering inlet 54a to partition 107a decreasing the flow velocity of the mass to zero in downstream direction 38a. Apparatus 10d can adjust the length of (each of) channels 26a and 26a' to result in a desired flow time (e.g., 1 second) for any of various inbound flow velocities. For example, in some embodiments, apparatus 10d comprises one or more flow sensors at inlets 54a and 54a' to measure the inbound flow velocity, and comprises a controller (e.g., microprocessor) configured to determine from the measured inbound flow velocity a desired length of channels 26a and 26a' for the desired flow time. For example, if the inbound flow velocity is 1 meter per second, and the desired flow time is 1 second, then the overall length of channels 26a and 26a' can be adjusted to 1 meter. The position of movable gate 195 and barriers 82a and 82a' along track system 197 can be adjusted with any suitable mechanism or structure, such as, for example, a worm-drive powered by an electric motor, a worm-drive powered by the kinetic energy extracted by partitions 107a and 107a' (e.g., via shaft 128), and/or the like.

Figure 17:
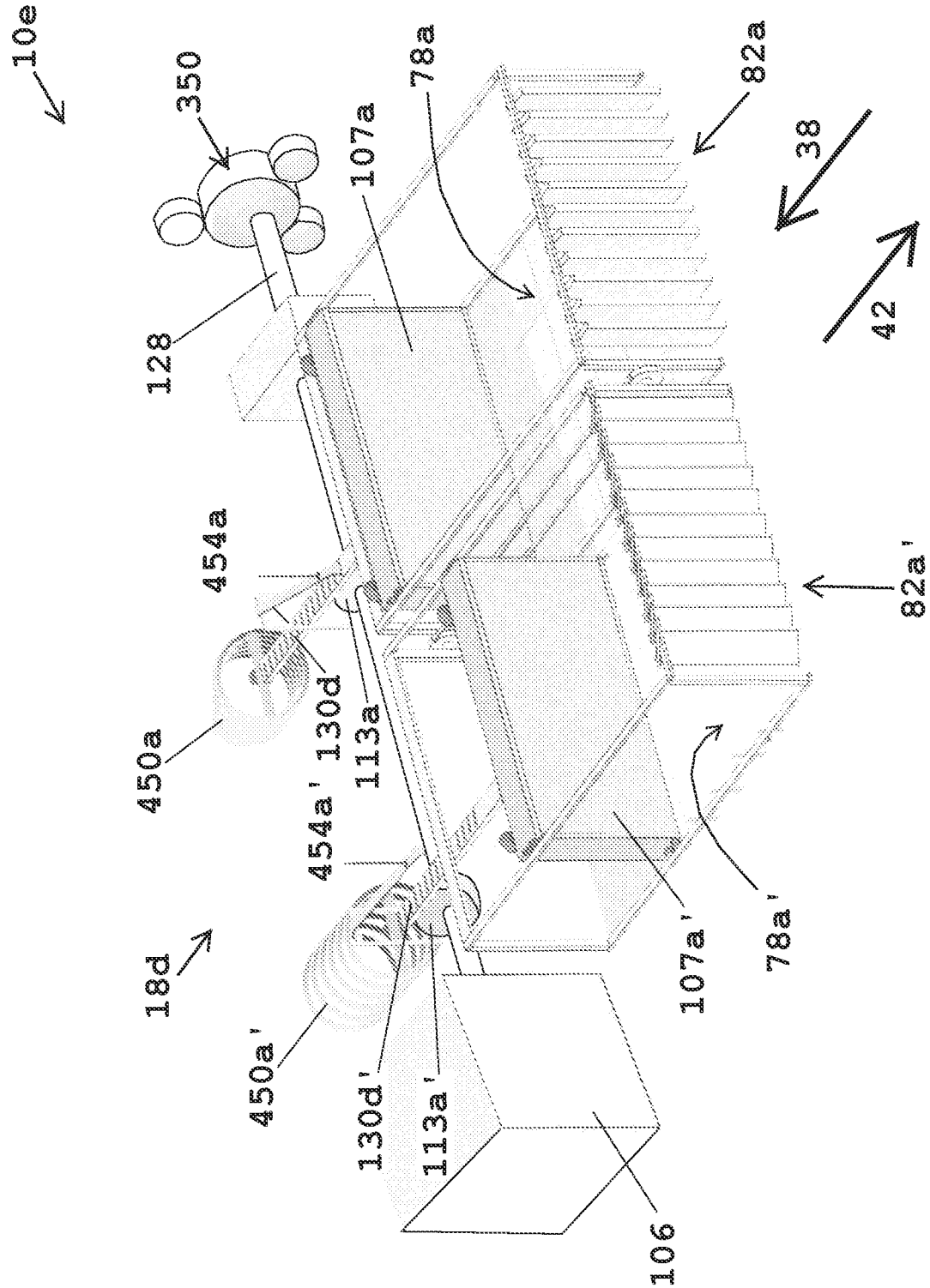
FIG. 17 depicts a perspective view of a fifth embodiment of the present apparatuses that includes a temporary storage mechanism with springs to temporarily store energy imparted by a fluid flowing into each of two encapsulation channels.

FIG. 17 depicts a perspective view of an embodiment 10e of the present apparatuses that is similar to apparatus 10a but includes a transfer mechanism 18d that is configured to temporarily store energy during each operational cycle of the apparatus. Apparatus 10e is substantially similar to apparatus 10a, and the differences between apparatus 10e and apparatus 10a will therefore primary be described here. In the embodiment shown, transfer mechanism 18d comprises springs 450a and 450a' coupled to each of geared links 130d, and locking arms 454a and 454a' configured to engage geared links 450a and 450a'. In this embodiment, as with those above, geared links 130d are coupled to a shaft 128 via one-way clutches (as described for apparatus 10b). In the embodiment shown, links 130d and 130d' have upper geared surfaces that are configured to engage respective ones of locking arms 454a and 454a'. In this embodiment, links 130d and 130d' also include lower geared surfaces that are configured to engage gears of one-way clutches 113a and 113a'. However, in this embodiment, rather than one-way clutches 113a and 113a' being configured to rotate shaft 128 as partitions 107a and 107a' move in downstream direction 38, clutches 113a and 113a' are configured to freewheel as partitions 107a and 107a' move the in the downstream direction and to cause shaft 128 to rotate as each of springs 450a and 450a' is released to drive the respective link 130d or 130d' and corresponding partition 107a or 107a' in the upstream direction. In this embodiment, springs 450a and 450a' comprise coil springs, but in other embodiments, leaf springs, or any other resilient compressible material (e.g., rubber, gas-filled pistons or shocks, and/or the like) that is capable of storing and releasing potential energy to permit the apparatus to function as described may be used in place of coil springs.

In this embodiment, each of springs 450a and 450a' is configured to be compressed the corresponding one of partitions 107a and 107a' is driven in downstream direction 38 by fluid flowing into the corresponding encapsulating channel 26a or 26a'. For example, in FIG. 17, partition 107a' is in its upstream position. When the gates of barrier 82a' are opened, fluid flowing into channel 26a' will drive partition 107a' in downstream direction 38, and link 130d' will compress spring 450a' (converting the kinetic energy of the inflowing fluid and moving partition 107a' into potential energy stored in the spring). As or when partition 107a' reaches its downstream position, locking arm 454a' is lowered to temporarily lock link 130d' as the fluid in channel 26a' is exhausted through openable bottom 78a'. As or when the fluid is exhausted out of channel 26a', partition 107a will begin to move in downstream direction 38 and locking arm 454a' is actuated to release link 130d' such that spring 450a' can drive partition 107a' in upstream direction 42. As or when partition 107a reaches its downstream position, locking arm 454a is lowered to temporarily lock link 130d as the fluid in channel 26a is exhausted through openable bottom 78a. And as or when the fluid is exhausted out of channel 26a, partition 107a' will begin to move in downstream direction 38 and locking arm 454a is actuated to release link 130d such that spring 450a can drive partition 107a in upstream direction 42.

As noted above, in the embodiment shown in FIG. 17, one-way clutches 113a and 113a' are coupled to lower geared surfaces of links 130d and 130d', respectively, such that when each spring 450a and 450a' is released, the corresponding link 130d or 130d' rotates shaft 128. In this embodiment, shaft 128 is coupled to a mechanical energy-storage device 350 at a first end of shaft 128 and to a generator 106 at a second end of shaft 128.

While not shown in FIG. 17, apparatus 10e can comprise any suitable linkage or gear arrangement (e.g., 400a) configured such that when partition 107a moves in downstream direction 38, it causes partition 107a' to move in upstream direction 42; and when partition 107a' moves in downstream direction 38, it causes partition 107a to move in upstream direction 42. For example, in this embodiment, such a linkage or gear arrangement is coupled to locking arms 454a and 454a' such that (1) as partition 107a' begins its cycle and starts to move in downstream direction 38, locking arm 454a is actuated to release link 130d and thereby permits spring 450a to drive partition 107a in upstream direction 42, and (2) as partition 107a begins its cycle and starts to move in downstream direction 38, locking arm 454a' is actuated to release link 130d' and thereby permit spring 450a' to drive partition 107a' in upstream direction 42. And as described above for various other embodiments, such a linkage or gear mechanism can further be coupled to openable bottoms 78a and 78a' to coordinate their opening and closing as partitions 107a and 107a' reciprocate in channels 26a and 26a'. For example, such a linkage or gear arrangement can be driven by the release of the springs and/or by harvesting the potential energy of the fluid exiting downward through openable bottoms 78a and 78a', as described above.

Figure 18A:
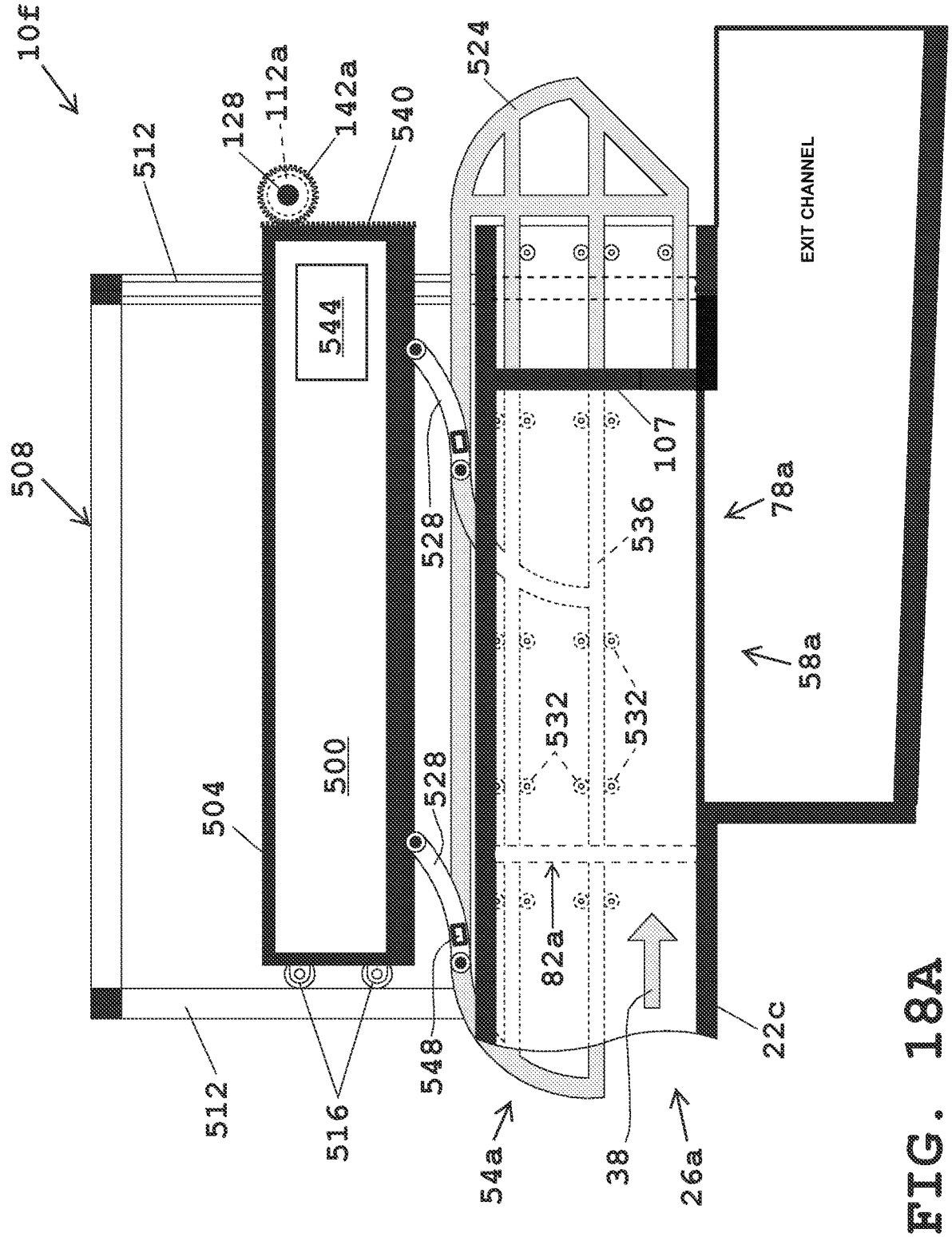

FIGS. 18A-18B depict side views of an embodiment 10f of the present apparatuses that is similar to apparatus 10a but includes a transfer mechanism 18e that is configured to temporarily store energy during each operational cycle of the apparatus. Apparatus 10f is substantially similar to apparatus 10a, and the differences between apparatus 10f and apparatus 10a will therefore primary be described here. While only a single channel 26a is depicted, it should be understood that apparatus 10f can include dual channels 26a and 26a', as does apparatus 10a. In the embodiment shown, transfer mechanism 18e comprises a ballast member 500. For example, in this embodiment, ballast member 500 comprises a cage 504 filled with a ballast material such as, for example, water, water bags, sand, sand bags, rocks, and/or the like. In this embodiment, ballast member 500 is movably disposed in a frame 508 with a plurality of vertical members 512 against which rollers 516 carried by ballast member 500 can roll to facilitate vertical movement and resist lateral movement of ballast member 500.

Figure 18C:
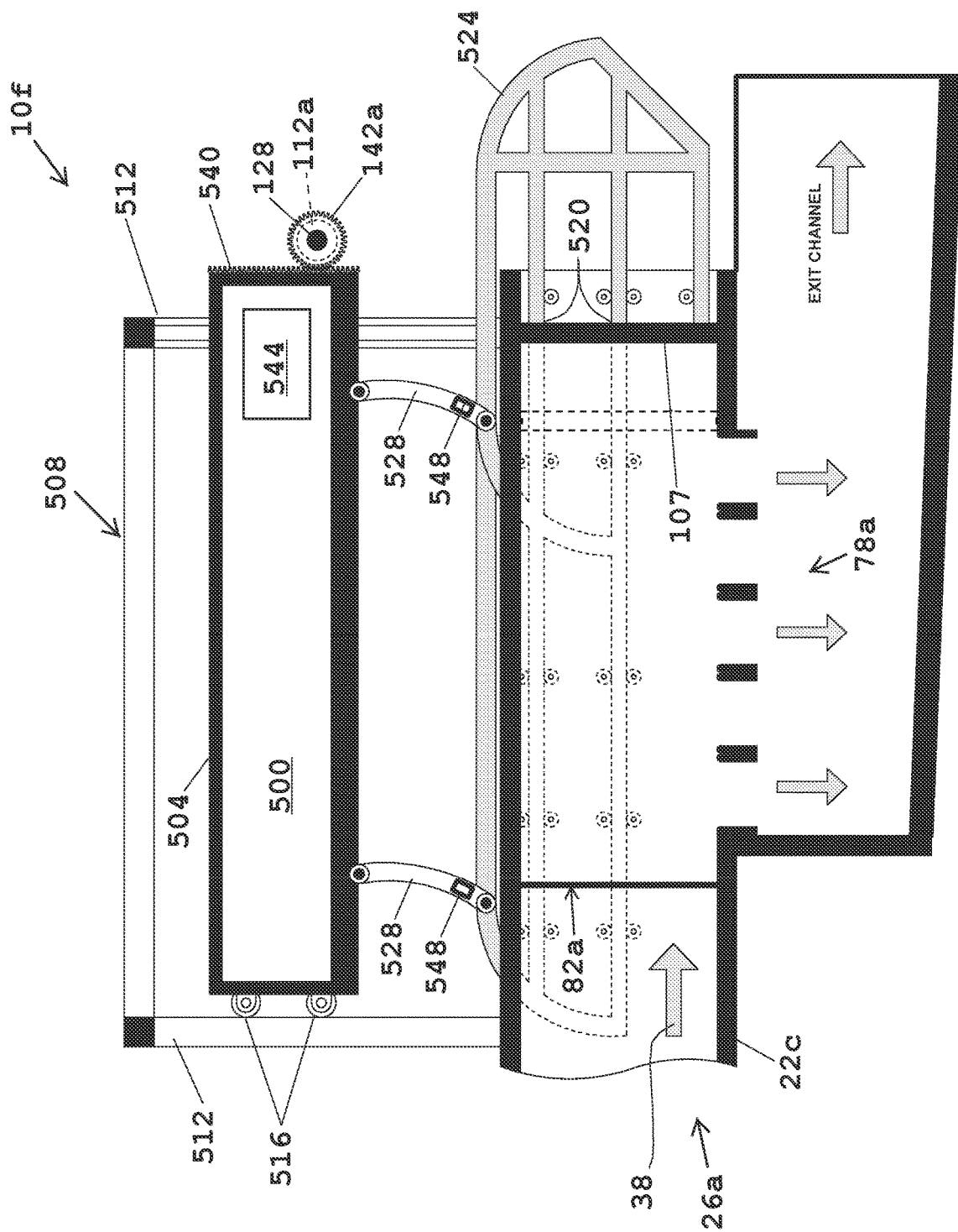

In this embodiment, partition 107 is coupled at connections 520 to a frame 524 that is configured to drive lift arms 528 to raise ballast member 500 as partition 107 moves in downstream direction 38. More particularly, partition 107 is configured to reciprocate within encapsulating channel 26a, as described above, and frame 524 is coupled in fixed relation to partition 107 such that frame 524 also reciprocates. In this embodiment, lift arms 528 are pivotally coupled to frame 528 and ballast member 500 such that, as partition 107 and frame 524 move in downstream direction 38, lift arms 528 apply an upward force to raise ballast member 500 from is lowermost position of FIG. 18A to its uppermost position of FIG. 18B (ballast member 500 is constrained by frame 508 to vertical movement. In this embodiment, the kinetic energy of fluid flowing into channel 26a and partition 107 moving in downstream direction 38 is converted into potential energy as ballast member is raised to its uppermost position. As or when partition 107 reaches its downstream position (FIG. 18B), barrier 82a can be closed (FIG. 18B) and openable bottom 78a opened (FIG. 18C) to exhaust the fluid in channel 26a. In this embodiment, body 22c carries a plurality of rollers 532 configured to movably support and maintain the orientation of longitudinal members 536 of frame 524.

Figure 18D:
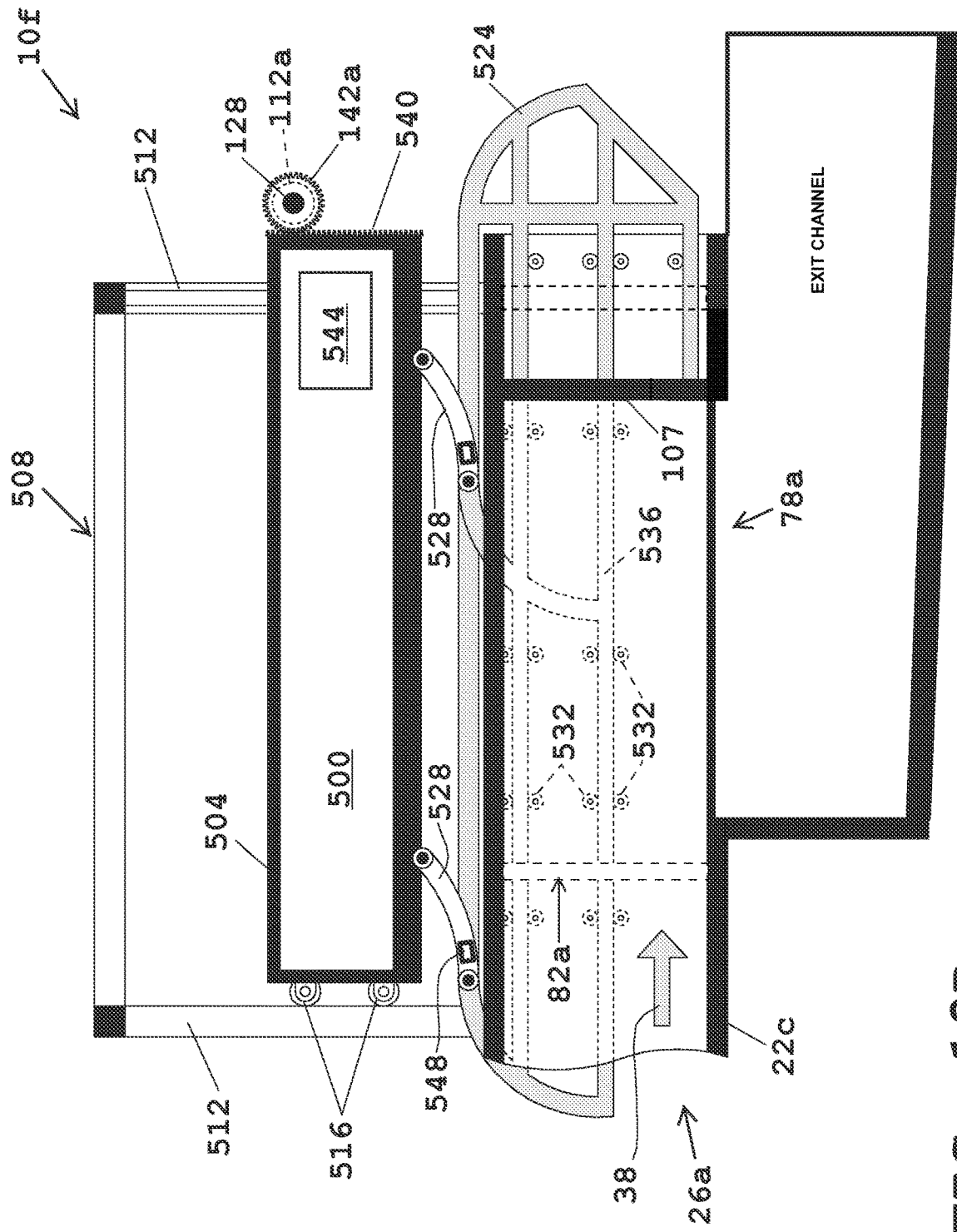

In the embodiment shown, ballast member 500 (e.g., ballast cage 504) includes a geared surface or rack 540 configured to rotate a gear 142a that is coupled to a shaft 128 via a one-way clutch 112a. In this embodiment, as partition 107 moves in downstream direction and ballast member 500 is drive upwards, geared surface 540 rotates gear 142a in a clockwise direction and one-way clutch 112a is configured to freewheel relative to shaft 128 while the weight of ballast member 500 provides resistance to slow and stop partition 107. When partition 107a reaches its downstream position (FIG. 18B), the fluid in channel 26a is exhausted through openable bottom 78a. As or when the fluid is exhausted out of channel 26a, ballast member 500 will move downward and drive (via lift arms 528) partition 107a in upstream direction 42. As or when partition 107 reaches its upstream position, bottom 78a can be closed and barrier 82a opened (FIG. 18D), to permit the cycle to start again. As ballast member 500 moves downward, geared surface 540 rotates gear 142a in a counter-clockwise direction and one-way clutch 112a engages to rotate shaft 128 in a clockwise direction. As described above, shaft 128 can be coupled to a mechanical energy-storage device (e.g., 350) and/or a generator (e.g., 106).

In some embodiments, a control unit 544 having a controller (e.g., processor) and a pump can monitor the weight of ballast member 500 via strain gauges 548 and/or other sensors, and can adjust the weight of the ballast member by pumping liquid into or out of ballast frame 504. For example, if the flow velocity of fluid entering encapsulating channel 26a decreases, less weight may be needed in ballast member 500, and vice versa. The pump of control unit 544 can be coupled to a liquid source (e.g., a river from which water flows into the channel(s)) via a tube or other conduit. Control unit 544 can also be coupled to a flow sensor at or upstream of the inlet to the channel(s) to monitor the flow velocity of fluid entering the channel(s) such that the controller of control unit 544 can adjust the weight of ballast member 500 in accordance with the velocity. In other embodiments, control unit 544 can be disposed partially or entirely outside ballast member 500 (e.g., with a controller inside, and a pump outside, of ballast cage 504).

While not shown in FIGS. 18A-18D, apparatus 10f can comprise multiple encapsulating channels, and any suitable linkage or gear arrangement (e.g., 400a) configured to coordinate opening and closing of barriers (e.g., 82a, 82a') and/or openable bottoms (78a, 78a'), such as described above for other embodiments. For example, such a linkage or gear arrangement can be driven by falling ballast member 500 and/or by harvesting the potential energy of the fluid exiting downward through openable bottom(s) (78a, 78a'), as described above.

Figure 19A:
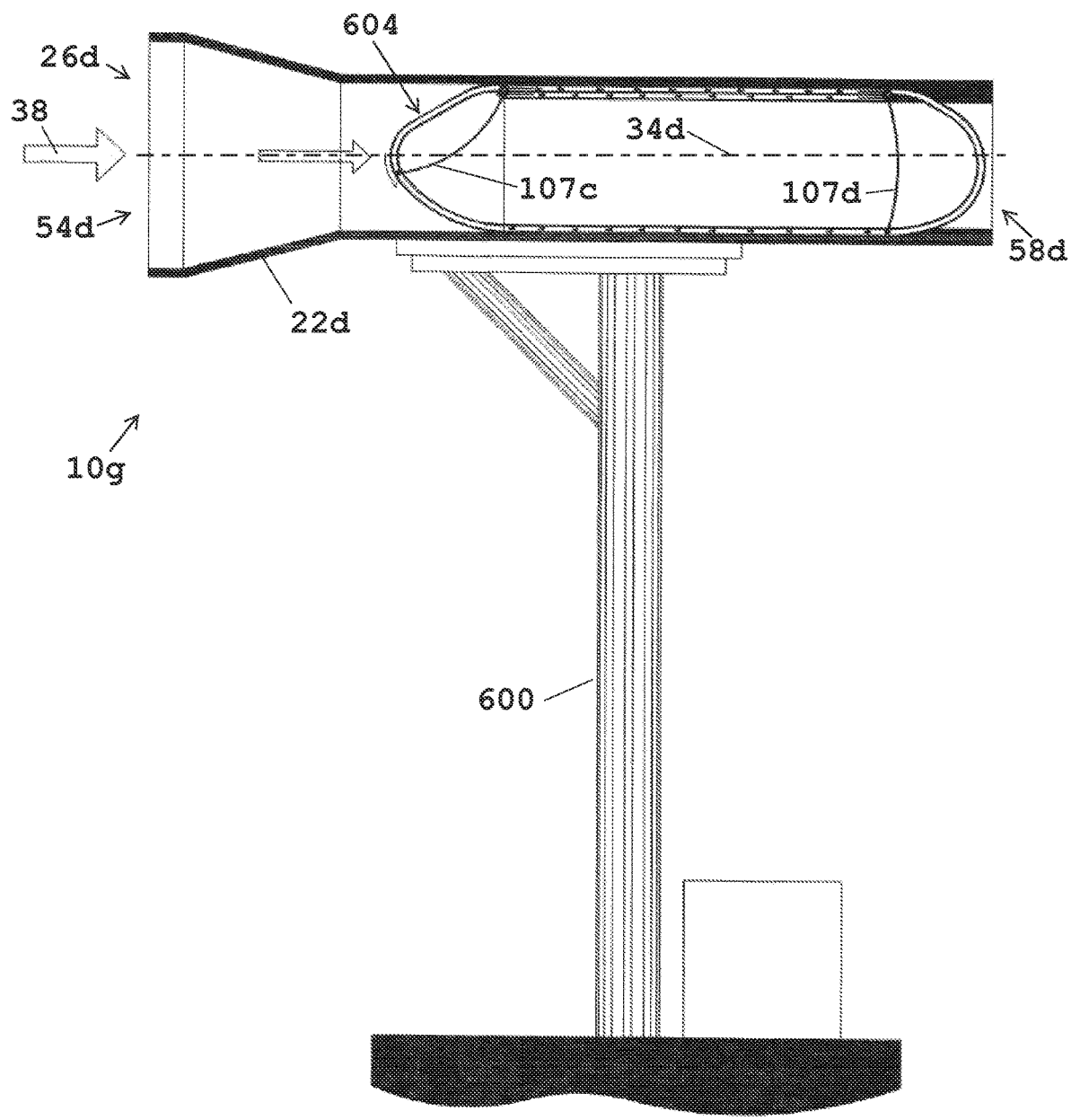
Figure 19D:
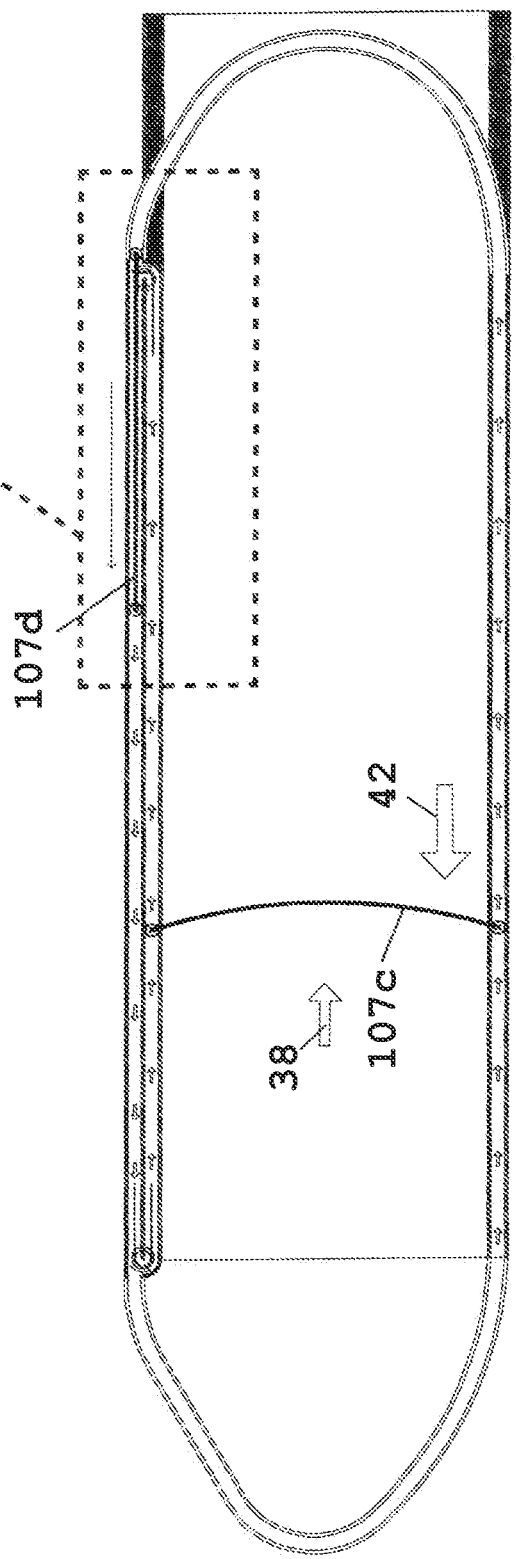
Figure 19E:
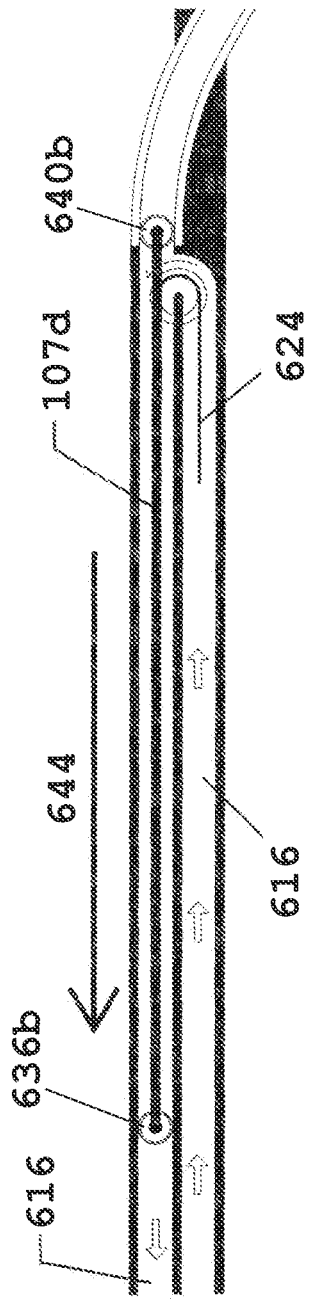
Figure 19F:
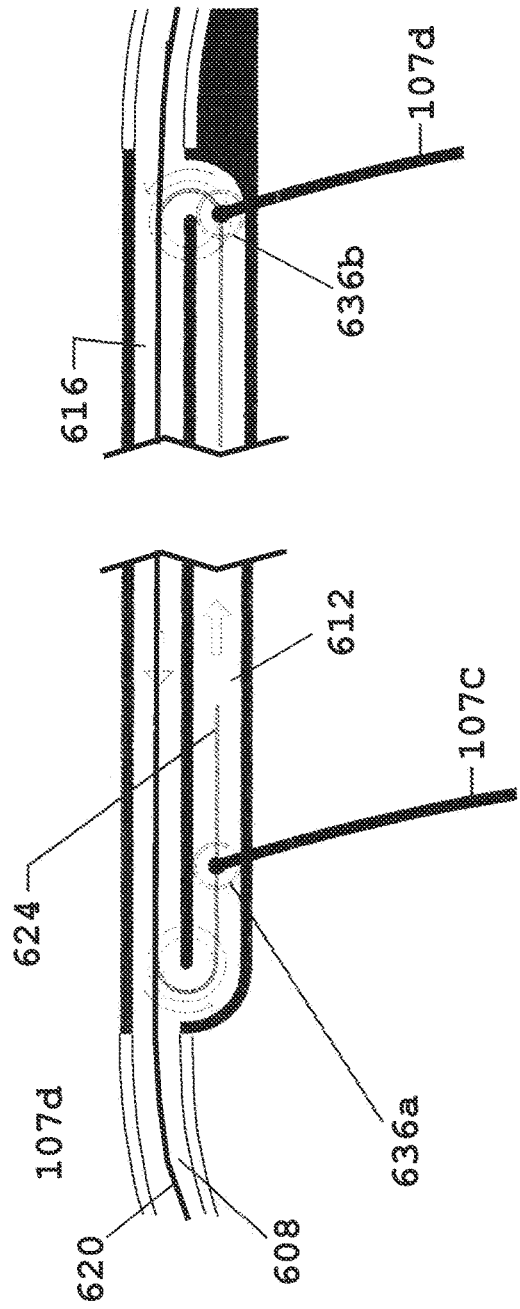
Figure 19K:
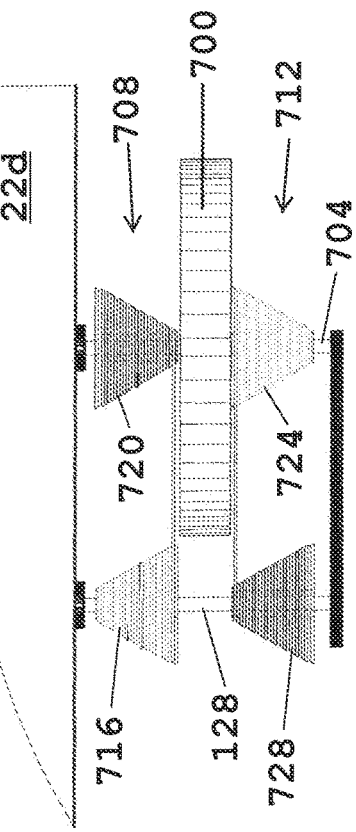
Figure 19G:
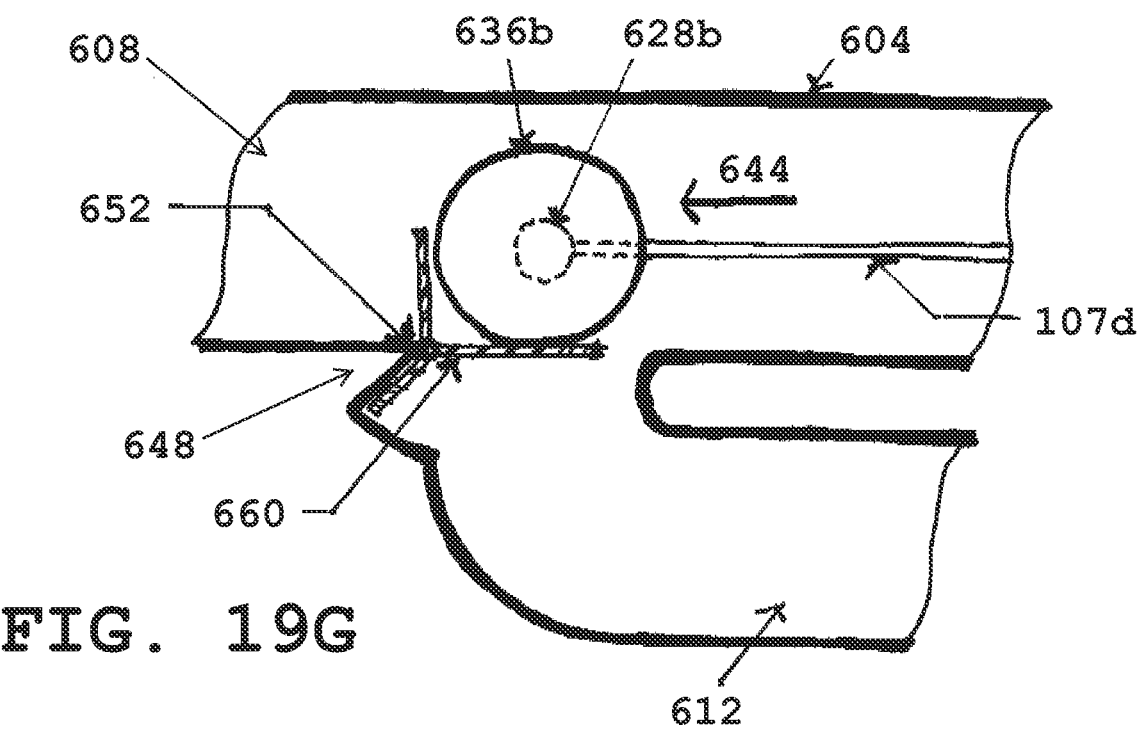
Figure 19H:
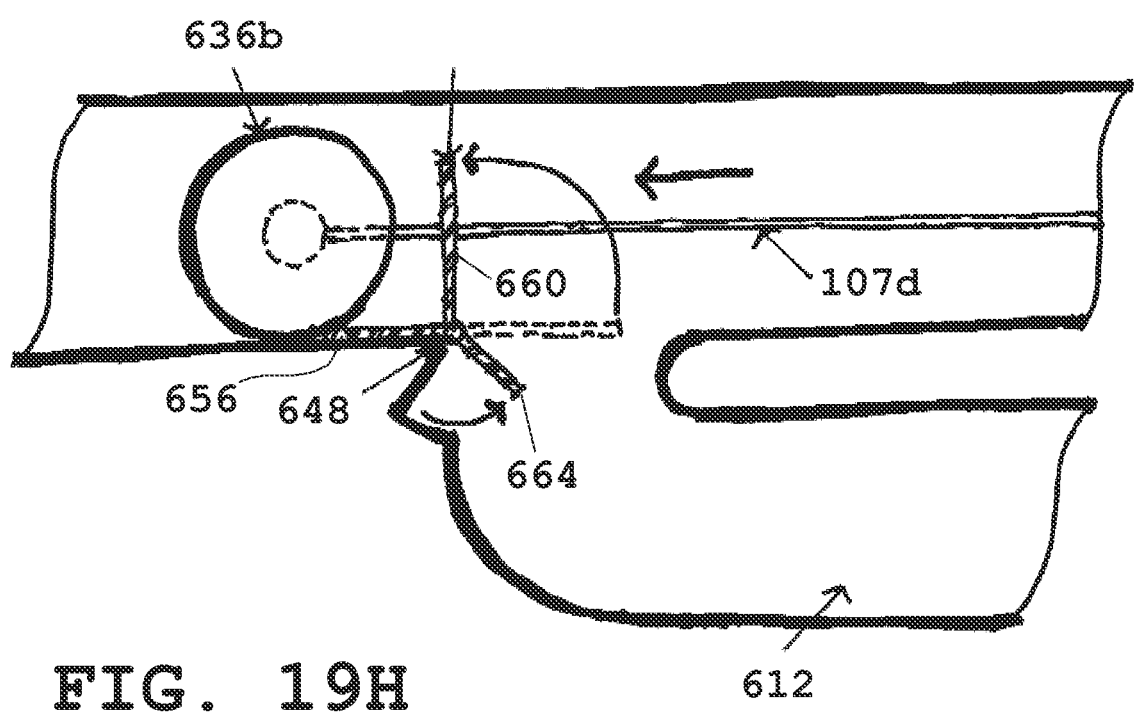

FIGS. 19A-19K depict various views of a seventh embodiment 10g of the present apparatuses that is especially suitable for extracting energy from wind. FIG. 19A depicts a cross-sectional view of apparatus 10g coupled (e.g., pivotally) to the top of a tower 600 (similar to a windmill); FIGS. 19B-19D depict cross-sectional views of a portion of apparatus 10g in various stages of operation; FIGS. 19E-19F depict enlarged views of certain details of apparatus 10g illustrating the operation of an exhaust mechanism and transfer mechanism of the apparatus; FIGS. 19G-19J depict enlarged cross-sectional views of certain components that control the position of the partition(s) of apparatus 10g; and FIG. 19G depicts a transfer mechanism and flywheel suitable for at least some embodiments of apparatus 10g. Apparatus 10g is similar in some respects to apparatus 10a. For example, apparatus 10g also comprises: a body 22d defining a channel 26d (e.g., with a substantially closed and/or closable cross-section, as described above) having a central longitudinal axis 34d, an inlet 54d, and an outlet 58d. As with apparatus 10a, apparatus 10g comprises a partition 107c coupled to channel 26d (e.g., coupled to body 22d) such that partition 107c can move in a (e.g., linear) downstream direction 38 (e.g., parallel to longitudinal axis 34a) that extends away from inlet 54d, or in an (e.g., linear) upstream direction 42 that extends toward inlet 54d (e.g., parallel to longitudinal axis 34d). While described with a single channel 26d, apparatus 10g can also be configured to include dual channels, as with the embodiments described above.

However, apparatus 10g differs from apparatus 10a in the particular construction and function of its partitions and exhaust mechanism. For example, partition 107c includes a flexible sheet, and apparatus 10g further comprises a second partition 107d that also includes a flexible sheet. In this embodiment, apparatus 10g further comprises a pair of guides 604 disposed on opposing sides of channel 26d (only one shown, but the second a mirror image of the depicted first guide), each guide 604 defining a first closed-loop path 608 and a second closed-loop path 612 that partially overlaps first closed-loop path 608 (e.g., that overlaps in a portion 616 that may be referred to as a return portion). In the embodiment shown, apparatus 10g further includes a first chain 620 coupled to one of the guides (604) and movable along first path 608, and a second chain 624 coupled to one of the guides (604) and movable along second path 612. In other embodiments, the chains may be replaced with belts or the like, and the sprockets may be replaced with pulleys or the like, that permit apparatus 10g to function as described in this disclosure. In this embodiment, first and second ends 628a and 632a of partition 107c are coupled to sprockets 636a and 640a that are configured to be alternatingly coupled to first and second chains 620, 624 such that: movement of partition 107c in downstream direction 38 encourages movement of at least one (e.g., both, in the embodiment shown) of the first and second chains in counterclockwise direction 644 (which rotates flywheel 700, as described in more detail below).

During operation of apparatus 10g, chain 620 moves continuously along path 608 in counterclockwise direction

644, and chain 624 moves continuously along path 612 in counterclockwise direction 644. When partition 107c is in the position of FIG. 19B, sprocket 640a is engaged with chain 620 such that second end 632a of partition 107c is carried in direction 644 toward the fully deployed position of FIG. 19C in which partition 107c spans the entire height of channel 26d, as shown, and in which sprocket 640a is coupled to (e.g., engaged with) chain 620 and sprocket 636a becomes coupled to (e.g., engaged with) chain 624. In this position, air flowing into channel 26d is encapsulated and imparts a force on partition 107c in downstream direction 38. Because the sprockets of partition 107c are coupled to the chains, the force on partition 107c (and the kinetic energy of the air flowing into the channel) is transferred to the chains in the form of a force encouraging chains 620, 624 to continue to move in counterclockwise direction 644. The force on the chains is, in turn, transferred to the load (e.g., flywheel 700), as described in more detail below. As partition 107c continues to move in downward direction 38, as shown in FIG. 19D, the load coupled to chains 620, 624 tends to resist movement of partition 107c through a reactionary force in upstream direction 42, and thereby slows the mass of fluid and eventually decreases the velocity of the fluid to zero (even if only momentarily) at or near the point where partition 107c reaches its downstream position (corresponding to the position of second partition 107d in FIG. 19B).

In the embodiment shown, first and second ends 628b and 632b of partition 107d are coupled to sprockets 636b and 640b that are also configured to be alternatingly coupled to first and second chains 620, 624 such that: movement of partition 107d in downstream direction 38 encourages movement of at least one (e.g., both, in the embodiment shown) of the first and second chains in counterclockwise direction 644 (which rotates flywheel 700, as described in more detail below). The function of partition 107d is also similar to the function of partition 107c. For example, the beginning of a stroke from an upstream position of partition 107c (FIG. 19B) is described above, but is also representative of the beginning of a stroke for partition 107d. Likewise, the end of a stroke for partition 107d, as shown from FIGS. 19B-19D is representative of the end of a stroke for partition 107c. In the embodiment shown, as partition 107d reaches the downstream position illustrated in FIG. 19F, the aggregate velocity in downstream direction 38 of the mass of fluid reaches zero (even if only momentarily, at the moment that the fluid flow stops driving partition 107d and chain 620 begins to drive partition 107d), at which point the kinetic energy of the fluid has been substantially stripped and transferred to chains 620, 624. However, the exhaust mechanism of apparatus 10f is configured to then position both ends 628b, 632b of partition 107d on a single (e.g., upper, as shown) side of channel 26d (FIG. 19D) to permit the fluid to exit the channel through outlet 58d. In particular, as the velocity of the fluid reaches zero, the fluid flow stops providing any driving force to partition 107d and chain 620 instead begins to provide the driving force to move partition 107d. At or near this point, sprocket 640b remains coupled to chain 644, and sprocket 636b transitions from being coupled to chain 624 to being coupled to chain 620 (in overlapping path portion 616) such that chain 620 drives partition 107d to a single (e.g., upper, as shown) side of channel 26d as shown in FIGS. 19C-19d, to move partition 107d in upstream direction 42 as partition 107c moves in downstream direction. It should be appreciated that, because each partition does not extend across channel 26d when moving in upstream direction 42, the energy needed to move each partition is much less than the energy that can be harvested with the other partition that is moving in downstream direction 38.

Figure 19I:
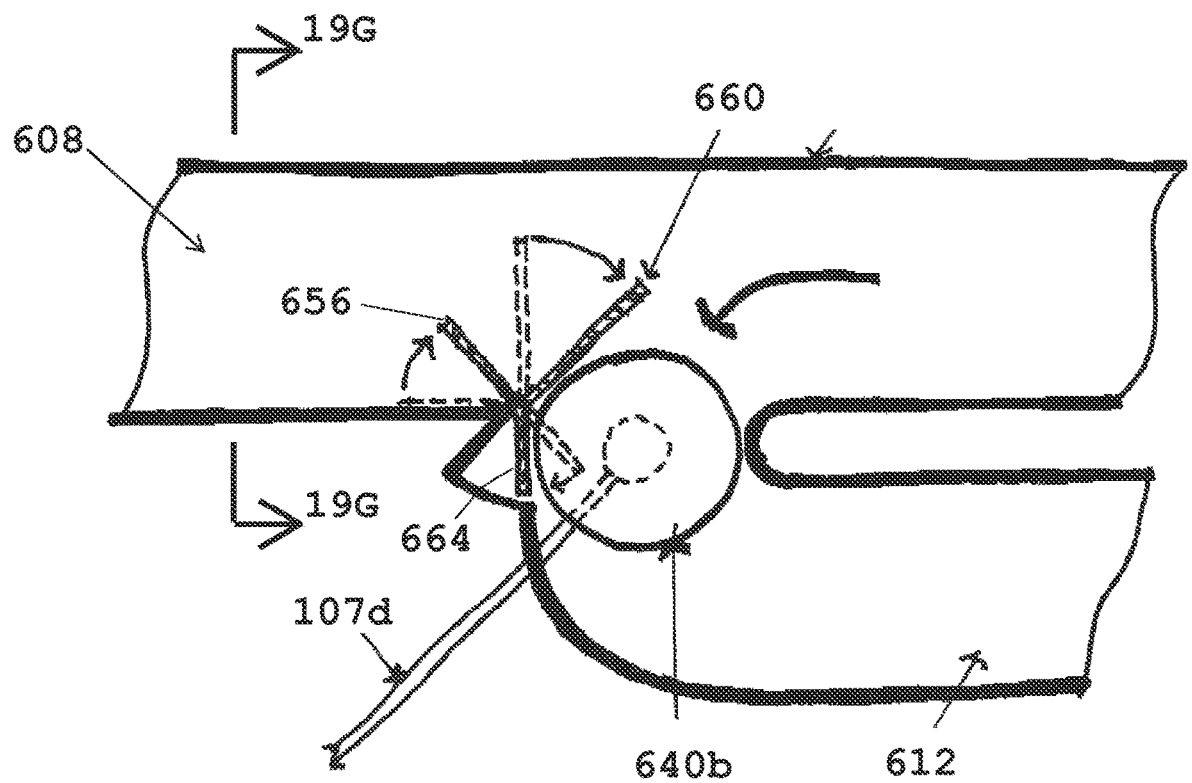

As shown in detail in FIGS. 19G-19J, guide 604 can comprise a gate 648 at the upstream intersection of paths 608 and path 612 to control the position of the partitions (e.g., partition 107d, as shown). In the embodiment shown, gate 648 is pivotally coupled to guide 604 at an axis 652. In this embodiment, gate 648 includes a first lever 656, a second lever 660 angled relative to first lever 656, and a third lever 664 angled relative to both of first and second levers 656, 660. FIG. 19G illustrates gate 648 in a first position in which first lever 656 extends into path 608, and second lever 660 extends across the opening between path 608 and path 612, such that as partition 107d moves upstream in counterclockwise direction 644 (upstream direction 42), the sprocket (e.g., 636b, as shown) on the leading edge or side of the partition is carried in direction 644 by chain 620, the leading sprocket (636b) pushes first lever 656 to pivot gate 648 in a counterclockwise direction from the first position of FIG. 19G to a second position shown in FIG. 19H. In the second position shown in FIG. 19H, first lever 656 contacts guide 604 to prevent further counterclockwise rotation of gate, second lever 660 extends into first path 608, and third lever 664 extends into second path 612. As the sprocket (e.g., 640b, as shown) on the trailing edge or side of the partition is carried in direction 644 by chain 620, the trailing sprocket (640b) contacts and is directed down by second lever 660, as indicated in FIG. 19I. As the trailing sprocket (640b) enters second path 612, the sprocket (640b) pushes third lever 664 and rotates gate 648 in a clockwise direction, returning the gate to its starting position of FIG. 19G. With gate 648 returned to its starting position is primed to permit the leading sprocket (636a) of the next partition (107c) to continue in path 608, and then to direct the trailing sprocket (640) of the next partition (107c) into second path 612, and so on.

Figure 19J:
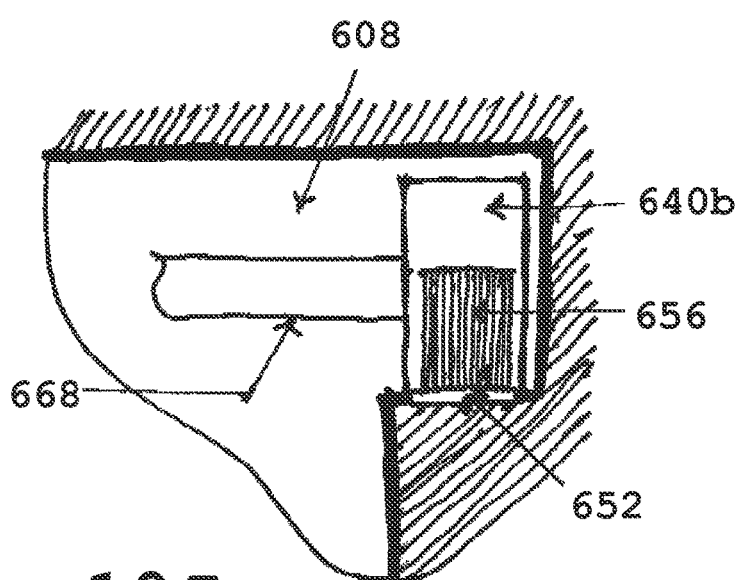

As indicated in FIG. 19J, each end of each partition can be carried by a shaft or rod 668 that extends across the width of channel 26d. In some embodiments, each such shaft or rod includes a second sprocket or wheel at its opposite end, such that the structured described above can be duplicated for a second side of the channel (e.g., a second set of two chains like 620, 624; four sprockets 636a, 636b, 640a, 640b; and the like). In other embodiments, the oppose side of each such shaft or rod is coupled to a wheel such that the chains and sprockets described above are disposed only on a single (e.g., left or right) side of the channel. In further embodiments, first chain 620 and corresponding sprockets are disposed on a first (e.g., left or right) side of channel 26d, and second chain 628 and corresponding sprockets are disposed on the other (e.g., right or left) side of channel 26d.

FIG. 19K depicts on example of a load comprising a flywheel that can be coupled to partitions 107c and 107d (e.g., via chain 620 and/or chain 624) to provide the resistance (energy sink) to slow and capture kinetic energy from fluids flowing into the channel. In the embodiment shown, flywheel 700 is coupled to shaft 704 such that flywheel 700 is free to rotate. In this embodiment, a shaft 128 is coupled (via a sprocket or the like) to chain 620 and/or chain 624. Shaft 128 can then be coupled to shaft 704 by gears, pulleys, or the like to permit shaft 128 to drive flywheel 700 via shaft 704 when fluid in channel 26d drives the partitions, and to permit flywheel 700 to drive shaft 128 (and chains 620, 624) via shaft 704 when the fluid has been stopped in channel 26d and/or when the partitions are otherwise not being driven in channel 26b. For example, in the embodiment shown, shaft 128 is coupled to shaft 704 via two cone-pulley assemblies 708, 712 having cone pullies that function similar to those described above. In this embodiment, assembly 708 includes a driving cone pulley 716 coupled to shaft 128 by a one-way clutch, and a driven cone pulley 720 coupled to shaft 704 by a one-way clutch, such that pulleys 716 and 720 engage to transfer torque from shaft 128 to shaft 704 when shaft 128 is driven, but can freewheel relative to their respective shafts when shaft 704 is driven by flywheel. Similarly, in this embodiment, assembly 712 includes a driving cone pulley 724 coupled to shaft 704 by a one-way clutch, and a driven cone pulley 728 coupled to shaft 128 by a one-way clutch, such that pulleys 724 and 728 engage to transfer torque from shaft 704 to shaft 128 when shaft 704 is driven, but can freewheel relative to their respective shafts when shaft 128 is driven by the partitions. In this configuration, assembly 708 converts driving torque on shaft 128 into torque on shaft 704 when shaft 128 is driven by the partitions, and maximizes the mechanical advantage on shaft 704 when shaft 128 first begins to drive shaft 704 while decreasing the mechanical advantage as shaft 704 accelerates. Similarly, in this configuration, assembly 712 converts driving torque on shaft 704 into torque on shaft 128 when shaft 704 is driven by flywheel 700, and maximizes the mechanical advantage on shaft 128 when shaft 704 first begins to drive shaft 128 while decreasing the mechanical advantage on shaft 128 as shaft 128 accelerates.

As will be appreciated by those of ordinary skill in the art, the alternating coupling or engagement of the partitions (e.g., via sprockets) to the chains can be accomplished by having portions of the chains covered and uncovered in various portions of paths 608 and 612. For example, in the embodiment shown, chain 624 is covered or otherwise positioned in overlapping path portion 616 such that the sprockets only couple to (e.g., engage) chain 620 in overlapping path portion 616. Similarly, in this embodiment, a portion of chain 624 is covered at the entrance to the lower (non-overlapping) portion of path 612 such that a sprocket (e.g., 636a in FIG. 19B) on the leading edge or side of a partition (e.g., 107c) does not couple to chain 624 until chain 620 has carried the trailing edge or side of the partition (e.g., via sprocket 632a) to the lower portion of path 608, as shown in FIG. 19C, at which point both sprockets couple to the respective chains and are carried together by the partition in downstream direction 38 (as shown in FIG. 19C-19D). Various implementations of such configurations and orientations of chains are readily implemented by those of ordinary skill in the art, and may, for example, be similar to orientations and configurations of chains in various other devices and systems (e.g., rollercoasters, where a carriage may be coupled to a chain when going uphill and de-coupled from the chain to freely roll along a track or guide when going downhill). In other embodiments, the chains may be replaced with belts or the like, and the sprockets may be replaced with pulleys or the like, that permit apparatus 10g to function as described above. Flywheel 700 can be coupled to a generator or accumulator as described above for the other embodiments. Such a generator or accumulator can be disposed at the top of tower 600 with apparatus 10g, or can be disposed at the bottom of the tower, such as, for example, as may be done for windmills.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment(s). For example, components may be combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An apparatus comprising:
    a body defining an encapsulation channel having an inlet and an outlet that is distinct from the inlet;
    a partition coupled to the channel such that the partition can move in a downstream direction that extends away from the inlet, or in an upstream direction that extends toward the inlet; and
    an exhaust mechanism, at least a portion of the exhaust mechanism being more directly coupled to the body than to the partition;
    where the partition is configured to be coupled to a load such that if a mass of fluid enters the inlet of the channel with an initial flow velocity in the downstream direction, the partition will decrease the flow velocity of the mass to zero and transfer a portion of the kinetic energy of the mass of fluid to the load; and
    where the exhaust mechanism is configured to be actuated by downstream movement of the partition to, after the flow velocity reaches zero, exhaust the mass of fluid from the channel through the outlet.

2. The apparatus of claim 1, where the partition is configured to be alternated between:
    (i) a closed state in which the partition will move in the downstream direction if a mass of fluid flows into the channel; and
    (ii) an open state in which the partition will permit liquid to flow through the partition.

3. The apparatus of claim 2, where the body defines a second encapsulation channel having an inlet, and an outlet, the apparatus further comprising:
    a second partition coupled to the second channel such that the second partition can move in a downstream direction that extends away from the inlet, or in an upstream direction that extends toward the inlet; and
    a second exhaust mechanism, at least a portion of the second exhaust mechanism being more directly coupled to the body than to the second partition;
    where the second partition is configured to be coupled to a load such that if a mass of fluid enters the inlet of the second channel with an initial flow velocity in the downstream direction, the second partition will decrease the flow velocity of the mass to zero and transfer a portion of the kinetic energy of the mass of fluid to the load;

where the second exhaust mechanism is configured to, after the flow velocity reaches zero, exhaust the mass of fluid from the second channel; and
where the second exhaust mechanism comprises an openable second bottom in the second channel, the openable second bottom configured to be alternated between:
  (i) a closed state in which liquid is substantially prevented from flowing out of the second channel through the second bottom; and
  (ii) an open state in which liquid is permitted to flow out of the second channel through the second bottom.

4. The apparatus of claim 3, where the second partition is configured to be alternated between:
  (i) a closed state in which the second partition will move in the downstream direction if a mass of fluid flows into the channel; and
  (ii) an open state in which the second partition will permit liquid to flow through the second partition; and
where the second bottom is coupled to the second partition such that the second bottom is in the closed state when the second partition is in the closed state.

5. The apparatus of claim 4, further comprising:
a first barrier coupled to the inlet of the first channel, the first barrier configured to be alternated between:
  (i) a closed state in which liquid is substantially prevented from flowing into the first channel; and
  (ii) an open state in which liquid is permitted to flow into the first channel; and
a second barrier coupled to the inlet of the second channel, the second barrier configured to be alternated between:
  (i) a closed state in which liquid is substantially prevented from flowing into the second channel; and
  (ii) an open state in which liquid is permitted to flow into the second channel.

6. The apparatus of claim 1, where the exhaust mechanism is configured to intake liquid flowing adjacent to the channel to exhaust the mass of fluid.

7. The apparatus of claim 6, where the exhaust mechanism comprises a second channel having an inlet and an outlet, the apparatus further comprising:
a first barrier between the first channel and the second channel, the first barrier configured to be alternated between:
  (i) a closed state in which liquid is substantially prevented from flowing from the second channel into the first channel; and
  (ii) an open state in which liquid is permitted to flow from the second channel into the first channel; and
where the partition is configured to be alternated between:
  (i) a closed state in which the partition will move in the downstream direction if a mass of fluid flows into the channel; and
  (ii) an open state in which the partition will permit liquid to flow through the partition; and
where the first barrier is coupled to the partition such that the first barrier is in the closed state when the partition moves in the downstream direction.

8. The apparatus of claim 7, further comprising:
a second barrier extending across the second channel, the second barrier disposed between the first barrier and the outlet of the second channel, and the second barrier configured to be alternated between:
  (i) an open state in which liquid is permitted to flow out of the second channel through the outlet; and
  (ii) a closed state in which the second barrier is configured to resist liquid flow out of the second channel through the outlet.

9. A method comprising:
receiving kinetic energy from the partition of an apparatus of claim 1;
where the apparatus is disposed in fluid communication with a body of water such that the inlet can receive liquid from the body of water through the first end of the channel(s).

10. A method comprising:
receiving kinetic energy from the partition of an apparatus of claim 7;
where the apparatus is disposed in fluid communication with a body of water such that the inlet can receive liquid from the body of water through the first end of the channel(s); and
where the apparatus is at least partially submerged in a river or other flowing waterway.

11. A method comprising:
receiving kinetic energy from the partition of an apparatus of claim 8;
where the apparatus is disposed in fluid communication with a body of water such that the inlet can receive liquid from the body of water through the first end of the channel(s); and
where one or more flow resistance modifiers (FRMS) are disposed between the apparatus and at least one bank of the river or other flowing waterway.

12. A system comprising:
an apparatus of claim 1; and
one or more mechanical energy-storage devices coupled to the partition of the apparatus, each mechanical energy-storage device comprising:
  an input shaft;
  an input gear coupled in fixed relation to the input shaft;
  an outer gear;
  an inner planetary gear having a smaller diameter than the outer gear, the inner planetary gear configured to engage the input gear such that rotation of the input gear in a first direction causes rotation of the inner planetary gear in a second direction;
  a coil spring coupled to the outer gear and the inner planetary gear such that rotation of the inner planetary gear in the second direction without rotation of the outer gear will charge the spring;
  where the input shaft is coupled to the partition such that movement of the partition causes rotation of the input gear in the first direction.

\* \* \* \* \*